United States Patent [19]

Martin

[11] 3,877,926

[45] Apr. 15, 1975

[54] HERBICIDAL COMPOUNDS, COMPOSITIONS AND METHODS

[76] Inventor: Elmore Louis Martin, 53 Paschall Rd., Shellburne, Wilmington, Del. 19803

[22] Filed: Apr. 6, 1972

[21] Appl. No.: 241,800

Related U.S. Application Data

[63] Continuation-in-part of Ser. Nos. 153,429, June 15, 1971, abandoned, and Ser. No. 153,427, June 15, 1971, abandoned.

[52] U.S. Cl. .................. 71/105; 71/79; 71/125; 71/126; 260/465 H; 260/645; 260/646; 260/650 R
[51] Int. Cl. .............................................. A01n 9/20
[58] Field of Search ................... 71/105; 260/465 H

[56] References Cited
UNITED STATES PATENTS

| | | | |
|---|---|---|---|
| 3,307,933 | 3/1967 | Sasse et al. | 71/105 |
| 3,504,001 | 3/1970 | Martin | 260/465 H |
| 3,574,594 | 4/1971 | Gough et al. | 71/105 |

*Primary Examiner*—Lewis Gotts
*Assistant Examiner*—Catherine L. Mills

[57] ABSTRACT

Certain alkylated 1,3- and 1,4-benzenediacetonitriles and 1,3- and 1,4-xylylene dihalides are effective selective, preemergence, and postemergence herbicides.

5 Claims, No Drawings

HERBICIDAL COMPOUNDS, COMPOSITIONS AND METHODS

CROSS-REFERENCE TO RELATED APPLICATIONS

This is a continuation-in-part of my copending applications Ser. Nos. 153,429 and 153,427, now abandoned both filed June 15, 1971.

BACKGROUND OF THE INVENTION

This invention relates to a class of substituted benzenediacetonitriles and their xylylene dihalide intermediates, to use of both classes of compounds as herbicides, and to herbicidal compositions containing them as an active component.

U.S. Pat. No. 3,504,001, issued Mar. 31, 1970, and corresponding French Pat. No. 1,505,720, issued Nov. 6, 1967, disclose a related compound, namely, 2,5-diisopropyl-1,4-benzenediacetonitrile (alternate name 2,5-diisopropyl-1,4-xylylene dicyanide) as an intermediate. British Pat. No. 825,096 discloses 2,5-diethyl-1,4-benzenediacetonitrile as an intermediate. These patents do not disclose any herbicidal activity for either 2,5-diisopropyl-1,4-benzenediacetonitrile or 2,5-diethyl-1,4-benzenediacetonitrile.

SUMMARY OF THE INVENTION

It has been discovered that certain 1,3 and 1,4-benzenediacetonitriles and 1,3 and 1,4-xylylene dihalides exhibit selective herbicidal activity and can be used in the presence of valuable crops, e.g., soybeans, corn, wheat, and rice. These compounds are represented by Formula (1):

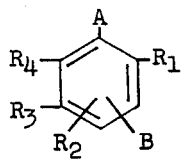

(1)

wherein
A is $-CR_5R_6Z$;
B is $-CR_7R_8Z$;
Z being the cyano group or halogen, and each of $R_5$, $R_6$, $R_7$, and $R_8$ independently being hydrogen or methyl;
and each of $R_1$, $R_2$, $R_3$, and $R_4$ independently is hydrogen, a $C_1$-$C_7$ alkyl, the nitro group, or a halogen; provided that:
a. at most two of $R_1$, $R_2$, $R_3$, and $R_4$ are nitro groups;
b. at most two of $R_1$, $R_2$, $R_3$, and $R_4$ are halogens;
c. at least one of $R_1$, $R_2$, $R_3$, and $R_4$ is hydrogen or halogen;
d. at least one of $R_1$, $R_2$, $R_3$, and $R_4$ is a $C_2$-$C_7$ alkyl;
e. no nitro groups are ortho to each other;
f. no alkyl groups are ortho to each other;
g. each alkyl group has at most three carbon atoms in straight chain from the point of attachment to the aromatic ring; and
h. when Z is halogen, each of $R_5$, $R_6$, $R_7$, and $R_8$ is hydrogen.

Accordingly, in one aspect, this invention is a process for selectively controlling undesired vegetation in the presence of crops which comprises preplant soil incorporation, preemergence, or postemergence application of a herbicidally effective amount of a compound of Formula (1).

In another aspect, the invention is a composition for controlling undesired vegetation which comprises a herbicidally effective amount of a compound of Formula (1) in combination with an inert carrier material.

In yet another aspect, the invention is a group of novel compounds useful as selective herbicides.

DESCRIPTION OF THE INVENTION

Compounds of Formula (1) can be prepared by many processes based on methods generally well known in the art. One method of preparing the compounds of this invention involves replacement of chlorine in 1,3 or 1,4-xylylene dichlorides with cyano groups as shown below.

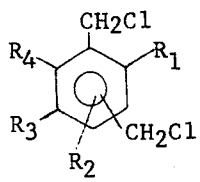 + NaCN →(dimethyl sulfoxide)→ 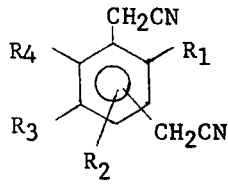

Xylylene dichlorides are converted to the corresponding benezenediacetonitriles by reaction with an alkali metal cyanide in a polar solvent such as dimethyl sulfoxide (DMSO).

The preparation of simple xylylene dichlorides is well known to the art and can be achieved using several chloromethylating agents. Simple alkylbenzenes can be bischloromethylated directly with formaldehyde and hydrogen chloride in the presence of a Lewis acid catalyst such as zinc chloride. For further details see G. A. Olah - Friedel Crafts and Related Reactions, II, Part 2, Chapter 21 and Organic Reactions, I, 63.

Substituted benzenes having deactivating groups present, such as nitro or halogen groups, can be effectively chloromethylated with chloromethylmethyl ether and 60 percent fuming sulfuric acid. See for example Bull. Chem. Soc. Japan, 43, 3,299–3,301 (1970).

Another process for the preparation of substituted 1,3 and 1,4-xylylene dichlorides, necessary for the preparation of the compounds of Formula (1), starts with the corresponding isophthalic and terephthalic acids which are reduced catalytically with hydrogen or with lithium aluminum hydride or diborane in a nonaqueous solvent such as tetrahydrofuran to the corresponding benzenedimethanols; these are converted to the corresponding bischloromethyl compounds by chlorination of the hydroxyl groups with, for example, hydrogen chloride, thionyl chloride, phosphorus oxychloride, phosphorus pentachloride, or oxalyl chloride. This reaction sequence is shown below.

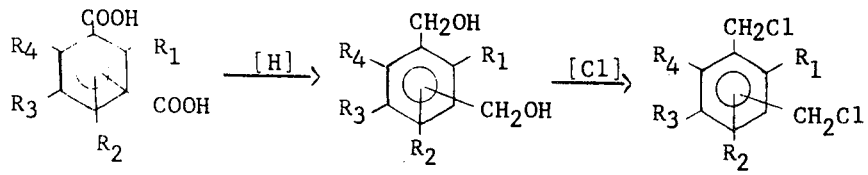

A number of procedures for the preparation of isophthalic and terephthalic acids are available from the literature. (See for example: Ber., 33, 2377; J. Org. Chem., 18, 1529; J. Am. Chem. Soc., 62, 2327.)

These acids can also be prepared from substituted dibromobenzenes as shown in the reaction scheme outlined below.

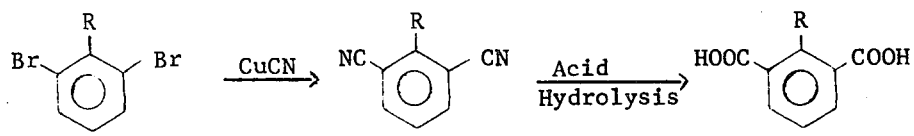

Nitro derivatives can be made by nitrating the benzenediacetonitriles of formula (1) directly, e.g.

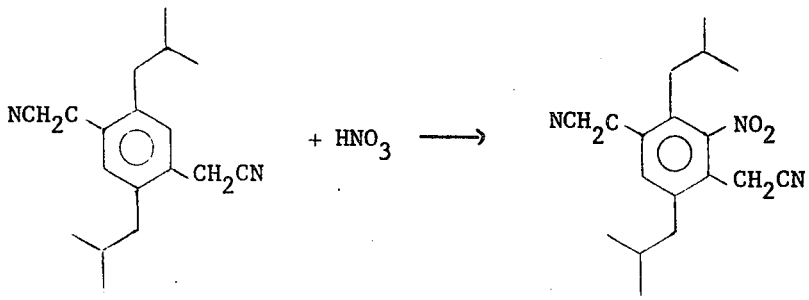

or, when more advantageous, the intermediate xylylene chlorides or iso- and terephthalic acids. A number of nitrating agents can be used to effect nitration. For example, fuming nitric acid, nitric-sulfuric acid mixtures, and nitronium tetrafluoroborate can all be used.

Certain branched secondary alkyl groups such as the isopropyl group can be displaced from the ring during nitration unless these groups are adjacent to or affected by a strongly election-withdrawing substituent on the ring. For example,

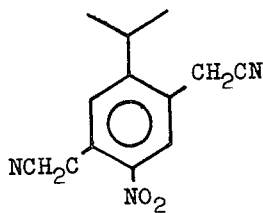

is obtained by nitration of the corresponding 2,5-diisopropyl-1,4-benzenediacetonitrile. This displacement reaction can be used to obtain specific nitrated compounds of Formula (1).

Halogenated benzenediacetonitriles of Formula (1) can be prepared by chloromethylation of alkylated halobenzenes to xylylene dichlorides with subsequent conversion to the benzenediacetonitriles. Xylylene dichlorides can also be halogenated directly [see, for example, Helv. Chim. Acta., 43, 945 (1960)] and then converted to benzenediacetonitriles.

Xylylene dibromides, diiodides, and difluorides can also be employed in the preparation of compounds of Formula (1). Hydrogen bromide can be substituted for hydrogen chloride in the reaction of substituted benzenes with formaldehyde to yield xylylene dibromides directly. Xylylene difluorides and diiodides can be made by reaction of the corresponding dichloride or dibromide with an alkali iodide or alkali fluoride.

Another way to prepare the novel compounds of the instant invention involves alkylation of the methylene carbon adjacent to the nitrile group using an alkyl halide and sodium hydride as shown below.

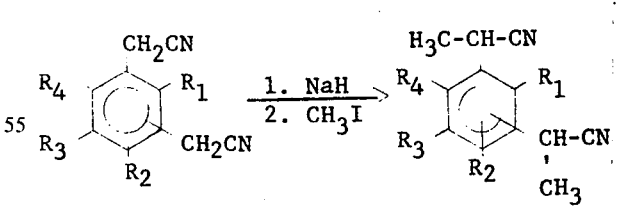

Reactions such as those described are well known in the art, although they may not have been used for the preparation of benzenediacetonitriles. A skilled chemist would be able to select the most suitable reaction sequence and to determine the optimum reaction conditions.

The xylylene dihalide intermediates can be represented as compounds of structure (1) where A and B are each $CH_2Z$, and Z is halogen. These intermediates, represented by Formula (2), are also useful as selective herbicides for control of annual grass weeds in crops.

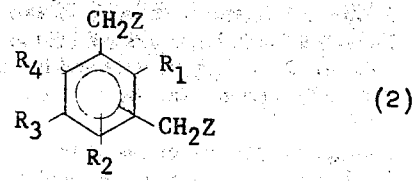

Preferred because of ease of synthesis and high activity are the compounds of formula (3), below:

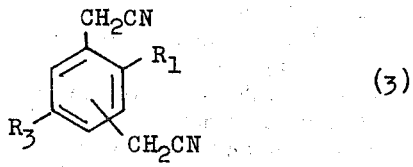

wherein $R_1$ and $R_3$ are each independently alkyl of 2-5 carbon atoms, or the nitro group, provided both are not nitro groups.

It will be noted that the compounds of Formula (3) are those compounds of Formula (1) wherein each of A and B is the cyanomethyl group, and each of $R_2$ and $R_4$ is hydrogen.

The most active are those compounds of Formula (3) wherein $R_3$ is alkyl of 3-5 carbon atoms or the nitro group, and $R_1$ is alkyl of 3-5 carbon atoms.

The same order of preference applies to the corresponding xylylene dihalide intermediates for the same reasons.

The compounds of this invention are useful as selective preplant incorporation, preemergence, or postemergence herbicides. They provide control of many weeds with excellent selectivity in such crops as corn, soybeans, wheat, cotton, and rice. The compounds are most advantageously applied preemergence at rates of 0.25 to 10 pounds per acre, depending on the crop, the weed to be controlled, the soil and environmental conditions and the particular chemical used. Under certain conditions, such a lack of rainfall for an extended period after application, it is advantageous to lightly soil incorporate these compounds. Selected members of this class of compounds have postemergence activity and may be used at rates of 1 to 10 kg/ha for postemergence weed control, if applied while susceptible weeds are young, preferably in the two-leaf stage of development. Two or more herbicides of the present invention can be used simultaneously.

Weeds controlled include crabgrass (*Digitaria spp*), barnyardgrass (*Echinochloa crusgalli*), junglerice (*Echinochloa colonum*), foxtail (*Setaria spp.*), witchgrass (*Panicum capillare*), goosegrass (*Eleusine indica*), pigweed (*Amaranthus rectroflexus*), wild mustard (*Brassica spp*), curly dock (*Rumex crispus*), johnson grass (*Sorghum halepense*) from seed, cheat (*Bromus secalinus*), downy brome (*Bromus tectorum*) and blackgrass (*Alopucurus mysuroides*).

It is sometimes advantageous to combine a compound of this invention with another herbicide in order to increase the spectrum of weeds controlled and to minimize the chances of injury to the current or subsequent crops. The exact combination which may be used to the best advantage will depend upon the crop, the weeds to be controlled and the environment in which the crop is growing, but can be readily selected by one with ordinary skill in the art. The use of those herbicides in combination with the herbicides of this invention will provide control of a wide variety of broadleaved weeds including ragweed (*Ambrosia spp*), lambsquarter (*Chenopodium album*), morningglory (*Ipomea spp*), sicklepod (*Cassia obtusifolia*), smartweed (*Polyganum spp*), flower-of-an-hour (*Hibiscus trionum*), cocklebur (*Xanthium spp*), and velvet-leaf (*Abutilon theophrasti*), as well as grasses.

The herbicidal compositions of this invention containing mixtures with other herbicides can be formulated as such. Alternatively, the compounds of Formula (1) may be tank-mixed with other known herbicides or applied sequentially with other known herbicides.

Among the known herbicides which can be combined with the compounds of Formula (1) are:

SUBSTITUTED UREAS 3-(3,4-dichlorophenyl)-1,1-dimethylurea
3-(4-chlorophenyl)-1,1-dimethylurea
3-phenyl-1,1-dimethylurea
3-(3,4-dichlorophenyl)-3-methoxy-1,1-dimethylurea
3-(4-chlorophenyl)-3-methoxy-1,1-dimethylurea
3-(3,4-dichlorophenyl)-1-n-butyl-1-methylurea
3-(3,4-dichlorophenyl)-1-methoxy-1-methylurea
3-(4-chlorophenyl)-1-methoxy-1-methylurea
3-(3,4-dichlorophenyl)-1,1,3-trimethylurea
3-(3,4-dichlorophenyl)-1,1-diethylurea
3-(p-chlorophenoxyphenyl)-1,1-dimethylurea
N-cyclooctyl-N'-dimethylurea
3-(4-chlorophenyl)-1-methyl-1-(1-methyl-2-propynyl)urea
3-(4-bromo-3-chlorophenyl)-1-methoxy-1-methylurea
3-[p-(p-chlorophenoxy)phenyl]-1,1-dimethylurea
3-(4-trifluoromethylphenyl)-1,1-dimethylurea
3-(4-bromophenyl)-1-methoxy-1-methylurea
3-(hexahydro-4,7-methanoindan-5-yl)-1,1-dimethylurea
1-(2-methylcyclohexyl)-3-phenylurea
3-(p-cumenyl)-1,1-dimethylurea These ureas can be mixed with the compounds of Formula (1) in weight proportions of from 1:40 to 10:1, the preferred ratio being 1:12 to 4:1.

SUBSTITUTED TRIAZINES 2-chloro-4,6-bis(ethylamino)-s-triazine
2-chloro-4-ethylamino-6-isopropylamino-s-triazine
2-chloro-4,6-bis(methoxypropylamino)-s-triazine
2-methoxy-4,6-bis(isopropylamino)-s-triazine
2-diethylamino-4-isopropylacetamido-6-methoxy-s-triazine
2-isopropylamino-4-methoxyethylamino-6-methylmercapto-s-triazine
2-methylmercapto-4,6-bis(isopropylamino)-s-triazine
2-methylmercapto-4,6-bis(ethylamino)-s-triazine
2-methylmercapto-4-ethylamino-6-isopropylamino-s-triazine
2-methoxy-4,6-bis(ethylamino)-s-triazine
2-methoxy-4-ethylamino-6-isopropylamino-s-triazine
2-chloro-4,6-bis(isopropylamino)-s-triazine
2-methoxy-4,6-bis(isopropylamino)-s-triazine 2-ethylamino-4-isopropylamino-6-methylmercapto-s-triazine
2-chloro-4-chloropropylamino-6-isopropylamino-1,3,5-triazine
2,4-bis(isopropylamino)-6-methylmercapto-s-triazine
2-tert-butylamino-4-ethylamino-6-methylthio-s-triazine These triazines can be mixed with the compounds of this invention in the weight proportions of from 1:40 to 10:1, the preferred ratio being 1:12 to 4:1.

PHENOLS 3,5-dinitro-o-cresol
4,6-dinitro-o-sec-butylphenol and its salts
4,6-dinitro-o-sec-amylphenol
pentachlorophenol and its salts These phenols can be mixed with the compounds of this invention in the weight proportions of from 1:10 to 10:1, the preferred ratio being 1:5 to 5:1.

SUBSTITUTED URACILS 3-isopropyl-5-bromo-6-methyluracil
5-bromo-3-sec-butyl-6-methyluracil
3-tert-butyl-5-chloro-6-methyluracil
5-chloro-6-methyl-3-neopentyluracil
3-tert-butyl-5-bromo-6-methyluracil
3-isopropyl-5-chloro-6-methyluracil
3-tert-butyl-5-chloro-6-ethyluracil
3-tert-butyl-5-chloro-6-chloromethyluracil
3-cyclohexyl-6-methyluracil
3-cyclohexyl-6-ethyluracil
3-cyclohexyl-6-sec-butyluracil
3-norbornyl-6-methyluracil
3-cyclopentyl-6-methyluracil
3-cyclohexyl-6-isopropyluracil
3-cyclohexyl-5,6-trimethyleneuracil
3-sec-butyl-5,6-trimethyleneuracil
3-isopropyl-5,6-trimethyleneuracil
3-isopropyl-5,6-tetramethyleneuracil
3-isopropyl-5,6-pentamethyleneuracil
3-cyclohexyl-5-bromouracil
3-cyclohexyl-5-chlorouracil
3-isopropyl-5-bromouracil
3-sec-butyl-5-bromouracil
3-sec-butyl-5-chlorouracil
3-isopropyl-1-trichloromethylthio-5-bromo-6-methyl-uracil
3-cyclohexyl-1-trichloromethylthio-5-bromo-6-methyluracil
3-sec-butyl-1-acetyl-5-bromo-6-methyluracil
3-isopropyl-1-acetyl-5-bromo-6-methyluracil
3-isopropyl-1-trichloromethylthio-5-chloro-6-methyluracil These substituted uracils can be mixed with the compounds of this invention in the weight proportions of from 1:80 to 10:1, the preferred ratio being from 1:20 to 4:1.

CARBOXYLIC ACIDS AND DERIVATIVES

The following carboxylic acids and derivatives can be mixed with the compounds of this invention in the listed weight proportions:

A. 2,3,6-trichlorobenzoic acid and its salts
2,3,5,6-tetrachlorobenzoic acid and its salts
2-methoxy-3,5,6-trichlorobenzoic acid and its salts
2-methoxy-3,6-dichlorobenzoic acid and its salts
2-methoxy-3,5,6-trichlorobenzoic acid
3-amino-2,5-dichlorobenzoic acid and its salts
3-nitro-2,5-dichlorobenzoic acid and its salts
2-methyl-3,6-dichlorobenzoic acid and its salts
4-chlorophenoxyacetic acid and its salts and esters
2,4-dichlorophenoxyacetic acid and its salts and esters
2,4-dichlorophenoxyethylsulfate
2,4,5-trichlorophenoxyacetic acid and its salts and esters
(2-methyl-4-chlorophenoxy)acetic acid and its salts and esters
(2-methyl-4-chlorophenoxy)propionic acid and its salts and esters
2-(2,4,5-trichlorophenoxy)propionic acid and its salts and esters
2-(2,4,5-trichlorophenoxy)ethyl-2,2-dichloropropionate
4-(2,4-dichlorophenoxy)butyric acid and its salts and esters
4-(2-methyl-4-chlorophenoxy)butyric acid and its salts and esters
2,3,6-trichlorobenzyloxypropanol
tris(2,4-dichlorophenoxyethyl)phosphite
Mixed in a 1:80 to 8:1 ratio, preferably a 1:20 to 2:1 ratio.

B. 2,6-dichlorobenzonitrile
3,5-dibromo-4-hydroxybenzonitrile
Mixed in a 1:40 to 4:1 ratio, preferably a 1:16 to 3:1 ratio.

C. trichloroacetic acid and its salts
Mixed in a 1:8 to 8:1 ratio, preferably a 1:4 to 4:1 ratio.

D. 2,2-dichloropropionic acid and its salts
2-(α-naphthoxy)-N,N-diethylpropionamide
2-(4-chloro-6-ethylamino-2-ylamino)methylpropionitrile
Mixed in a 1:8 to 8:1 ratio, preferably a 1:4 to 4:1 ratio.

E. N,N-di(n-propyl)thiolcarbamic acid, ethyl ester
N,N-di(n-propyl)thiolcarbamic acid, n-propyl ester
N-ethyl-N-(n-butyl)thiolcarbamic acid, ethyl ester
N-ethyl-N-(n-butyl)thiolcarbamic acid, n-propyl ester
S-2,3-dichloroallyl-N,N-diisopropylthiolcarbamate
S-2,3,3-trichloroallyl-N,N-di-isopropylthiolcarbamate
S-propyl-n-butylethylthiocarbamic acid
2-chloroallyldithiocarbamate
S-ethyl diisobutylthiocarbamate
2-chloroallyldiethyldithiocarbamate
S-ethyl-N-ethylthiocyclohexanecarbamate
Mixed in a 1:4 to 4:1 ratio, preferably a 1:2 to 2:1 ratio.

F. N-phenylcarbamic acid, isopropyl ester
N-(m-chlorophenyl)carbamic acid, isopropyl ester
N-(m-chlorophenyl)carbamic acid, 4-chloro-2-butynyl ester
N-(3,4-dichlorophenyl)carbamic acid, methyl ester
N-(3,3-dimethylureido)phenyl-tert-butylcarbamate
2,6-di-tert-butyl-p-tolylmethylcarbamate
Mixed in a 1:8 to 8:1 ratio, preferably a 1:4 to 4:1 ratio.

G. 2,3,6-trichlorophenylacetic acid and its salts
Mixed in a 1:4 to 8:1 ratio, preferably a 1:4 to 4:1 ratio.

H. 2-chloro-N,N-diallylacetamide
maleic hydrazide
1,2-dihydropyridazine-3,6-dione
3',4'-dichloro-2-methacrylanilide
2-chloro-2',6'-diethyl-N-(methoxymethyl)acetanilide
N-(butoxymethyl)-2-chloro-2',6'-diethylacetanilide
3,5-dinitro-N',N'-dipropylsulfanilamide
2-chloro-N-isopropylacetanilide
3',4'-dichloropropionanilide
Mixed in a 1:8 to 10:1 ratio, preferably a 1:4 to 5:1 ratio.

I. 4-amino-3,5,6-trichloropicolinic acid
Mixed in a 1:100 to 4:1 ratio, preferably a 1:20 to 2:1 ratio.

INORGANIC AND MIXED INORGANIC-ORGANIC SALTS

The following salts can be mixed with the compounds of this invention in the listed weight proportions:

A. monoammonium methanearsonate
calcium methylarsonate
calcium propylarsonate
disodium monomethylarsonate
octyl-dodecylammoniummethylarsonate
dimethylarsinic acid
hydroxydimethylarsine oxide
Mixed in a 1:8 to 4:1 ratio, preferably a 1:4 to 2:1 ratio.

B. sodium arsenite
potassium cyanate
Mixed in a 1:10 to 20:1 ratio, preferably a 1:5 to 10:1 ratio.

C. lead arsenate
calcium arsenate
Mixed in a 10:1 to 100:1 ratio, preferably a 20:1 to 50:1 ratio.

D. sodium tetraborate hydrated, granulated
sodium metaborate
sodium pentaborate
polyborchlorate
unrefined borate ore such as borascu
Mixed in a 10:1 to 600:1 ratio, preferably a 20:1 to 400:1 ratio.

E. ammonium thiocyanate
Mixed in a 1:10 to 10:1 ratio, preferably a 1:5 to 5:1 ratio.

F. sodium chlorate
Mixed in a 10:1 to 200:1 ratio, preferably a 15:1 to 100:1 ratio.

G. ammonium sulfamate
Mixed in a 1:1 to 200:1 ratio, preferably a 2:1 to 100:1 ratio.

OTHER ORGANIC HERBICIDES

These organic herbicides can be mixed with compounds of this invention in the listed weight proportions:

A. 6,7-dihydrodipyrido[1,2-a;2',1'-c]pyrazinediium ion
1,1'-dimethyl4,4'-bipyridinium ion
Mixed in a 1:20 to 10:1 ratio, preferably a 1:10 to 5:1 ratio.

B. 3-amino-1,2,4-triazole
Mixed in a 1:20 to 20:1 ratio, preferably a 1:10 to 10:1 ratio.

C. 3,6-endoxohexahydrophthalic acid
Mixed in a 1:10 to 20:1 ratio, preferably a 1:4 to 10:1 ratio.

D. hexachloroacetone
Mixed in a 1:8 to 16:1 ratio, preferably a 1:4 to 8:1 ratio.

E. diphenylacetonitrile
N,N-dimethyl-$\alpha,\alpha$-diphenylacetamide
N,N-di-n-propyl-2,6-dinitro-4-trifluoromethylaniline
N,N-di-n-propyl-2,6-dinitro-4-methylaniline
2,6-dinitro-N,N-di(2-chloroethyl)-p-toluidine
4-(methylsulfonyl)-2,6-dinitro-N,N-dipropylaniline
N-sec-butyl-4-tert-butyl-2,6-dinitroaniline
4-isopropyl-2,6-dinitro-N,N-dipropylaniline
Mixed in a 1:10 to 10:1 ratio, preferably a 1:5 to 5:1 ratio.

F. O-(2,4-dichlorophenyl)-O-methylisopropylphosphoramidothiate
O,O-diisopropylphosphorodithioate-S-ester with N-(2-mercaptoethyl)benzenesulfonamide
S-ethylhexahydro-1-H-azepine-1-carbothioate
2,3,5,6-tetrachloroterephthalic acid, dimethyl ester
Mixed in a 1:20 to 20:1 ratio, preferably a 1:10 to 10:1 ratio.

G. 2,4-dichlorophenyl-4'-nitrodiphenyl ether
2,4-dinitro-4-trifluoromethyldiphenylether
Mixed in a 1:20 to 10:1 ratio, preferably a 1:10 to 5:1 ratio.

H. N-1-naphthylphthalamic acid and its salts
Mixed in a 1:8 to 20:1 ratio, preferably a 1:4 to 10:1 ratio.

I. 3'-chloro-2-methyl-p-valerotoluidide
2-chloro-N-(ethoxymethyl)-6'-ethyl-O-acetotoluidide
N-butyl-N-ethyl-$\alpha,\alpha,\alpha$-trifluoro-2,6-dinitro-p-toluidine
Mixed in a 1:10 to 10:1 ratio, preferably a 1:5 to 5:1 ratio.

J. 3,3a-dihydro-2-(p-methoxyphenyl)-8H-pyrazolo(5,1-A)-isoindol-8-one
2-[3-(4-methoxyphenyl)-5-pyrazolyl)benzoic acid
2-(3-phenyl-5-pyrazolyl)benzoic acid
Mixed in a 1:20 to 8:1 ratio, preferably a 1:10 to 4:1 ratio.

The preparation of representative benzenediacetonitriles and xylene dihalides of the present invention is illustrated in the following examples, in which all parts, proportions, and percentages are by weight, unless indicated otherwise.

EXAMPLE 1

Preparation of 2-Ethyl-1,3-Xylylene dichloride

PART A

2-Ethylisophthalonitrile

A mixture of 78 parts of 2,6-dibromoethylbenzene, 75 parts of cuprous cyanide and 175 parts of N-methylpyrrolidinone is stirred mechanically and heated at 210°C for 5 hours, then concentrated under reduced pressure to one-fifth volume. The mixture is poured slowly with stirring into a mixture of 60 parts of sodium cyanide in 300 parts of water and 800 parts of ether. The mixture is stirred 0.5 hour, then the ether layer is separated and washed with 10 percent aqueous sodium cyanide and saturated sodium chloride solution, dried and concentrated. The residue is distilled to afford 2-ethylisophthalonitrile.

PART B

2-Ethylisophthalic Acid

A mixture of 60 parts 2-ethylisophthalonitrile and 300 parts of 50 percent sulfuric acid is stirred and refluxed 10 hours, then cooled and filtered. The isolated solid is dissolved in 10 percent aqueous sodium hydroxide and washed with ether. The aqueous layer is acidified with dilute hydrochloric acid and filtered. The isolated solid is crystallized from a suitable solvent to afford 2-ethylisophthalic acid.

PART C

2-Ethyl-1,3-benzenedimethanol

To a suspension of 38 parts of lithium aluminum hydride in 200 parts of anhydrous tetrahydrofuran is added dropwise a solution of 97 parts of 2-ethylisophthalic acid in tetrahydrofuran. The resulting solution is refluxed 2 hours, cooled in an ice bath and the excess lithium aluminum hydride is destroyed by addition of ethyl acetate. The mixture is diluted with 500 parts of ether, washed sequentially with dilute hydrochloric acid, dilute sodium hydroxide, and saturated sodium chloride solution. The organic phase is separated, dried and concentrated to afford 2-ethyl-1,3-benzenedimethanol.

PART D

2-Ethyl-1,3-xylylene dichloride

To a solution of 21 parts of 2-ethyl-1,3-benzenedimethanol in 150 parts of benzene is added a catalytic amount of dimethylformamide and dropwise 30 parts of thionyl chloride. The mixture is refluxed until evolution of gas ceases, then concentrated to afford suitably pure 2-ethyl-1,3-xylylene dichloride.

By the reaction sequence of Example 1, Parts A-D, the following monoalkyl 1,3- and 1,4-xylylene dichlorides (Table I) can be prepared from the listed alkyldibromobenzenes.

TABLE I

| Starting Material | Product |
| --- | --- |
| 2,6-dibromopropylbenzene | 2-propyl-1,3-xylylene dichloride |
| 2,6-dibromoisopropylbenzene | 2-isopropyl-1,3-xylylene dichloride |
| 2,6-dibromo-sec-butylbenzene | 2-sec-butyl-1,3-xylylene dichloride |
| 2,6-dibromo-tert-butylbenzene | 2-tert-butyl-1,3-xylylene dichloride |
| 2,6-dibromoisobutylbenzene | 2-isobutyl-1,3-xylylene dichloride |
| 2,5-dibromoethylbenzene | 2-ethyl-1,4-xylylene dichloride |
| 2,5-dibromopropylbenzene | 2-propyl-1,4-xylylene dichloride |
| 2,5-dibromoisopropylbenzene | 2-isopropyl-1,4-xylylene dichloride |
| 2,5-dibromo-sec-butylbenzene | 2-sec-butyl-1,4-xylylene dichloride |
| 2,5-dibromo-tert-butylbenzene | 2-tert-butyl-1,4-xylylene dichloride |
| 2,5-dibromoisobutylbenzene | 2-isobutyl-1,4-xylylene dichloride |
| 2,4-dibromoethylbenzene | 4-ethyl-1,3-xylylene dichloride |
| 2,4-dibromopropylbenzene | 4-propyl-1,3-xylylene dichloride |
| 2,4-dibromoisopropylbenzene | 4-isopropyl-1,3-xylylene dichloride |
| 2,4-dibromo-sec-butylbenzene | 4-sec-butyl-1,3-xylylene dichloride |
| 2,4-dibromo-tert-butylbenzene | 4-tert-butyl-1,3-xylylene dichloride |
| 2,4-dibromoisobutylbenzene | 4-isobutyl-1,3-xylylene dichloride |
| 3,5-dibromoethylbenzene | 5-ethyl-1,3-xylylene dichloride |
| 3,5-dibromopropylbenzene | 5-propyl-1,3-xylylene dichloride |
| 3,5-dibromoisopropylbenzene | 5-isopropyl-1,3-xylylene dichloride |
| 3,5-dibromo-sec-butylbenzene | 5-sec-butyl-1,3-xylylene dichloride |
| 3,5-dibromo-tert-butylbenzene | 5-tert-butyl-1,3-xylylene dichloride |
| 3,5-dibromoisobutylbenzene | 5-isobutyl-1,3-xylylene dichloride |

EXAMPLE 2

Preparation of 2,4-Diethyl-1,3-xylylene dichloride

PART A

2-Bromo-1,3-diethylbenzene

A solution of 14.9 parts of 2,6-diethylaniline in 125 parts of concentrated hydrobromic acid is cooled to 0°C and a solution of 6.9 parts of NaNO₂ in 10 parts of water is added slowly beneath the surface. The resulting diazonium salt solution is stirred at 0°C for 0.2 hrs then added portionwise to a solution of 13 parts of cuprous bromide in 50 parts of 48 percent hydrobromic acid held at 110°–140°C. The resulting mixture is stirred 5 min then diluted with water. The organic phase is extracted with methylene chloride, washed sequentially with concentrated hydrochloric acid, water, 10 percent aqueous sodium hydroxide and again with water. The methylene chloride solution is dried and fractionated, affording essentially pure 2-bromo-1,3-diethylbenzene as one of the fractions.

PART B

2,6-Diethylbenzoic Acid

To a solution of 21.3 parts of 2-bromo-1,3-diethylbenzene in 200 parts n-hexane is added 6.4 parts of n-butyllithium. The mixture is refluxed for 6 hrs then poured onto solid carbon dioxide. To the mixture is added 50 parts of 10 percent sodium hydroxide solution. The aqueous phase is separated, washed once with hexane and acidified with concentrated sulfuric acid. The resulting precipitate is collected, washed with water and recrystallized from a suitable solvent, affording pure 2,6-diethylbenzoic acid.

PART C

3-Bromo-2,6-diethylbenzoic Acid

To a solution of 17.8 parts of 2,6-diethylbenzoic acid and 3 parts of iron powder in 300 parts of chloroform is added portionwise, with cooling and exclusion of light, 16 parts of bromine in 25 parts of chloroform. The mixture is stirred at 25°C for 1 hr then refluxed for 3 hrs. The resulting solution is freed of solvent by vacuum distillation and the residue is taken up in hot 10 percent sodium hydroxide solution. The cooled basic solution is washed with ether and acidified. The resulting precipitate is collected, washed with water and recrystallized from a suitable solvent, affording essentially pure 3-bromo-2,6-diethylbenzoic acid.

PART D

Methyl 3-bromo-2,6-diethylbenzoate

A mixture of 25.7 parts of 3-bromo-2,6-diethylbenzoic acid, 5 parts of concentrated sulfuric acid and 32 parts of methanol is refluxed for 1 hr. The cooled reaction mixture is diluted to three times its volume with methylene chloride. The aqueous layer is separated, and the methylene chloride solution is shaken with water, and then with sodium carbonate solution until neutral, and again with water. The organic phase is dried and the solution concentrated in vacuo. The residue is fractionated affording pure methyl 3-bromo-2,6-diethylbenzoate as one of the fractions.

PART E

Methyl 3-cyano-2,6-diethylbenzoate

To a solution of 27.1 parts of methyl-3-bromo-2,6-diethylbenzoate in 50 parts of N-methylpyrrolidinone is added 9 parts of cuprous cyanide. The mixture is heated to 200°C for 1 hr, cooled and transferred to 200 parts ice water. The resulting solid is collected, washed with water and transferred to 100 parts fresh water to which is then added a solution of 50 parts potassium cyanide in 70 parts of water. The mixture is stirred for 5 minutes; then, 300 parts of methylene chloride is added, and stirring is continued for an additional hour. The methylene chloride solution is separated, washed with water, dried, decolorized, and concentrated. The residue is fractionally distilled affording essentially pure methyl 3-cyano-2,6-diethylbenzoate as one of the fractions.

PART F 2,4-Diethylisophthalic Acid

A mixture of 22 parts of methyl 3-cyano-2,6-diethylbenzoate and 50 parts of 100 percent sulfuric acid is warmed on a steam bath for 1 hr, then poured into ice water. The resulting precipitate is collected, washed with water and taken up on 10 percent sodium hydroxide. The basic solution is washed with ether and acidified. The resulting essentially pure 2,4-diethylisophthalic acid is collected, washed with water and dried.

PART G 2,4-Diethyl-1,3-xylylene dichloride

The title compound is prepared by substituting an equivalent weight of 2,4-diethylisophthalic acid for 2-ethylisophthalic acid in the procedure of Example 1, Parts C and D.

The following 1,3-xylylene dichlorides can be prepared from the listed 2-bromo-1,3-dialkylbenzenes by the procedure of Example 2.

TABLE II

| Starting Material | Product |
| --- | --- |
| 2-bromo-3-tert-butyltoluene | 4-tert-butyl-2-methyl-1,3-xylylene dichloride |
| 2-bromo-3-ethylcumene | 2-ethyl-4-isopropyl-1,3-xylylene dichloride |
| 2-bromo-1,3-cusapropylbenzene | 2,4-diisopropyl-1,3-xylylene dichloride |
| 2-bromo-1,3-di-tert-butylbenzene | 2,4-di-tert-butyl-1,3-xylylene dichloride |
| 2-bromo-3-tert-butylcumene | 4-tert-butyl-2-isopropyl-1,3-xylylene dichloride |
| 2-bromo-3-tert-butylpropylbenzene | 4-tert-butyl-2-propyl-1,3-xylylene dichloride |
| 2-bromo-1,3-di-sec-butylbenzene | 2,4-di-sec-butyl-1,3-xylylene dichloride |
| 2-bromo-(1,1,2,2-tetramethylpropyl)ethylbenzene | 2-ethyl-4-(1,1,2,2-tetramethylpropyl)-1,3-xylylene dichloride |
| 2-bromo-3-(1,1,2-trimethyl)cumene | 2-isopropyl-4-(1,1,2-trimethylpropyl)-1,3-xylylene dichloride |
| 2-bromo-3-tert-pentylisobutylbenzene | 2-isobutyl-4-tert-pentyl-1,3-xylylene dichloride |
| 2-bromo-3-sec-butylisobutylbenzene | 4-sec-butyl-2-isobutyl-1,3-xylylene dichloride |
| 2-bromo-3-sec-butylcumene | 4-sec-butyl-2-isopropyl-1,3-xylylene dichloride |

EXAMPLE 3

Preparation of 2,5-Diisobutyl-1,4-xylylene dichloride

A suitable reaction vessel is charged with 26 parts of p-diisobutylbenzene, 9 parts of paraformaldehyde and 9 parts of zinc chloride. A rapid stream of dry hydrogen chloride is passed into the vigorously stirred mixture at 55°–60°C. Three parts of paraformaldehyde and 3 parts of zinc chloride are added at 1.5 hr. intervals four times. After the last addition, the reaction is continued for 1½ hrs. then the mixture is cooled to room temperature, diluted with water and ether. The organic layer is separated, washed three times with dilute hydrochloric acid and once with saturated sodium bicarbonate solution. The organic phase is dried and concentrated. Pentane is added to the residue and small amounts of insolubles are separated. The solution is cooled slowly to −70°C. The resulting colorless crystals are collected affording 22 parts of 2,5-diisobutyl-1,4-xylylene dichloride having m.p. 33°–34°C.

The following 1,3 and 1,4-xylylene dichlorides can be prepared by substituting the listed aromatic hydrocarbon for p-diisobutylbenzene of Example 3.

TABLE III

| Starting Material | Product |
| --- | --- |
| p-diisopropylbenzene | 2,5-diisopropyl-1,4-xylylene dichloride, m.p. 129–131°C |
| p-dipropylbenzene | 2,5-dipropyl-1,4-xylylene dichloride |
| p-di-sec-butylbenzene | 2,5-di-sec-butyl-1,4-xylylene dichloride, b.p. 112°C/0.1 mm |
| p-di-tert-butylbenzene | 2,5-di-tert-butyl-1,4-xylylene dichloride |
| p-neopentyltoluene | 2-methyl-5-neopentyl-1,4-xylylene dichloride |
| p-ethylpropylbenzene | 2-ethyl-5-propyl-1,4-xylylene dichloride |
| p-ethylisobutylbenzene | 2-ethyl-5-isobutyl-1,4-xylylene dichloride |
| p-isobutyltoluene | 2-isobutyl-5-methyl-1,4-xylylene dichloride |
| p-isobutylneopentylbenzene | 2-isobutyl-5-neopentyl-1,4-xylylene dichloride |
| p-isobutylpropylbenzene | 2-isobutyl-5-propyl-1,4-xylylene dichloride |
| m-tert-butylethylbenzene | 4-tert-butyl-6-ethyl-1,3-xylylene dichloride |
| m-tert-butyltoluene | 4-tert-butyl-6-methyl-1,3-xylylene dichloride |
| m-tert-butylpropylbenzene | 4-tert-butyl-6-propyl-1,3-xylylene dichloride |
| m-tert-butylcumene | 4-tert-butyl-6-isopropyl-1,3-xylylene dichloride |
| m-tert-butylisobutylbenzene | 4-tert-butyl-6-isobutyl-1,3-xylylene dichloride |
| m-sec-butyl-tert-butylbenzene | 4-sec-butyl-6-tert-butyl-1,3-xylylene dichloride |
| m-di-tert-butylbenzene | 4,6-di-tert-butyl-1,3-xylylene dichloride |
| m-diisobutylbenzene | 4,6-diisobutyl-1,3-xylylene dichloride |
| m-di-sec-butylbenzene | 4,6-di-sec-butyl-1,3-xylylene dichloride |
| m-dipropylbenzene | 4,6-dipropyl-1,3-xylylene dichloride |
| m-isobutylcumene | 4-isobutyl-6-isopropyl-1,3-xylylene dichloride |
| m-sec-butylcumene | 4-sec-butyl-6-isopropyl-1,3-xylylene dichloride |
| m-tert-pentylcumene | 4-isopropyl-6-tert-pentyl-1,3-xylylene dichloride |
| m-(1,1,2,2-tetramethylpropyl)toluene | 4-methyl-6-(1,1,2,2-tetramethylpropyl)-1,3-xylylene dichloride |
| m-(1,1,2-trimethylpropyl)ethylbenzene | 4-ethyl-6-(1,1,2-trimethylpropyl)-1,3-xylylene dichloride |
| m-sec-butylisobutylbenzene | 4-sec-butyl-6-isobutyl-1,3-xylylene dichloride |
| m-propylcumene | 4-isopropyl-6-propyl-1,3-xylylene dichloride |
| m-neopentylcumene | 4-isopropyl-6-neopentyl-1,3-xylylene dichloride |

When the alkyl groups of the p-dialkylbenzene are different and one is a primary alkyl group and the other a secondary or tertiary alkyl group, two isomers are obtained. A 2,5-dialkyl-1,3-xylylene dichloride is obtained along with smaller amounts of a 2,5-dialkyl-1,4-xylylene dichloride. When the alkyl groups are different and either secondary or tertiary, a mixture of 2,5-dialkyl-1,3-xylylene dichloride and 2,5-dialkyl-1,4-xylylene dichloride is obtained, the ratio of isomers depending on the branched alkyl groups present. The isomers can be separated from these mixtures by fractional crystallizations, fractional distillations and chromatography. The mixtures are also useful both as intermediates to benzenediacetonitriles and as herbicides in their own right.

EXAMPLE 4

Preparation of 5-tert-Butyl-2-isopropyl-1,3-xylylene dichloride and 2-tert-Butyl-5-isopropyl-1,4-xylylene dichloride Into a mixture of 880 parts p-tert-butylcumene, 300 parts paraformaldehyde, and 300 parts of zinc chloride is passed dry hydrogen chloride at 65°C until the mixture is saturated. The mixture is stirred at 70°–73°C for 1 hour. Additional 300 parts of paraformaldehyde and 300 parts of zinc chloride are added. The mixture is again saturated with hydrogen chloride and stirred 1 hour at 70°–73°C, then the final addition of 300 parts of paraformaldehyde and 300 parts of zinc chloride is made. The resulting mixture is stirred at 70°–73°C with continuous passage of hydrogen chloride through it for 22 hours. To the mixture are added 250 parts of ice and 2,400 parts of concentrated hydrochloric acid. The mixture is separated and extracted with pentane. The organic phase is washed sequentially with concentrated hydrochloric acid, 6N hydrochloric acid, sodium bicarbonate solution and water. The organic phase is separated, dried and fractionated, affording essentially pure 5-tert-butyl- 2-isopropyl-1,3-xylylene dichloride as one of the fractions. Resolution of adjacent fractions by gas chromatography using, for example, "SE-30" silicone fluid on "Chromosorb W" results in the isolation of 2-tert-butyl-5-isopropyl-1,4-xylylene dichloride.

The following mixtures of 1,3-xylylene dichlorides and 1,4-xylylene dichlorides are prepared by substituting the listed aromatic hydrocarbon for p-tert-butylcumene of Example 4.

The following 1,3 and 1,4-xylylene dibromides are prepared by the procedure of Example 3 by substituting the listed aromatic hydrocarbon and hydrogen bromide for p-diisobutylbenzene and hydrogen chloride.

TABLE V

| Starting Material | Product |
| --- | --- |
| p-diisopropylbenzene | 2,5-diisopropyl-1,4-xylylene dibromide |
| p-diisobutylbenzene | 2,5-diisobutyl-1,4-xylylene dibromide |
| p-di-tert-butylbenzene | 2,5-di-tert-butyl-1,4-xylylene dibromide |
| p-isobutylisopropylbenzene | 2-isobutyl-5-isopropyl-1,4-xylylene dibromide |
| p-tert-butylisopropylbenzene | 2-tert-butyl-5-isopropyl-1,4-xylylene dibromide |
| p-neopentyltoluene | 2-methyl-5-neopentyl-1,4-xylylene dibromide |
| p-di-sec-butylbenzene | 2,5-di-sec-butyl-1,4-xylylene dibromide |
| m-tert-butylethylbenzene | 4-tert-butyl-6-ethyl-1,3-xylylene dibromide |
| m-tert-butylcumene | 4-tert-butyl-6-isopropyl-1,3-xylylene dibromide |
| m-tert-butylisobutylbenzene | 4-tert-butyl-6-isobutyl-1,3-xylylene dibromide |
| 1,3-di-tert-butylbenzene | 4,6-di-tert-butyl-1,3-xylylene dibromide |
| 1,3-diisobutylbenzene | 4,6-diisobutyl-1,3-xylylene dibromide |
| 1,3-di-sec-butylbenzene | 4,6-di-sec-butyl-1,3-xylylene dibromide |

EXAMPLE 5

Preparation of 5-Isobutyl-1,3-Xylylene difluoride

TABLE IV

| Starting Material | Product |
| --- | --- |
| p-tert-pentyltoluene | 2-methyl-5-tert-pentyl-1,3-xylylene dichloride<br>2-methyl-5-tert-pentyl-1,4-xylylene dichloride |
| p-tert-butyltoluene | 5-tert-butyl-2-methyl-1,3-xylylene dichloride, m.p. 75–76°<br>2-tert-butyl-5-methyl-1,4-xylylene dichloride |
| p-(1,1,2-trimethylpropyl)toluene | 2-methyl-5-(1,1,2-trimethylpropyl)-1,3-xylylene dichloride<br>2-methyl-5-(1,1,2-trimethylpropyl)-1,4-xylylene dichloride |
| p-tert-butylethylbenzene | 5-tert-butyl-2-ethyl-1,3-xylylene dichloride<br>2-tert-butyl-5-ethyl-1,4-xylylene dichloride |
| p-ethyl-tert-pentylbenzene | 2-ethyl-5-tert-pentyl-1,3-xylylene dichloride<br>2-ethyl-5-tert-pentyl-1,4-xylylene dichloride |
| p-(1,2-dimethylpropyl)ethylbenzene | 5-(1,2-dimethylpropyl)-2-ethyl-1,3-xylylene dichloride<br>2-(1,2-dimethylpropyl)-5-ethyl-1,4-xylylene dichloride |
| p-(1,1,2-trimethylpropyl)ethylbenzene | 2-ethyl-5-(1,1,2-trimethylpropyl)-1,3-xylylene dichloride<br>2-ethyl-5-(1,1,2-trimethylpropyl)-1,4-xylylene dichloride |
| p-tert-butylpropylbenzene | 5-tert-butyl-2-propyl-1,3-xylylene dichloride<br>2-tert-butyl-5-propyl-1,4-xylylene dichloride |
| p-tert-pentylpropylbenzene | 5-tert-pentyl-2-propyl-1,3-xylylene dichloride<br>2-tert-pentyl-5-propyl-1,4-xylylene dichloride |
| p-(1,2,2-trimethylpropyl)propylbenzene | 2-propyl-5-(1,2,2-trimethylpropyl)-1,3-xylylene dichloride<br>2-propyl-5-(1,2,2-trimethylpropyl)-1,4-xylylene dichloride |
| p-(1,1,2-trimethylpropyl)propylbenzene | 2-propyl-5-(1,1,2-trimethylpropyl)-1,3-xylylene dichloride<br>2-propyl-5-(1,1,2-trimethylpropyl)-1,4-xylylene dichloride |
| p-propylcumene | 5-isopropyl-2-propyl-1,3-xylylene dichloride<br>2-isopropyl-5-propyl-1,4-xylylene dichloride |
| p-isobutylcumene | 2-isobutyl-5-isopropyl-1,3-xylylene dichloride<br>2-isobutyl-5-isopropyl-1,4-xylylene dichloride m.p. 24–26°C |
| p-sec-butylcumene | 5-sec-butyl-2-isopropyl-1,3-xylylene dichloride<br>2-sec-butyl-5-isopropyl-1,4-xylylene dichloride |
| p-tert-pentylcumene | 5-tert-pentyl-2-isopropyl-1,3-xylylene dichloride<br>2-tert-pentyl-5-isopropyl-1,4-xylylene dichloride |
| p-(1,1,2-trimethylpropyl)cumene | 2-isopropyl-5-(1,1,2-trimethylpropyl)-1,3-xylylene dichloride<br>2-isopropyl-5-(1,1,2-trimethylpropyl)-1,4-xylylene dichloride |
| p-(1,1,2,2-tetramethylpropyl)cumene | 2-isopropyl-5-(1,1,2,2-tetramethylpropyl)-1,3-xylylene dichloride<br>2-isopropyl-5-(1,1,2,2-tetramethylpropyl)-1,4-xylylene dichloride |
| p-tert-butylisobutylbenzene | 5-tert-butyl-2-isobutyl-1,3-xylylene dichloride<br>2-tert-butyl-5-isobutyl-1,4-xylylene dichloride |
| p-tert-butylneopentylbenzene | 5-tert-butyl-2-neopentyl-1,3-xylylene dichloride<br>2-tert-butyl-5-neopentyl-1,4-xylylene dichloride |
| p-sec-butyl-tert-butylbenzene | 2-sec-butyl-5-tert-butyl-1,3-xylylene dichloride<br>2-sec-butyl-5-tert-butyl-1,4-xylylene dichloride |
| p-(1,2-dimethylpropyl)tert-butylbenzene | 5-tert-butyl-2-(1,2-dimethylpropyl)-1,3-xylylene dichloride<br>2-tert-butyl-5-(1,2-dimethylpropyl)-1,4-xylylene dichloride |
| p-sec-butylpropylbenzene | 5-sec-butyl-2-propyl-1,3-xylylene dichloride<br>2-sec-butyl-5-propyl-1,4-xylylene dichloride |
| p-sec-butylisobutylbenzene | 5-sec-butyl-2-isobutyl-1,3-xylylene dichloride<br>2-sec-butyl-5-isobutyl-1,4-xylylene dichloride, b.p. 135°C/0.05 mm |
| cymene | 5-isopropyl-2-methyl-1,3-xylylene dichloride<br>2-isopropyl-5-methyl-1,4-xylylene dichloride |

A mixture of 23.1 parts of 5-isobutyl-1,3-xylylene dichloride and 10 parts of potassium fluoride in 50 parts of tetramethylene sulfone is stirred at 100°C for 12 hrs then cooled and poured into ice water. The resulting organic phase is extracted with ether, washed with water and dried. The solvent is removed under reduced pressure and the residue distilled affording essentially pure 5-isobutyl-1,3-xylylene difluoride.

EXAMPLE 6

Preparation of 4-Isopropyl-6-isobutyl-1,3-xylylene diiodide

A mixture of 3.6 parts of 4-isopropyl-6-isobutyl-1,3-xylylene dichloride and 3.2 parts of potassium iodide in 10 parts of tetramethylene sulfone is stirred at 100°C for 24 hrs, then cooled and poured into ice water. The organic phase is extracted with ether, washed with water and dried. The solvent is removed under reduced pressure. The residue is passed through a column chromatograph packed with silica gel or Florisil from which is isolated pure 4-isopropyl-6-isobutyl-1,3-xylylene diiodide as one of the fractions.

Other 1,3 and 1,4-xylylene diiodides and xylylene difluorides can be prepared by contacting the listed xylylene dichlorides with the appropriate alkali iodide or fluoride by the procedures of Examples 5 or 6.

TABLE VI

| Starting Material | Product |
| --- | --- |
| 4,6-diisobutyl-1,3-xylylene dichloride | 4,6-diisobutyl-1,3-xylylene difluoride |
| 4,6-di-tert-butyl-1,3-xylylene dichloride | 4,6-di-tert-butyl-1,3-xylylene difluoride |
| 4,6-di-sec-butyl-1,3-xylylene dichloride | 4,6-di-sec-butyl-1,3-xylylene difluoride |
| 4,6-diisopropyl-1,3-xylylene dichloride | 4,6-diisopropyl-1,3-xylylene difluoride |
| 4-tert-butyl-6-isopropyl-1,3-xylylene dichloride | 4-tert-butyl-6-isopropyl-1,3-xylylene difluoride |
| 4-isobutyl-6-isopropyl-1,3-xylylene dichloride | 4-isobutyl-6-isopropyl-1,3-xylylene difluoride |
| 2-tert-butyl-5-methyl-1,4-xylylene dichloride | 2-tert-butyl-5-methyl-1,4-xylylene difluoride |
| 2,5-diisobutyl-1,4-xylylene dichloride | 2,5-diisobutyl-1,4-xylylene difluoride |
| 2,5-di-tert-butyl-1,4-xylylene dichloride | 2,5-di-tert-butyl-1,4-xylylene difluoride |
| 2-tert-butyl-5-isopropyl-1,4-xylylene dichloride | 2-tert-butyl-5-isopropyl-1,4-xylylene difluoride |
| 3-tert-butyl-5-ethyl-1,4-xylylene dichloride | 3-tert-butyl-5-ethyl-1,4-xylylene difluoride |
| 4,6-diisobutyl-1,3-xylylene dichloride | 4,6-diisobutyl-1,3-xylylene diiodide |
| 4,6-di-tert-butyl-1,3-xylylene dichloride | 4,6-di-tert-butyl-1,3-xylylene diiodide |
| 4-tert-butyl-6-isopropyl-1,3-xylylene dichloride | 4-tert-butyl-6-isopropyl-1,3-xylylene diiodide |
| 4-tert-butyl-6-isobutyl-1,3-xylylene dichloride | 4-tert-butyl-6-isobutyl-1,3-xylylene diiodide |
| 2,5-diisopropyl-1,4-xylylene dichloride | 2,5-diisopropyl-1,4-xylylene diiodide |
| 2,5-diisobutyl-1,4-xylylene dichloride | 2,5-diisobutyl-1,4-xylylene diiodide |
| 2,5-di-tert-butyl-1,4-xylylene dichloride | 2,5-di-tert-butyl-1,4-xylylene diiodide |
| 2,5-di-sec-butyl-1,4-xylylene dichloride | 2,5-di-sec-butyl-1,4-xylylene diiodide |

EXAMPLE 7

2,4-Diethyl-6-isopropyl-1,3-xylylene dichloride

A mixture of 18 parts of 1,3-diethyl-5-isopropylbenzene and 32 parts of chloromethyl methyl ether is diluted with 60 parts of carbon disulfide and cooled to 0°C. To the stirred solution is added 18 parts of stannic chloride. The reaction is stirred at room temperature for 6 hours. It is poured on ice and the organic layer is separated and dried. Removal of the solvent and distillation of the residue gives 2,4-diethyl-6-isopropyl-1,3-xylylene dichloride.

The listed xylylene dichlorides are prepared from the appropriate trialkylbenzenes as follows:

TABLE VII

| Starting Material | Product |
| --- | --- |
| 1,3,5-triethylbenzene | 2,4,6-triethyl-1,3-xylylene dichloride |
| 1,3,5-triisopropylbenzene | 2,4,6-triisopropyl-1,3-xylylene dichloride, m.p. 103–105°C |
| 1,3,5-tri-sec-butylbenzene | 2,4,6-tri-sec-butyl-1,3-xylylene dichloride |
| 5-isopropyl-1,3-dimethylbenzene | 6-isopropyl-2,4-dimethyl-1,3-xylylene dichloride |
| 5-tert-butyl-1,3-dimethylbenzene | 6-tert-butyl-2,4-dimethyl-1,3-xylylene dichloride |
| 5-tert-butyl-1,3-diethylbenzene | 6-tert-butyl-2,4-diethyl-1,3-xylylene dichloride |

EXAMPLE 8

Preparation of 3,5-Dipropyl-1,4-xylylene dichloride

PART A 3,5-Dipropylterephthalic Acid

This compound is prepared according to the procedure of Gilman et.al., J. Am. Chem. Soc., 62, 2332 (1940).

To a solution of 32 parts of 1,4-dibromo-3,5-dipropylbenzene in 100 parts of hexane is added 26 parts of n-butyllithium. The mixture is refluxed 20 hours then is cooled and poured onto excess solid carbon dioxide. The resulting solid is recrystallized to give 3,5-dipropylterephthalic acid.

PART B 3,5-Dipropyl-1,4-benzenedimethanol

To a suspension of 38 parts of lithium aluminum hydride in 200 parts of anhydrous tetrahydrofuran is added dropwise a solution of 105 parts of 3,5-dipropylterephthalic acid. The resulting mixture is refluxed 2 hours, cooled in an ice bath, and ethyl acetate added slowly to destroy excess lithium aluminum hydride. The mixture is diluted with 600 parts ether, washed sequentially with 6N hydrochloric acid, 10 percent aqueous sodium hydroxide, and saturated sodium chloride solution. The organic phase is separated, dried and stripped of solvent, affording 3,5-dipropyl-1,4-benzenedimethanol of suitable purity for chlorination to 3,5-dipropyl-1,4-xylylene dichloride.

PART C 3,5-Dipropyl-1,4-xylylene dichloride

To a solution of 48 parts of 3,5-dipropyl-1,4-benzenedimethanol in 200 parts benzene is added a catalytic amount of dimethylformamide and dropwise 57 parts of thionyl chloride. The mixture is refluxed on a steam bath until the evolution of gases ceases. The mixture is stripped of solvent affording suitably pure 3,5-dipropyl-1,4-xylylene dichloride.

The following 1,4-xylylene dichlorides can be prepared from the listed 1,4-dibromobenzenes by the reaction sequence shown in Example 8.

TABLE VIII

| Starting Material | Product |
|---|---|
| ert-butyl-5-ethyl-1,4-romobenzene | 3-tert-butyl-5-ethyl-1,4-xylylene dichloride |
| -diisopropyl-1,4-romobenzene | 3,5-diisopropyl-1,4-xylylene dichloride |
| -di-tert-butyl-1,4-romobenzene | 3,5-di-tert-butyl-1,4-xylylene dichloride |
| ert-butyl-5-methyl-1,4-romobenzene | 3-tert-butyl-5-methyl-1,4-xylylene dichloride |
| -di-sec-butyl-1,4-romobenzene | 3,5-di-sec-butyl-1,4-xylylene dichloride |
| ert-butyl-5-isopropyl-1,4-romobenzene | 3-tert-butyl-5-isopropyl-1,4-xylylene dichloride |
| ec-butyl-5-isopropyl-1,4-romobenzene | 3-sec-butyl-5-isopropyl-1,4-xylylene dichloride |
| opropyl-5-methyl-1,4-romobenzene | 3-isopropyl-5-methyl-1,4-xylylene dichloride |
| ec-butyl-5-tert-butyl-1,4-romobenzene | 3-sec-butyl-5-tert-butyl-1,4-xylylene dichloride |
| -diisobutyl-1,4-romobenzene | 3,5-diisobutyl-1,4-xylylene dichloride |
| ert-butyl-5-isobutyl-1,4-romobenzene | 3-tert-butyl-5-isobutyl-1,4-xylylene dichloride |
| ec-butyl-5-isobutyl-1,4-romobenzene | 3-sec-butyl-5-isobutyl-1,4-xylylene dichloride |
| obutyl-5-isopropyl-1,4-romobenzene | 3-isobutyl-5-isopropyl-1,4-xylylene dichloride |
| ert-butyl-5-propyl-1,4-romobenzene | 3-tert-butyl-5-propyl-1,4-xylylene dichloride |
| 1,2-dimethylpropyl)-5-propyl-1,4-dibromobenzene | 3-(1,2-dimethylpropyl)-5-isopropyl-1,4-xylylene dichloride |
| ethyl-5-(1,1,2-nethylpropyl)-1,4-romobenzene | 3-methyl-5-(1,1,2-trimethylpropyl)-1,4-xylylene dichloride |
| thyl-5-(1,1,2,2-amethylpropyl)-1,4-romobenzene | 3-ethyl-5-(1,1,2,2-tetramethylpropyl)-1,4-xylylene dichloride |

EXAMPLE 9

-Bromo-3,5-diisopropyl-1,4-xylylene dichloride and 5-Bromo-2,4-diisopropyl-1,3-xylylene dichloride A mixture of 241 parts of 1-bromo-2,4-diisopropylnzene [prepared by bromination of m-diisopropylnzene with bromine according to a general procere given in Rec. Trav. Chim., 85, 457 (1966)] and 5 parts of bis(chloromethyl)ether is treated at −12°C th 260 parts of chlorosulfonic acid. The mixture is rred at −12°C for 1 hr and at room temperature for rs. The liquid is drowned in water and washed with cold hexane and water. The isomeric title compounds are separated by fractional crystallization.

By employing the following dialkylmonohalo- or dialkyldihalobenzenes in the procedure of Example 9 the following 1,3- and 1,4-xylylene dichlorides can be obtained.

EXAMPLE 10

Preparation of 2-Chloro-5-propyl-1,4-xylylene dichloride, 2-Chloro-3-propyl-1,4-xylylene dichloride, and 2-Chloro-6-propyl-1,4-xylylene dichloride To a mixture of 66 parts of 2-propyl-1,4-xylylene dichloride and 5 parts of iodine in 400 parts of carbon tetrachloride is added 23 parts of chlorine. The solution is stirred at room temperature for 6 hours with exclusion of light, then washed with water and dilute sodium bisulfite solution. The organic phase is separated, dried and concentrated. The residue is eluted through a column packed with silica gel or Florisil to afford 2-chloro-5-propyl-1,4-xylylene dichloride, 2-chloro-3-propyl-1,4-xylylene dichloride and a small amount of 2-chloro-6-propyl-1,4-xylylene dichloride as three of the fractions.

EXAMPLE 11

Preparation of 4,5-Dichloro-2-propyl-1,3-xylylene dichloride and 4,6-Dichloro-2-propyl-1,3-xylylene dichloride To a solution of 50 parts of 4-chloro-2-propyl-1,3-xylylene dichloride in 250 parts of chloroform is added 4 parts of iodine and 16 parts of chlorine. The mixture is refluxed in the absence of light for 5 hours, then washed with water and dilute aqueous sodium bisulfite solution. The chloroform solution is dried and concentrated. The residue is column chromatographed and 4,5-dichloro-2-propyl-1,3-xylylene dichloride and a small amount of 4,6-dichloro-2-propyl-1,3-xylylene dichloride are isolated as two of the fractions.

The following chlorinated 1,3- and 1,4-xylylene dichlorides can be prepared from the listed xylylene dichlorides by the procedure of Examples 10 and 11.

TABLE IX

| Starting Material | Product |
|---|---|
| 1-bromo-2,5-diisopropylbenzene | 3-bromo-2,5-diisopropyl-1,4-xylylene dichloride |
|  | 4-bromo-2,5-diisopropyl-1,3-xylylene dichloride |
| 1,4-di-tert-butyl-2,5-dichlorobenzene | 2,5-di-tert-butyl-3,6-dichloro-1,4-xylylene dichloride |
| 1,5-dibromo-2,4-diisopropylbenzene | 2,6-dibromo-3,5-diisopropyl-1,4-xylylene dichloride |
| 1-bromo-2,6-diisopropylbenzene | 5-bromo-4,6-diisopropyl-1,3-xylylene dichloride |
| 1-chloro-3,5-diisopropylbenzene | 4-chloro-2,6-diisopropyl-1,3-xylylene dichloride |
|  | 2-chloro-4,6-diisopropyl-1,3-xylylene dichloride |
| 1-bromo-4-chloro-2,6-diisopropylbenzene | 5-bromo-2-chloro-4,6-diisopropyl-1,3-xylylene dichloride |
| 1,2-dichloro-3,5-diisopropylbenzene | 5,6-dichloro-2,4-diisopropyl-1,3-xylylene dichloride |
| 1,4-dibromo-2,5-dineopentylbenzene | 2,5-dibromo-3,6-dineopentyl-1,4-xylylene dichloride |
| 1,4-dibromo-2-ethyl-5-sec-butylbenzene | 2,5-dibromo-3-ethyl-6-sec-butyl-1,4-xylylene dichloride |
| 2-tert-butyl-1,4-dichloro-5-isopropylbenzene | 3-tert-butyl-2,5-dichloro-6-isopropyl-1,4-xylylene dichloride |
| 2-sec-butyl-1,4-dichloro-5-isopropylbenzene | 3-sec-butyl-2,5-dichloro-6-isopropyl-1,4-xylylene dichloride |
| 1,4-dibromo-2-isobutyl-5-tert-butylbenzene | 2,5-dibromo-3-isobutyl-6-tert-butyl-1,4-xylylene dichloride |
| 3,5-di-sec-butyl-1-chlorobenzene | 4,6-di-sec-butyl-2-chloro-1,3-xylylene dichloride |
| 3,5-diisobutyl-1-chlorobenzene | 4,6-diisobutyl-2-chloro-1,3-xylylene dichloride |
| 3-tert-butyl-1-chloro-5-ethylbenzene | 4-tert-butyl-2-chloro-6-ethyl-1,3-xylylene dichloride |
| 3-sec-butyl-5-tert-butyl-1-chlorobenzene | 4-sec-butyl-6-tert-butyl-2-chloro-1,3-xylylene dichloride |
| 1-chloro-2,4-diisopropylbenzene | 2-chloro-3,5-diisopropyl-1,4-xylylene dichloride |
| 4-tert-butyl-1-chloro-2-isobutylbenzene | 5-tert-butyl-2-chloro-3-isobutyl-1,4-xylylene dichloride |
| 1-bromo-2-tert-butyl-4-isobutylbenzene | 5-bromo-4-tert-butyl-2-isobutyl-1,3-xylylene dichloride |
| 1,3-dichloro-2,5-diisopropylbenzene | 4,5-dichloro-2,6-diisopropyl-1,3-xylylene dichloride |
| 1,3-dibromo-5-tert-butyl-2-isobutylbenzene | 4,6-dibromo-2-tert-butyl-5-isobutyl-1,3-xylylene dichloride |

TABLE X

| Starting Material | Product |
|---|---|
| 2-isobutyl-1,4-xylylene dichloride | 2-chloro-5-isobutyl-1,4-xylylene dichloride |
| | 2-chloro-3-isobutyl-1,4-xylylene dichloride |
| | 2-chloro-6-isobutyl-1,4-xylylene dichloride |
| 2-isopropyl-1,4-xylylene dichloride | 2-bromo-5-isopropyl-1,4-xylylene dichloride |
| | 2-bromo-3-isopropyl-1,4-xylylene dichloride |
| | 2-bromo-6-isopropyl-1,4-xylylene dichloride |
| 2-tert-butyl-1,4-xylylene dichloride | 2-tert-butyl-5-chloro-1,4-xylylene dichloride |
| | 2-tert-butyl-3-chloro-1,4-xylylene dichloride |
| | 2-tert-butyl-6-chloro-1,4-xylylene dichloride |
| 4-propyl-1,3-xylylene dichloride | 2-bromo-4-propyl-1,3-xylylene dichloride |
| | 6-bromo-4-propyl-1,3-xylylene dichloride |
| | 5-bromo-4-propyl-1,3-xylylene dichloride |
| 4-sec-butyl-1,3-xylylene dichloride | 4-sec-butyl-2-chloro-1,3-xylylene dichloride |
| | 4-sec-butyl-6-chloro-1,3-xylylene dichloride |
| | 4-sec-butyl-5-chloro-1,3-xylylene dichloride |
| 4-isobutyl-1,3-xylylene dichloride | 2-chloro-4-isobutyl-1,3-xylylene dichloride |
| | 6-chloro-4-isobutyl-1,3-xylylene dichloride |
| | 5-chloro-4-isobutyl-1,3-xylylene dichloride |
| 2-isopropyl-1,3-xylylene dichloride | 5-chloro-2-isopropyl-1,3-xylylene dichloride |
| | 4-chloro-2-isopropyl-1,3-xylylene dichloride |
| 2-ethyl-1,3-xylylene dichloride | 5-chloro-2-ethyl-1,3-xylylene dichloride |
| | 4-chloro-2-ethyl-1,3-xylylene dichloride |
| 5-propyl-1,3-xylylene dichloride | 2-chloro-5-propyl-1,3-xylylene dichloride |
| | 4-chloro-5-propyl-1,3-xylylene dichloride |
| 5-isobutyl-1,3-xylylene dichloride | 2-chloro-5-isobutyl-1,3-xylylene dichloride |
| | 4-chloro-5-isobutyl-1,3-xylylene dichloride |

EXAMPLE 12

Preparation of
3,6-Dichloro-2,5-diisopropyl-1,4-xylylene dichloride

To a suspension of 15 parts of 2,5-diisopropyl-1,4-xylylene dichloride and 2 parts of iodine in 350 parts of hexane is added 142 parts of chlorine. The mixture is stirred at room temperature for 10 hours with exclusion of light from the reaction vessel. The resulting solution is washed with water, saturated aqueous sodium bisulfite, and water, stripped of solvent and allowed to stand. Pure 3,6-dichloro-2,5-diisopropyl-1,4-xylylene dichloride, m.p. 135°–137°C, separates upon standing.

By employing the following dialkyl-1,3- and 1,4-xylylene dichlorides, these products are obtained.

TABLE XI

| Starting Material | Product |
|---|---|
| 4-chloro-5-ethyl-1,3-xylylene dichloride | 4,6-dichloro-5-ethyl-1,3-xylylene dichloride |
| | 2,4-dichloro-5-ethyl-1,3-xylylene dichloride |
| 4-chloro-5-isopropyl-1,3-xylylene dichloride | 6-bromo-4-chloro-5-isopropyl-1,3-xylylene dichloride |
| | 2-bromo-4-chloro-5-isopropyl-1,3-xylylene dichloride |
| 4-bromo-5-sec-butyl-1,3-xylylene dichloride | 4,6-dibromo-5-sec-butyl-1,3-xylylene dichloride |
| | 2,4-dibromo-5-sec-butyl-1,3-xylylene dichloride |
| 4-chloro-5-isobutyl-1,3-xylylene dichloride | 4,6-dichloro-5-isobutyl-1,3-xylylene dichloride |
| | 2,4-dichloro-5-isobutyl-1,3-xylylene dichloride |
| 4-chloro-2-propyl-1,3-xylylene dichloride | 4,6-dichloro-2-propyl-1,3-xylylene dichloride |
| | 4,5-dichloro-2-propyl-1,3-xylylene dichloride |
| 4-bromo-2-sec-butyl-1,3-xylylene dichloride | 4-bromo-2-sec-butyl-6-chloro-1,3-xylylene dichloride |
| | 4-bromo-2-sec-butyl-5-chloro-1,3-xylylene dichloride |
| 4-chloro-2-isobutyl-1,3-xylylene dichloride | 4,6-dichloro-2-isobutyl-1,3-xylylene dichloride |
| | 4,5-dichloro-2-isobutyl-1,3-xylylene dichloride |
| 2-chloro-4-ethyl-1,3-xylylene dichloride | 2,5-dichloro-4-ethyl-1,3-xylylene dichloride |
| | 2,6-dichloro-4-ethyl-1,3-xylylene dichloride |
| 2-bromo-4-propyl-1,3-xylylene dichloride | 2,5-dibromo-4-propyl-1,3-xylylene dichloride |
| | 2,6-dibromo-4-propyl-1,3-xylylene dichloride |
| 2-bromo-4-isopropyl-1,3-xylylene dichloride | 2-bromo-5-chloro-4-isopropyl-1,3-xylylene dichloride |
| | 2-bromo-6-chloro-4-isopropyl-1,3-xylylene dichloride |
| 4-chloro-6-ethyl-1,3-xylylene dichloride | 5,6-dichloro-4-ethyl-1,3-xylylene dichloride |
| 4-tert-butyl-6-chloro-1,3-xylylene dichloride | 4-tert-butyl-5,6-dichloro-1,3-xylylene dichloride |
| 4-sec-butyl-6-chloro-1,3-xylylene dichloride | 4-sec-butyl-5,6-dichloro-1,3-xylylene dichloride |
| 2-chloro-6-propyl-1,4-xylylene dichloride | 2,5-dichloro-3-propyl-1,4-xylylene dichloride |
| | 2,3-dichloro-5-propyl-1,4-xylylene dichloride |
| 2-chloro-6-isobutyl-1,4-xylylene dichloride | 2,5-dichloro-3-isobutyl-1,4-xylylene dichloride |
| | 2,3-dichloro-5-isobutyl-1,4-xylylene dichloride |
| 2-bromo-6-sec-butyl-1,4-xylylene dichloride | 2-bromo-5-chloro-3-sec-butyl-1,4-xylylene dichloride |
| | 2-bromo-3-chloro-5-sec-butyl-1,4-xylylene dichloride |
| 2-chloro-5-ethyl-1,4-xylylene dichloride | 3,5-dichloro-2-ethyl-1,4-xylylene dichloride |
| 2-chloro-5-isopropyl-1,4-xylylene dichloride | 3,5-dichloro-2-isopropyl-1,4-xylylene dichloride |
| 2-chloro-5-isobutyl-1,4-xylylene dichloride | 3,5-dichloro-2-isobutyl-1,4-xylylene dichloride |
| 2,5-di-tert-butyl-1,4-xylylene dichloride | 2,5-di-tert-butyl-3,6-dichloro-1,4-xylylene dichloride |
| 2,5-diisobutyl-1,4-xylylene dichloride | 3,6-dichloro-2,5-diisobutyl-1,4-xylylene dichloride |
| 2,5-di-sec-butyl-1,4-xylylene dichloride | 2,5-di-sec-butyl-3,6-dichloro-1,4-xylylene dichloride |
| 2-isobutyl-5-isopropyl-1,4-xylylene dichloride | 3,6-dichloro-2-isobutyl-5-isopropyl-1,4-xylylene dichloride |
| 2-sec-butyl-5-isopropyl-1,4-xylylene dichloride | 2-sec-butyl-3,6-dichloro-5-isopropyl-1,4-xylylene dichloride |
| 3,5-diisopropyl-1,4-xylylene dichloride | 2,6-dichloro-3,5-diisopropyl-1,4-xylylene dichloride |
| 3,5-diisobutyl-1,4-xylylene dichloride | 2,6-dichloro-3,5-diisobutyl-1,4-xylylene dichloride |
| 3,5-di-sec-butyl-1,4-xylylene dichloride | 3,5-di-sec-butyl-2,6-dichloro-1,4-xylylene dichloride |
| 3-isobutyl-5-isopropyl-1,4-xylylene dichloride | 2,6-dichloro-3-isobutyl-5-isopropyl-1,4-xylylene dichloride |
| 4,6-diisopropyl-1,3-xylylene dichloride | 2,5-dichloro-4,6-diisopropyl-1,3-xylylene dichloride |
| 4,6-diisobutyl-1,3-xylylene dichloride | 2,5-dichloro-4,6-diisobutyl-1,3-xylylene dichloride |
| 4,6-di-sec-butyl-1,3-xylylene dichloride | 4,6-di-sec-butyl-2,5-dichloro-1,3-xylylene dichloride |

TABLE XI-Continued

| Starting Material | Product |
| --- | --- |
| 4-isobutyl-6-isopropyl-1,3-xylylene dichloride | 2,5-dichloro-4-isobutyl-6-isopropyl-1,3-xylylene dichloride |
| 2,4-diisopropyl-1,3-xylylene dichloride | 5,6-dichloro-2,4-diisopropyl-1,3-xylylene dichloride |
| 2,4-diisobutyl-1,3-xylylene dichloride | 5,6-dichloro-2,4-diisobutyl-1,3-xylylene dichloride |
| 2,4-di-sec-butyl-1,3-xylylene dichloride | 2,4-di-sec-butyl-5,6-dichloro-1,3-xylylene dichloride |
| 2-isobutyl-4-isopropyl-1,3-xylylene dichloride | 5,6-dichloro-2-isobutyl-4-isopropyl-1,3-xylylene dichloride |
| 2,5-diisopropyl-1,3-xylylene dichloride | 4,6-dichloro-2,5-diisopropyl-1,3-xylylene dichloride |
| 2,5-diisobutyl-1,3-xylylene dichloride | 4,6-dichloro-2,5-diisobutyl-1,3-xylylene dichloride |
| 2,5-di-sec-butyl-1,3-xylylene dichloride | 4,6-di-sec-butyl-4,6-dichloro-1,3-xylylene dichloride |
| 2-isobutyl-5-isopropyl-1,3-xylylene dichloride | 4,6-dichloro-2-isobutyl-5-isopropyl-1,3-xylylene dichloride |

EXAMPLE 13

Preparation of 5-Nitro-4-propyl-1,3-xylylene dichloride

Thirty parts of o-nitropropylbenzene is dissolved in 30 parts of chloromethylmethyl ether to which is added dropwise with good agitation 50 parts of 60 percent fuming sulfuric acid [Bull. Chem. Soc., Japan, 43, 3299-3301 (1970)]. After completion of the vigorously exothermic reaction, the dark reaction mass is taken up in ice water and the product is extracted with benzene. The benzene solution is dried and then decolorized by chromatography on an alumina column. The title compound is recovered by evaporation of the solvent.

The following nitro-1,3-xylylene dichlorides can be prepared from the listed alkylnitrobenzenes by the procedure of Example 13.

TABLE XII

| Starting Material | Product |
| --- | --- |
| o-tert-butylnitrobenzene | 4-tert-butyl-5-nitro-1,3-xylylene dichloride |
| o-sec-butylnitrobenzene | 4-sec-butyl-5-nitro-1,3-xylylene dichloride |
| o-ethylnitrobenzene | 4-ethyl-5-nitro-1,3-xylylene dichloride |
| o-isopropylnitrobenzene | 4-isopropyl-5-nitro-1,3-xylylene dichloride |
| o-tert-amylnitrobenzene | 4-tert-amyl-5-nitro-1,3-xylylene dichloride |
| o-isobutylnitrobenzene | 4-isobutyl-5-nitro-1,3-xylylene dichloride |

EXAMPLE 14

Preparation of 2-Ethyl-5-nitro-1,3-xylylene Dichloride

PART A

2-Ethyl-5-nitroisophthalic Acid

To 38 parts of 90 percent nitric acid at 25°C is added portionwise 5 parts of 2-ethylisophthalic acid. After the initial exothermic reaction, the mixture is heated at 90°C for 1 hr, then cooled and poured onto ice. The resulting precipitate is collected and recrystallized from a suitable solvent, affording essentially pure 2-ethyl-5-nitroisophthalic acid.

PART B

2-Ethyl-5-nitro-1,3-benzenedimethanol

Into a refluxing solution of 21.5 parts of 2-ethyl-5-nitroisophthalic acid in 300 parts of tetrahydrofuran is bubbled diborane until the solution is saturated. Reflux is continued for 2 hrs and the solution is kept saturated by addition of diborane. The resulting mixture is cooled, diluted with 600 parts of ether and poured slowly onto ice. The organic phase is separated, washed with water, dilute sodium hydroxide solution and with water. The ethereal solution is separated, dried, and stripped of solvent affording essentially pure 2-ethyl-5-nitro-1,3-benzenedimethanol.

PART C

2-Ethyl-5-nitro-1,3-xylylene Dichloride

To a solution of 21 parts of 2-ethyl-5-nitro-1,3-benzenedimethanol in 100 parts of benzene is added a catalytic amount of dimethylformamide and dropwise 24 parts of thionyl chloride in 25 parts of benzene. The mixture is refluxed until evolution of gases ceases. The solvent is evaporated under reduced pressure affording suitably pure 2-ethyl-5-nitro-1,3-xylylene dichloride for conversion to 2-ethyl-5-nitro-1,3-benzenediacetonitrile.

The 1,3-xylylene dichlorides of Table XIII are prepared by the sequence of reactions outlined in Example 14, parts A-C, in which the listed 2-alkylisophthalic acid is substituted for 2-ethylisophthalic acid.

TABLE XIII

| 2-Alkylisophthalic Acid | 5-Nitro-2-alkyl-1,3-xylylene dichloride |
| --- | --- |
| 2-propylisophthalic acid | 2-propyl-5-nitro-1,3-xylylene dichloride |
| 2-isopropylisophthalic acid | 2-isopropyl-5-nitro-1,3-xylylene dichloride |
| 2-isobutylisophthalic acid | 2-isobutyl-5-nitro-1,3-xylylene dichloride |
| 2-sec-butylisophthalic acid | 2-sec-butyl-5-nitro-1,3-xylylene dichloride |
| 2-tert-butylisophthalic acid | 2-tert-butyl-5-nitro-1,3-xylylene dichloride |
| 2-(1,2-dimethylpropyl)isophthalic acid | 2-(1,2-dimethylpropyl)-5-nitro-1,3-xylylene dichloride |

EXAMPLE 15

Preparation of 2,5-Diisobutyl-1,4-benzenediacetonitrile

Into a mechanically stirred suspension of 10 parts of finely powdered sodium cyanide in 55 parts of dimethyl sulfoxide is added in small portions 20 parts of 2,5-diisobutyl-1,4-xylylene dichloride at 55°C. The temperature is controlled by the rate of addition of the dichloride and external cooling. After stirring for 0.5 hr at 55°C, the reaction mixture is poured into an ice and water mixture; the precipitate is collected; and the moist filter cake is taken up in methylene chloride and washed three times with dilute hydrochloric acid. The methylene chloride solution is treated with anhydrous magnesium sulfate and decolorizing charcoal, and the filtrate is concentrated on a steam bath. The residue is dissolved in a small volume of ether, and the resulting solution is cooled slowly to −50°C. The crystals are collected, washed with −70°C ether and dried at 25°C/16 mm/Hg over $P_2O_5$, affording 13.2 parts pure 2,5-diisobutyl-1,4-benzenediacetonitrile, m.p. 87°–89°C.

EXAMPLE 16

Preparation of 3,6-Dichloro-2,5-diisopropyl-1,4-benzenediacetonitrile

To a solution of 1/2 part sodium cyanide in 4 parts of dimethyl sulfoxide is added portionwise 1 part of 2,5-diisopropyl-3,6-dichloro-1,4-xylylene dichloride. The mixture is stirred 0.5 hr at 65°C then poured into ice water, affording crude 2,5-diisopropyl-3,6-dichloro-1,4-benzenediacetonitrile. Recrystallization from ethanol affords pure product of m.p. 182°–184°C.

EXAMPLE 17

Preparation of 4,6-Diisopropyl-1,3-benzenediacetonitrile

To a mechanically stirred suspension of 30 parts of sodium cyanide in 200 parts of dimethyl sulfoxide is added 38 parts of 4,6-diisopropyl-1,3-xylylene dichloride in small portions, the temperature being maintained at 60°C by controlling the rate of addition of the dichloride and by means of external cooling. The resulting reaction mixture is stirred at 60°–65°C for 0.5 hour and diluted to about 1 liter with ice and water; the solid benzenediacetonitrile is collected, washed with water, and dissolved in methylene chloride. The aqueous layer is separated, and the organic layer is treated with decolorizing charcoal and anhydrous magnesium sulfate. After concentration to a small volume, ether is added whereupon colorless crystals of 4,6-diisopropyl-1,3-benzenediacetonitrile separate. After cooling thoroughly in a bath at −30°C, the crystals are collected, washed with ether at −70°C and dried. The yield of benzenediacetonitrile melting at 116°–117°C is 30.7 parts (64 percent).

The NMR spectrum (CDCl$_3$/TMS) shows aromatic protons (singlet, 7.35 ppm), methylene protons (singlet, 3.25 ppm), methine protons (multiplet, 3.15 ppm) and methyl protons (doublet, 1.31 ppm) in ratio of 1:2:1:6.

EXAMPLE 18

Preparation of 2,4,6-Triisopropyl-1,3-benzenediacetonitrile

To a mechanically-stirred suspension of 3.5 parts sodium cyanide in 15 parts of dimethyl sulfoxide is added 7.3 parts of 2,4,6-triisopropyl-1,3-xylylene dichloride in small portions. The resulting reaction mixture is stirred at 50°C for 0.5 hr and, after dilution with ice and water, the solid is collected, washed thoroughly with cold water and taken up in methylene chloride. The organic layer is separated, treated with decolorizing charcoal and anhydrous magnesium sulfate. The filtrate is concentrated to a small volume and ether is added, whereupon colorless crystals of 2,4,6-triisopropyl-1,3-benzenediacetonitrile separate. After cooling thoroughly in a bath at −50°C, the crystals are collected, washed with ether at −70°C and dried. The yield of the diacetonitrile melting at 140°–142°C is 6.0 parts (91 percent).

The NMR spectrum (CDCl$_3$/TMS) shows an aromatic proton (singlet, 7.24 ppm), methylene protons (singlet, 3.80 ppm), methine protons (heptet, 3.35 ppm) and methyl protons (two overlapping doublets, 1.46, 1.26 ppm) in the ratio of 1:4:3:18.

EXAMPLE 19

Preparation of 2-Ethyl-5-nitro-1,3-benzenediacetonitrile

To a solution of 9.8 parts of sodium cyanide in 50 parts of dimethyl sulfoxide is added portionwise 24.8 parts of 2-ethyl-5-nitro-1,3-xylylene dichloride. The reaction mixture is stirred at 65°C for 0.5 hour then diluted with three times its volume of water. The resulting white solid is collected and recrystallized from a suitable solvent, affording pure 2-ethyl-5-nitro-1,3-benzenediacetonitrile.

The following 1,3- and 1,4-benzenediacetonitriles are prepared from the listed xylylene dichlorides by one or more of the procedures shown in Examples 15 through 19. Selected melting points in degrees centigrade are given in parentheses.

TABLE XIV

| Starting Material | Product |
| --- | --- |
| 2-ethyl-1,3-xylylene dichloride | 2-ethyl-1,3-benzenediacetonitrile |
| 2-propyl-1,3-xylylene dichloride | 2-propyl-1,3-benzenediacetonitrile |
| 2-isopropyl-1,3-xylylene dichloride | 2-isopropyl-1,3-benzenediacetonitrile |
| 2-sec-butyl-1,3-xylylene dichloride | 2-sec-butyl-1,3-benzenediacetonitrile |
| 2-tert-butyl-1,3-xylylene dichloride | 2-tert-butyl-1,3-benzenediacetonitrile |
| 2-isobutyl-1,3-xylylene dichloride | 2-isopropyl-1,3-benzenediacetonitrile |
| 2-ethyl-1,4-xylylene dichloride | 2-ethyl-1,4-benzenediacetonitrile |
| 2-propyl-1,4-xylylene dichloride | 2-propyl-1,4-benzenediacetonitrile |
| 2-isopropyl-1,4-xylylene dichloride | 2-isopropyl-1,4-benzenediacetonitrile |
| 2-sec-butyl-1,4-xylylene dichloride | 2-sec-butyl-1,4-benzenediacetonitrile |
| 2-tert-butyl-1,4-xylylene dichloride | 2-tert-butyl-1,4-benzenediacetonitrile |
| 2-isobutyl-1,4-xylylene dichloride | 2-isobutyl-1,4-benzenediacetonitrile |
| 4-ethyl-1,3-xylylene dichloride | 4-ethyl-1,3-benzenediacetonitrile |
| 4-propyl-1,3-xylylene dichloride | 4-propyl-1,3-benzenediacetonitrile |
| 4-isopropyl-1,3-xylylene dichloride | 4-isopropyl-1,3-benzenediacetonitrile |
| 4-sec-butyl-1,3-xylylene dichloride | 4-sec-butyl-1,3-benzenediacetonitrile |
| 4-tert-butyl-1,3-xylylene dichloride | 4-tert-butyl-1,3-benzenediacetonitrile |
| 4-isobutyl-1,3-xylylene dichloride | 4-isobutyl-1,3-benzenediacetonittrile |
| 5-ethyl-1,3-xylylene dichloride | 5-ethyl-1,3-benzenediacetonitrile |
| 5-propyl-1,3-xylylene dichloride | 5-propyl-1,3-benzenediacetonitrile |
| 5-isopropyl-1,3-xylylene dichloride | 5-isopropyl-1,3-benzenediacetonitrile |
| 5-sec-butyl-1,3-xylylene dichloride | 5-sec-butyl-1,3-benzenediacetonitrile |
| 5-tert-butyl-1,3-xylylene dichloride | 5-tert-butyl-1,3-benzenediacetonitrile |

TABLE XIV-Continued

| Starting Material | Product |
|---|---|
| 5-isobutyl-1,3-xylylene dichloride | 5-isobutyl-1,3-benzenediacetonitrile |
| 3-tert-butyl-5-methyl-1,4-xylylene dichloride | 3-tert-butyl-5-methyl-1,4-benzenediacetonitrile |
| 3-tert-butyl-5-ethyl-1,4-xylylene dichloride | 3-tert-butyl-5-ethyl-1,4-benzenediacetonitrile |
| 3,5-diisopropyl-1,4-xylylene dichloride | 3,5-diisopropyl-1,4-benzenediacetonitrile |
| 3,5-diisobutyl-1,4-xylylene dichloride | 3,5-diisobutyl-1,4-benzenediacetonitrile |
| 3,5-disec-butyl-1,4-xylylene dichloride | 3,5-disec-butyl-1,4-benzenediacetonitrile |
| 3,5-ditert-butyl-1,4-xylylene dichloride | 3,5-ditert-butyl-1,4-benzenediacetonitrile |
| 3,5-dipropyl-1,4-xylylene dichloride | 3,5-dipropyl-1,4-benzenediacetonitrile |
| 3-tert-butyl-5-propyl-1,4-xylylene dichloride | 3-tert-butyl-5-propyl-1,4-benzenediacetonitrile |
| 3-tert-butyl-5-isopropyl-1,4-xylylene dichloride | 3-tert-butyl-5-isopropyl-1,4-benzenediacetonitrile |
| 3-sec-butyl-5-tert-butyl-1,4-xylylene dichloride | 3-sec-butyl-5-tert-butyl-1,4-benzenediacetonitrile |
| 3-tert-butyl-5-isobutyl-1,4-xylylene dichloride | 3-tert-butyl-5-isobutyl-1,4-benzenediacetonitrile |
| 3-sec-butyl-5-isobutyl-1,4-xylylene dichloride | 3-sec-butyl-5-isobutyl-1,4-benzenediacetonitrile |
| 3-sec-butyl-5-isopropyl-1,4-xylylene dichloride | 3-sec-butyl-5-isopropyl-1,4-benzenediacetonitrile |
| 3-tert-butyl-5-propyl-1,4-xylylene dichloride | 3-tert-butyl-5-propyl-1,4-benzenediacetonitrile |
| 3-(1,2-dimethylpropyl)-5-isopropyl-1,4-xylylene dichloride | 3-(1,2-dimethylpropyl)-5-isopropyl-1,4-benzenediacetonitrile |
| 3-methyl-5-(1,1,2-trimethylpropyl)-1,4-xylylene dichloride | 3-methyl-5-(1,1,2-trimethylpropyl)-1,4-benzenediacetonitrile |
| 3-ethyl-5-(1,1,2,2-tetramethylpropyl)-1,4-xylylene dichloride | 3-methyl-5-(1,1,2,2-tetramethylpropyl)-1,4-benzenediacetonitrile |
| 2-isopropyl-5-methyl-1,4-xylylene dichloride | 2-isopropyl-5-methyl-1,4-benzenediacetonitrile |
| 2-tert-butyl-5-methyl-1,4-xylylene dichloride | 2-tert-butyl-5-methyl-1,4-benzenediacetonitrile |
| 2-(1,2-dimethylpropyl)-5-methyl-1,4-xylylene dichloride | 2-(1,2-dimethylpropyl)-5-methyl-1,4-benzenediacetonitrile |
| 2-ethyl-5-isobutyl-1,4-xylylene dichloride | 2-ethyl-5-isobutyl-1,4-benzenediacetonitrile |
| 2-(1,2-dimethylpropyl)-5-ethyl-1,4-xylylene dichloride | 2-(1,2-dimethylpropyl)-5-ethyl-1,4-benzenediacetonitrile, b.p. 165°C/0.1mm |
| 2-ethyl-5-(1,1,2,2-tetramethylpropyl)-1,4-xylylene dichloride | 2-ethyl-5-(1,1,2,2-tetramethylpropyl)-1,4-benzenediacetonitrile |
| 2,5-dipropyl-1,4-xylylene dichloride | 2,5-dipropyl-1,4-benzenediacetonitrile, (87–91) |
| 2-isopropyl-5-propyl-1,4-xylylene dichloride | 2-isopropyl-5-propyl-1,4-benzenediacetonitrile |
| 2-isobutyl-5-propyl-1,4-xylylene dichloride | 2-isobutyl-5-propyl-1,4-benzenediacetonitrile |
| 2-sec-butyl-5-propyl-1,4-xylylene dichloride | 2-sec-butyl-5-propyl-1,4-benzenediacetonitrile |
| 2-tert-butyl-5-propyl-1,4-xylylene dichloride | 2-tert-butyl-5-propyl-1,4-benzenediacetonitrile |
| 2,5-diisopropyl-1,4-xylylene dichloride | 2,5-diisopropyl-1,4-benzenediacetonitrile, (188–190) |
| 2-isobutyl-5-isopropyl-1,4-xylylene dichloride | 2-isobutyl-5-isopropyl-1,4-benzenediacetonitrile, (96–98) |
| 2-sec-butyl-5-isopropyl-1,4-xylylene dichloride | 2-sec-butyl-5-isopropyl-1,4-benzenediacetonitrile, (127–129) |
| 2-tert-butyl-5-isopropyl-1,4-xylylene dichloride | 2-tert-butyl-5-isopropyl-1,4-benzenediacetonitrile, (169–171) |
| 2-sec-butyl-5-isobutyl-1,4-xylylene dichloride | 2-sec-butyl-5-isobutyl-1,4-benzenediacetonitrile |
| 2-tert-butyl-5-isobutyl-1,4-xylylene dichloride | 2-tert-butyl-5-isobutyl-1,4-benzenediacetonitrile |
| 2,5-disec-butyl-1,4-xylylene dichloride | 2,5-disec-butyl-1,4-benzenediacetonitrile |
| 2-sec-butyl-5-tert-butyl-1,4-xylylene dichloride | 2-sec-butyl-5-tert-butyl-1,4-benzenediacetonitrile, (105–108) |
| 2-isopropyl-5-neopentyl-1,4-xylylene dichloride | 2-isopropyl-5-neopentyl-1,4-benzenediacetonitrile |
| 2-isopropyl-5-tert-pentyl-1,4-xylylene dichloride | 2-isopropyl-5-tert-pentyl-1,4-benzenediacetonitrile |
| 2-isobutyl-5-tert-pentyl-1,4-xylylene dichloride | 2-isobutyl-5-tert-pentyl-1,4-benzenediacetonitrile |
| 2,5-ditert-butyl-1,4-xylylene dichloride | 2,5-ditert-butyl-1,4-benzenediacetonitrile, (189–191) |
| 2-methyl-5-(1,1,2-trimethylpropyl)-1,4-xylylene dichloride | |
| 2-methyl-5-(1,1,2-trimethylpropyl)-1,4-benzenediacetonitrile | |
| 2-methyl-5-neopentyl-1,4-xylylene dichloride | 2-methyl-5-neopentyl-1,4-benzenediacetonitrile |
| 2-ethyl-5-propyl-1,4-xylylene dichloride | 2-ethyl-5-propyl-1,4-benzenediacetonitrile |
| 2-isobutyl-5-neopentyl-1,4-xylylene dichloride | 2-isobutyl-5-neopentyl-1,4-benzenediacetonitrile |
| 2-tert-butyl-5-ethyl-1,4-xylylene dichloride | 2-tert-butyl-5-ethyl-1,4-benzenediacetonitrile |
| 2-ethyl-5-tert-pentyl-1,4-xylylene dichloride | 2-ethyl-5-tert-pentyl-1,4-benzenediacetonitrile |
| 2-tert-pentyl-5-propyl-1,4-xylylene dichloride | 2-tert-pentyl-5-propyl-1,4-benzenediacetonitrile |
| 2-propyl-5-(1,2,2-trimethylpropyl)1,4-xylylene dichloride | 2-propyl-5-(1,2,2-trimethylpropyl)-1,4-benzenediacetonitrile |
| 2-isopropyl-5-(1,1,2-trimethylpropyl)-1,4-xylylene dichloride | 2-isopropyl-5-(1,1,2-trimethylpropyl)-1,4-benzenediacetonitrile |
| 2-isopropyl-5-(1,1,2,2-tetramethylpropyl)-1,4-xylylene dichloride | 2-isopropyl-5-(1,1,2,2-tetramethylpropyl)-1,4-benzenediacetonitrile |
| 2-tert-butyl-5-neopentyl-1,4-xylylene dichloride | 2-tert-butyl-5-neopentyl-1,4-benzenediacetonitrile |
| 2-tert-butyl-5-(1,2-dimethylpropyl)-1,4-xylylene dichloride | 2-tert-butyl-5-(1,2-dimethylpropyl)-1,4-benzenediacetonitrile |
| 4,6-diethyl-1,3-xylylene dichloride | 4,6-diethyl-1,3-benzenediacetonitrile |
| 4,6-dipropyl-1,3-xylylene dichloride | 4,6-dipropyl-1,3-benzenediacetonitrile |
| 4,6-diisopropyl-1,3-xylylene dichloride | 4,6-diisopropyl-1,3-benzenediacetonitrile, (116–117) |
| 4,6-diisobutyl-1,3-xylylene dichloride | 4,6-diisobutyl-1,3-benzenediacetonitrile |
| 4,6-di-tert-butyl-1,3-xylylene dichloride | 4,6-di-tert-butyl-1,3-benzenediacetonitrile |
| 4,6-di-sec-butyl-1,3-xylylene dichloride | 4,6-di-sec-butyl-1,3-benzenediacetonitrile, b.p. 170°C/0.1mm |
| 4-(1,2-dimethylpropyl)-6-ethyl-1,3-xylylene dichloride | 4-(1,2-dimethylpropyl)-6-ethyl-1,3-benzenediacetonitrile |
| 4-tert-butyl-6-propyl-1,3-xylylene dichloride | 4-tert-butyl-6-propyl-1,3-benzenediacetonitrile |
| 4-tert-butyl-6-isopropyl-1,3-xylylene dichloride | 4-tert-butyl-6-isopropyl-1,3-benzenediacetonitrile |
| 4-tert-butyl-6-isobutyl-1,3-xylylene dichloride | 4-tert-butyl-6-isobutyl-1,3-benzenediacetonitrile |
| 4-sec-butyl-6-tert-butyl-1,3-xylylene dichloride | 4-sec-butyl-6-tert-butyl-1,3-benzenediacetonitrile |
| 4-sec-butyl-6-isobutyl-1,3-xylylene dichloride | 4-sec-butyl-6-isobutyl-1,3-benzenediacetonitrile |
| 4-isobutyl-6-isopropyl-1,3-xylylene dichloride | 4-isobutyl-6-isopropyl-1,3-benzenediacetonitrile |
| 4-sec-butyl-6-isopropyl-1,3-xylylene dichloride | 4-sec-butyl-6-isopropyl-1,3-benzenediacetonitrile |
| 4-tert-butyl-6-methyl-1,3-xylylene dichloride | 4-tert-butyl-6-methyl-1,3-benzenediacetonitrile |
| 4-isopropyl-6-tert-pentyl-1,3-xylylene dichloride | 4-isopropyl-6-tert-pentyl-1,3-benzenediacetonitrile |
| 4-methyl-6-(1,1,2,2-tetramethylpropyl)-1,3-xylylene dichloride | 4-methyl-6-(1,1,2,2-tetramethylpropyl)-1,3-benzenediacetonitrile |
| 4-ethyl-6-(1,1,2-trimethylpropyl)-1,3-xylylene dichloride | |
| 4-ethyl-6-(1,1,2-trimethylpropyl)-1,3-benzenediacetonitrile | |
| 4-isopropyl-6-propyl-1,3-dixylylene dichloride | 4-isopropyl-6-propyl-1,3-benzenediacetonitrile |
| 4-isopropyl-6-neopentyl-1,3-dixylylene dichloride | 4-isopropyl-6-neopentyl-1,3-benzenediacetonitrile |
| 5-isopropyl-2-methyl-1,3-xylylene dichloride | 5-isopropyl-2-methyl-1,3-benzenediacetonitrile |
| 2-methyl-5-tert-pentyl-1,3-xylylene dichloride | 2-methyl-5-tert-pentyl-1,3-benzenediacetonitrile, (102–103) |
| 2-methyl-5-(1,1,2-trimethylpropyl)-1,3-xylylene dichloride | 2-methyl-5-(1,1,2-trimethylpropyl)-1,3-benzenediacetonitrile |
| 5-tert-butyl-2-ethyl-1,3-xylylene dichloride | 5-tert-butyl-2-ethyl-1,3-benzenediacetonitrile, (105–107) |
| 2-ethyl-5-tert-pentyl-1,3-xylylene dichloride | 2-ethyl-5-tert-pentyl-1,3-benzenediacetonitrile, (60–61) |
| 5-(1,2-dimethylpropyl)-2-ethyl-1,3-xylylene dichloride | 5-(1,2-dimethylpropyl)-2-ethyl-1,3-benzenediacetonitrile |
| 2-ethyl-5-(1,1,2-trimethylpropyl)-1,3-xylylene dichloride | 2-ethyl-5-(1,1,2-trimethylpropyl)-1,3-benzenediacetonitrile, (54–55) |
| 5-tert-butyl-2-propyl-1,3-xylylene dichloride | 5-tert-butyl-2-propyl-1,3-benzenediacetonitrile, (92–94) |
| 5-tert-pentyl-2-propyl-1,3-xylylene dichloride | 5-tert-pentyl-2-propyl-1,3-benzenediacetonitrile, (65–67) |
| 2-propyl-5-(1,2,2-trimethylpropyl)-1,3-xylylene dichloride | 2-propyl-5-(1,2,2-trimethylpropyl)-1,3-benzenediacetonitrile |
| 2-propyl-5-(1,1,2-trimethylpropyl)-1,3-xylylene dichloride | 2-propyl-5-(1,1,2-trimethylpropyl)-1,3-benzenediacetonitrile, (67–68) |
| 5-isopropyl-2-propyl-1,3-xylylene dichloride | 5-isopropyl-2-propyl-1,3-benzenediacetonitrile |
| 2-isobutyl-5-isopropyl-1,3-xylylene dichloride | 2-isobutyl-5-isopropyl-1,3-benzenediacetonitrile |

TABLE XIV-Continued

| Starting Material | Product |
|---|---|
| 5-sec-butyl-2-propyl-1,3-xylylene dichloride | 5-sec-butyl-2-propyl-1,3-benzenediacetonitrile |
| 5-tert-butyl-2-isopropyl-1,3-xylylene dichloride | 5-tert-butyl-2-isopropyl-1,3-benzenediacetonitrile, (117–119) |
| 5-sec-butyl-2-isopropyl-1,3-xylylene dichloride | 5-sec-butyl-2-isopropyl-1,3-benzenediacetonitrile |
| 2-isopropyl-5-tert-pentyl-1,3-xylylene dichloride | 2-isopropyl-5-tert-pentyl-1,3-benzenediacetonitrile |
| 2-isopropyl-5-(1,1,2-trimethylpropyl)-1,3-xylylene dichloride | 2-isopropyl-5-(1,1,2-trimethylpropyl)-1,3-benzenediacetonitrile, (77–79) |
| 2-isopropyl-5-(1,1,2,2-tetramethylpropyl)-1,3-xylylene dichloride | 2-isopropyl-5-(1,1,2,2-tetramethylpropyl)-1,3-benzene-diacetonitrile |
| 5-tert-butyl-2-isobutyl-1,3-xylylene dichloride | 5-tert-butyl-2-isobutyl-1,3-benzenediacetonitrile, (84–85) |
| 5-tert-butyl-2-neopentyl-1,3-xylylene dichloride | 5-tert-butyl-2-neopentyl-1,3-benzenediacetonitrile |
| 2-sec-butyl-5-tert-butyl-1,3-xylylene dichloride | 2-sec-butyl-5-tert-butyl-1,3-benzenediacetonitrile b.p. 170°C/0.05mm |
| 4-tert-butyl-2-methyl-1,3-xylylene dichloride | 4-tert-butyl-2-methyl-1,3-benzenediacetonitrile |
| 4-isopropyl-2-ethyl-1,3-xylylene dichloride | 2-ethyl-4-isopropyl-1,3-benzenediacetonitrile |
| 2,4-diisopropyl-1,3-xylylene dichloride | 2,4-diisopropyl-1,3-benzenediacetonitrile |
| 2,4-di-tert-butyl-1,3-xylylene dichloride | 2,4-di-tert-butyl-1,3-benzenediacetonitrile |
| 4-tert-butyl-2-isopropyl-1,3-xylylene dichloride | 4-tert-butyl-2-isopropyl-1,3-benzenediacetonitrile |
| 4-tert-butyl-2-propyl-1,3-xylylene dichloride | 4-tert-butyl-2-propyl-1,3-benzenediacetonitrile |
| 2,4-di-sec-butyl-1,3-xylylene dichloride | 2,4-di-sec-butyl-1,3-benzenediacetonitrile |
| 2-ethyl-4-(1,1,2,2-tetramethylpropyl)-1,3-xylylene dichloride | 2-ethyl-4-(1,1,2,2-tetramethylpropyl)-1,3-benzenediacetonitrile |
| 2-isopropyl-4-(1,1,2-trimethylpropyl)-1,3-xylylene dichloride | 2-isopropyl-4-(1,1,2-trimethylpropyl)-1,3-benzenediacetonitrile |
| 2-isobutyl-4-tert-pentyl-1,3-xylylene dichloride | 2-isobutyl-4-tert-pentyl-1,3-benzenediacetonitrile |
| 4-sec-butyl-2-isobutyl-1,3-xylylene dichloride | 4-sec-butyl-2-isobutyl-1,3-benzenediacetonitrile |
| 4-sec-butyl-2-isopropyl-1,3-xylylene dichloride | 4-sec-butyl-2-isopropyl-1,3-benzenediacetonitrile |
| 2-chloro-5-isobutyl-1,4-xylylene dichloride | 2-chloro-5-isobutyl-1,4-benzenediacetonitrile |
| 2-bromo-5-isopropyl-1,4-xylylene dichloride | 2-bromo-5-isopropyl-1,4-benzenediacetonitrile |
| 2-sec-butyl-5-chloro-1,4-xylylene dichloride | 2-sec-butyl-5-chloro-1,4-benzenediacetonitrile |
| 2-chloro-3-ethyl-1,4-xylylene dichloride | 2-chloro-3-ethyl-1,4-benzenediacetonitrile |
| 2-bromo-3-isopropyl-1,4-xylylene dichloride | 2-bromo-3-isopropyl-1,4-benzenediacetonitrile |
| 2-sec-butyl-3-chloro-1,4-xylylene dichloride | 2-sec-butyl-3-chloro-1,4-benzenediacetonitrile |
| 2-chloro-6-isobutyl-1,4-xylylene dichloride | 2-chloro-6-isobutyl-1,4-benzenediacetonitrile |
| 2-bromo-6-isopropyl-1,4-xylylene dichloride | 2-bromo-6-isopropyl-1,4-benzenediacetonitrile |
| 2-sec-butyl-6-chloro-1,4-xylylene dichloride | 2-sec-butyl-6-chloro-1,4-benzenediacetonitrile |
| 2-bromo-4-propyl-1,3-xylylene dichloride | 2-bromo-4-propyl-1,3-benzenediacetonitrile |
| 4-tert-butyl-2-chloro-1,3-xylylene dichloride | 4-tert-butyl-2-chloro-1,3-benzenediacetonitrile |
| 4-sec-butyl-2-chloro-1,3-xylylene dichloride | 4-sec-butyl-2-chloro-1,3-benzenediacetonitrile |
| 4-bromo-6-isopropyl-1,3-xylylene dichloride | 4-bromo-6-isopropyl-1,3-benzenediacetonitrile |
| 4-tert-butyl-6-chloro-1,3-xylylene dichloride | 4-tert-butyl-6-chloro-1,3-benzenediacetonitrile |
| 4-chloro-6-isobutyl-1,3-xylylene dichloride | 4-chloro-6-isobutyl-1,3-benzenediacetonitrile |
| 5-bromo-4-propyl-1,3-xylylene dichloride | 5-bromo-4-propyl-1,3-benzenediacetonitrile |
| 4-sec-butyl-5-chloro-1,3-xylylene dichloride | 4-sec-butyl-5-chloro-1,3-benzenediacetonitrile |
| 5-chloro-4-isobutyl-1,3-xylylene dichloride | 5-chloro-4-isobutyl-1,3-benzenediacetonitrile |
| 5-chloro-2-isopropyl-1,3-xylylene dichloride | 5-chloro-2-isopropyl-1,3-benzenediacetonitrile |
| 5-chloro-2-isobutyl-1,3-xylylene dichloride | 5-chloro-2-isobutyl-1,3-benzenediacetonitrile |
| 5-bromo-2-sec-butyl-1,3-xylylene dichloride | 5-bromo-2-sec-butyl-1,3-benzenediacetonitrile |
| 4-chloro-2-isopropyl-1,3-xylylene dichloride | 4-chloro-2-isopropyl-1,3-benzenediacetonitrile |
| 4-bromo-2-isobutyl-1,3-xylylene dichloride | 4-bromo-2-isobutyl-1,3-benzenediacetonitrile |
| 2-sec-butyl-4-chloro-1,3-xylylene dichloride | 2-sec-butyl-4-chloro-1,3-benzenediacetonitrile |
| 2-chloro-5-propyl-1,3-xylylene dichloride | 2-chloro-5-propyl-1,3-benzenediacetonitrile |
| 5-tert-butyl-2-chloro-1,3-xylylene dichloride | 5-tert-butyl-2-chloro-1,3-benzenediacetonitrile |
| 2-bromo-5-sec-butyl-1,3-xylylene dichloride | 2-bromo-5-sec-butyl-1,3-benzenediacetonitrile |
| 4-chloro-5-ethyl-1,3-xylylene dichloride | 4-chloro-5-ethyl-1,3-benzenediacetonitrile |
| 4,6-dichloro-5-ethyl-1,3-xylylene dichloride | 4,6-dichloro-5-ethyl-1,3-benzenediacetonitrile |
| 6-bromo-4-chloro-5-isopropyl-1,3-xylylene dichloride | 6-bromo-4-chloro-5-isopropyl-1,3-benzenediacetonitrile |
| 4,6-dibromo-5-sec-butyl-1,3-xylylene dichloride | 4,6-dibromo-5-sec-butyl-1,3-benzenediacetonitrile |
| 2,4-dichloro-5-ethyl-1,3-xylylene dichloride | 2,4-dichloro-5-ethyl-1,3-benzenediacetonitrile |
| 2-bromo-4-chloro-5-isopropyl-1,3-xylylene dichloride | 2-bromo-4-chloro-5-isopropyl-1,3-benzenediacetonitrile |
| 2,4-dichloro-5-isobutyl-1,3-xylylene dichloride | 2,4-dichloro-5-isobutyl-1,3-benzenediacetonitrile |
| 4,6-dichloro-2-propyl-1,3-xylylene dichloride | 4,6-dichloro-2-propyl-1,3-benzenediacetonitrile |
| 4-bromo-2-sec-butyl-6-chloro-1,3-xylylene dichloride | 4-bromo-2-sec-butyl-6-chloro-1,3-benzenediacetonitrile |
| 4,6-dichloro-2-isobutyl-1,3-xylylene dichloride | 4,6-dichloro-2-isobutyl-1,3-benzenediacetonitrile |
| 4,5-dichloro-2-propyl-1,3-xylylene dichloride | 4,5-dichloro-2-propyl-1,3-benzenediacetonitrile |
| 4-bromo-2-sec-butyl-5-chloro-1,3-xylylene dichloride | 4-bromo-2-sec-butyl-5-chloro-1,3-benzenediacetonitrile |
| 4,5-dichloro-2-isobutyl-1,3-xylylene dichloride | 4,5-dichloro-2-isobutyl-1,3-benzenediacetonitrile |
| 2,5-dichloro-4-ethyl-1,3-xylylene dichloride | 2,5-dichloro-4-ethyl-1,3-benzenediacetonitrile |
| 2,5-dibromo-4-propyl-1,3-xylylene dichloride | 2,5-dibromo-4-propyl-1,3-benzenediacetonitrile |
| 2-bromo-5-chloro-4-isopropyl-1,3-xylylene dichloride | 2-bromo-5-chloro-4-isopropyl-1,3-benzenediacetonitrile |
| 5,6-dichloro-4-ethyl-1,3-xylylene dichloride | 5,6-dichloro-4-ethyl-1,3-benzenediacetonitrile |
| 4-tert-butyl-5,6-dichloro-1,3-xylylene dichloride | 4-tert-butyl-5,6-dichloro-1,3-benzenediacetonitrile |
| 4-sec-butyl-5,6-dichloro-1,3-xylylene dichloride | 4-sec-butyl-5,6-dichloro-1,3-benzenediacetonitrile |
| 2,5-dichloro-3-propyl-1,4-xylylene dichloride | 2,5-dichloro-3-propyl-1,4-benzenediacetonitrile |
| 2,5-dichloro-3-isobutyl-1,4-xylylene dichloride | 2,5-dichloro-3-isobutyl-1,4-benzenediacetonitrile |
| 2-bromo-5-chloro-3-sec-butyl-1,4-xylylene dichloride | 2-bromo-5-chloro-3-sec-butyl-1,4-benzenediacetonitrile |
| 3,5-dichloro-2-ethyl-1,4-xylylene dichloride | 3,5-dichloro-2-ethyl-1,4-benzenediacetonitrile |
| 3,5-dichloro-2-isopropyl-1,4-xylylene dichloride | 3,5-dichloro-2-isopropyl-1,4-benzenediacetonitrile |
| 3,5-dichloro-2-isobutyl-1,4-xylylene dichloride | 3,5-dichloro-2-isobutyl-1,4-benzenediacetonitrile |
| 2,4-dichloro-6-isobutyl-1,3-xylylene dichloride | 2,4-dichloro-6-isobutyl-1,3-benzenediacetonitrile |
| 2-bromo-3,5-diisopropyl-1,4-xylylene dichloride | 2-bromo-3,5-diisopropyl-1,4-benzenediacetonitrile |
| 3-chloro-2,5-diisopropyl-1,4-xylylene dichloride | 3-chloro-2,5-diisopropyl-1,4-benzenediacetonitrile |
| 2,6-dibromo-3,5-diisopropyl-1,4-xylylene dichloride | 2,6-dibromo-3,5-diisopropyl-1,4-benzenediacetonitrile |
| 5-chloro-2,4-diisopropyl-1,3-xylylene dichloride | 5-chloro-2,4-diisopropyl-1,3-benzenediacetonitrile |
| 5-bromo-4,6-diisopropyl-1,3-xylylene dichloride | 5-bromo-4,6-diisopropyl-1,3-benzenediacetonitrile |
| 4-chloro-2,6-diisopropyl-1,3-xylylene dichloride | 4-chloro-2,6-diisopropyl-1,3-benzenediacetonitrile |
| 4-bromo-2,6-diisopropyl-1,3-xylylene dichloride | 4-bromo-2,6-diisopropyl-1,3-benzenediacetonitrile |
| 2-bromo-4,6-di-tert-butyl-1,3-xylylene dichloride | 2-bromo-4,6-di-tert-butyl-1,3-benzenediacetonitrile |
| 5-bromo-2-chloro-4,6-diisopropyl-1,3-xylylene dichloride | 5-bromo-2-chloro-4,6-diisopropyl-1,3-benzenediacetonitrile |
| 5,6-dichloro-2,4-diisopropyl-1,3-xylylene dichloride | 5,6-dichloro-2,4-diisopropyl-1,3-benzenediacetonitrile |
| 4,6-dichloro-2,5-diisopropyl-1,3-xylylene dichloride | 4,6-dichloro-2,5-diisopropyl-1,3-benzenediacetonitrile |
| 2,5-dibromo-3,6-dineopentyl-1,4-xylylene dichloride | 2,5-dibromo-3,6-dineopentyl-1,4-benzenediacetonitrile |
| 2,5-dibromo-3-ethyl-6-sec-butyl-1,4-xylylene dichloride | 2,5-dibromo-3-ethyl-6-sec-butyl-1,4-benzenediacetonitrile |
| 3-tert-butyl-2,5-dichloro-6-isopropyl-1,4-xylylene dichloride | 3-tert-butyl-2,5-dichloro-6-isopropyl-1,4-benzenediacetonitrile |
| 3-sec-butyl-2,5-dichloro-6-isopropyl-1,4-xylylene dichloride | 3-sec-butyl-2,5-dichloro-6-isopropyl-1,4-benzenediacetonitrile |
| 2,5-dibromo-3-isobutyl-6-tert-butyl-1,4-xylylene dichloride | 2,5-dibromo-3-isobutyl-6-tert-butyl-1,4-benzenediacetonitrile |
| 2,5-di-sec-butyl-3-chloro-1,4-xylylene dichloride | 2,5-di-sec-butyl-3-chloro-1,4-benzenediacetonitrile |
| 2,5-diisobutyl-3-chloro-1,4-xylylene dichloride | 2,5-diisobutyl-3-chloro-1,4-benzenediacetonitrile |

TABLE XIV-Continued

| Starting Material | Product |
|---|---|
| 3-tert-butyl-2,5-dichloro-6-ethyl-1,4-xylylene dichloride | 3-tert-butyl-2,5-dichloro-6-ethyl-1,4-benzenediacetonitrile |
| 4,6-di-sec-butyl-2-chloro-1,3-xylylene dichloride | 4,6-di-sec-butyl-2-chloro-1,3-benzenediacetonitrile |
| 4,6-diisobutyl-2-chloro-1,3-xylylene dichloride | 4,6-diisobutyl-2-chloro-1,3-benzenediacetonitrile |
| 4-tert-butyl-2-chloro-6-ethyl-1,3-xylylene dichloride | 4-tert-butyl-2-chloro-6-ethyl-1,3-benzenediacetonitrile |
| 4,6-dichloro-2,5-diisopropyl-1,3-xylylene dichloride | 4,6-dichloro-2,5-diisopropyl-1,3-benzenediacetonitrile |
| 2,4-dichloro-6-isopropyl-1,3-xylylene dichloride | 2,4-dichloro-6-isopropyl-1,3-benzenediacetonitrile |
| 6-tert-2,4-dichloro-1,3-xylylene dichloride | 6-tert-butyl-2,4-dichloro-1,3-benzenediacetonitrile |
| 6-sec-butyl-2,3-dichloro-1,4-xylylene dichloride | 6-sec-butyl-2,3-dichloro-1,4-benzenediacetonitrile |
| 6-sec-butyl-2,3-dichloro-1,4-xylylene dichloride | 6-sec-butyl-2,3-dichloro-1,4-benzenediacetonitrile |
| 2,3-dichloro-6-isobutyl-1,4-xylylene dichloride | 2,3-dichloro-6-isobutyl-1,4-benzenediacetonitrile |
| 4-bromo-5-isopropyl-1,3-xylylene dichloride | 4-bromo-5-isopropyl-1,3-benzenediacetonitrile |
| 5-tert-butyl-4-chloro-1,3-xylylene dichloride | 5-tert-butyl-4-chloro-1,3-benzenediacetonitrile |
| 2,4,6-triethyl-1,3-xylylene dichloride | 2,4,6-triethyl-1,3-benzenediacetonitrile |
| 2,4,6-triisopropyl-1,3-xylylene dichloride | 2,4,6-triisopropyl-1,3-benzenediacetonitrile |
| 2,4,6-tri-sec-butyl-1,3-xylylene dichloride | 2,4,6-tri-sec-butyl-1,3-benzenediacetonitrile |
| 6-isopropyl-2,4-dimethyl-1,3-xylylene dichloride | 6-isopropyl-2,4-dimethyl-1,3-benzenediacetonitrile |
| 6-tert-butyl-2,4-dimethyl-1,3-xylylene dichloride | 6-tert-butyl-2,4-dimethyl-1,3-benzenediacetonitrile |
| 6-tert-butyl-2,4-diethyl-1,3-xylylene dichloride | 6-tert-butyl-2,4-diethyl-1,3-benzenediacetonitrile |
| 5-tert-butyl-2-(1,2-dimethylpropyl)-1,3-xylylene dichloride | 5-tert-butyl-2-(1,2-dimethylpropyl)-1,3-benzenediacetonitrile |
| 5-sec-butyl-2-isobutyl-1,3-xylylene dichloride | 5-sec-butyl-2-isobutyl-1,3-benzenediacetonitrile |
| 2-isobutyl-5-tert-pentyl-1,3-xylylene dichloride | 2-isobutyl-5-tert-pentyl-1,3-benzenediacetonitrile, (68–72) |
| 2-isobutyl-5-(1,1,2-trimethylpropyl)-1,3-xylylene dichloride | 2-isobutyl-5-(1,1,2-trimethylpropyl)-1,3-benzenediacetonitrile, (50–52) |
| 5-nitro-2-propyl-1,3-xylylenedichloride | 5-nitro-2-propyl-1,3-benzenediacetonitrile |
| 2-isopropyl-5-nitro-1,3-xylylenedichloride | 2-isopropyl-5-nitro-1,3-benzenediacetonitrile |
| 2-isobutyl-5-nitro-1,3-xylylenedichloride | 2-isobutyl-5-nitro-1,3-benzenediacetonitrile |
| 2-sec-butyl-5-nitro-1,3-xylylenedichloride | 2-sec-butyl-5-nitro-1,3-benzenediacetonitrile |
| 2-tert-butyl-5-nitro-1,3-xylylenedichloride | 2-tert-butyl-5-nitro-1,3-benzenediacetonitrile |
| 2-(1,2-dimethylpropyl)-5-nitro-1,3-xylylenedichloride | 2-(1,2-dimethylpropyl)-5-nitro-1,3-benzenediacetonitrile |

EXAMPLE 20

5-Chloro-2,4,6-triisopropyl-1,3-benzenediacetonitrile

To a refluxing solution of 28.2 parts of 2,4,6-triisopropyl-1,3-benzenediacetonitrile and a trace of iodine in 500 parts of chloroform is added 7.1 parts of chlorine during 1 hr. The mixture is refluxed for 1 hr with exclusion of light. The reaction mixture is cooled, washed with water, dried, and stripped of solvent in vacuo, affording 5-chloro-2,4,6-triisopropyl-1,3-benzenediacetonitrile.

The following 1,3-benzenediacetonitriles are prepared by the procedure of Example 20

TABLE XV

| Starting Material | Product |
|---|---|
| 2,4,6-triethyl-1,3-benzenediacetonitrile | 5-chloro-2,4,6-triethyl-1,3-benzenediacetonitrile |
| 2,4,6-triisopropyl-1,3-benzenediacetonitrile | 5-chloro-2,4,6-triisopropryl-1,3-benzenediacetonitrile |
| 2,4,6-tri-sec-butyl-1,3-benzenediacetonitrile | 2,4,6-tri-sec-butyl-5-chloro-1,3-benzenediacetonitrile |
| 6-isopropyl-2,4-dimethyl-1,3-benzenediacetonitrile | 5-chloro-6-isopropyl-2,4-dimethyl-1,3-benzenediacetonitrile |
| 6-tert-butyl-2,4-dimethyl-1,3-benzenediacetonitrile | 5-bromo-6-tert-butyl-2,4-dimethyl-1,3-benzenediacetonitrile |
| 6-tert-butyl-2,4-diethyl-1,3-benzenediacetonitrile | 6-tert-butyl-5-chloro-2,4-diethyl-1,3-benzenediacetonitrile |

EXAMPLE 21

Preparation of 4-sec-Butyl-5-nitro-1,3-benzenediacetonitrile

To 50 parts of 90 percent nitric acid at 0°–5°C is added, in small portions, 5 parts of 4-sec-butyl-1,3-benzenediacetonitrile. The mixture is stirred at 0°–5°C for 2 hrs then is poured onto ice. The resulting solid is collected, washed with water. The crude solid is a mixture of products and can be purified by eluting its through a column packed with silica gel or Florisil affording as one fraction essentially pure 4-sec-butyl-5-nitro-1,3-benzenediacetonitrile.

EXAMPLE 22

Preparation of 6-Isopropyl-4-nitro-1,3-benzenediacetonitrile 7.2 Parts of 4,6-diisopropyl-1,3benzenediacetonitrile is added in small portions with stirring to 75 parts of 90 percent nitric acid at −10° to −5°C. The resulting solution is stirred at −5° to 0°C for 1.2 hrs, then the temperature is increased to 0° to 5°C and the solution stirred for 0.7 hrs. The resulting solution is poured into ice, and the solid material is collected and washed with water. The filter cake is dissolved in methylene chloride; the solution is treated with decolorizing charcoal and anhydrous magnesium sulfate, and the filtrate is concentrated to a small volume. Upon addition of ether, the 6-isopropyl-4-nitro-1,3-benzenediacetonitrile crystallizes. After cooling the mixture thoroughly in ice, the product is collected and washed with ether at −40°C. The product melts at 88°–90°C.

The NMR spectrum (CDCl$_3$/TMS) shows aromatic protons (two singlets, 8.18, 7.74 ppm), methylene protons (two singlets, 4.18, 3.92 ppm) and methine proton (multiplet, 3.20 ppm) and methyl protons (doublet, 1.32 ppm) in ratio of 1:1:2:2:1:6.

EXAMPLE 23

Preparation of 2-NItro-5-tert-butyl-1,3-benzenediacetonitrile

To 38 parts of 90 percent nitric acid at 0°–5°C is added portionwise 5 parts of 5-tert-butyl-1,3-benzenediacetonitrile. The reaction mixture is stirred at 0°C for 2 hrs then is poured onto ice. The resulting solid is collected and washed with water. Recrystallization from a suitable solvent affords pure 4-nitro-5-tert-butyl-1,3-benzenediacetonitrile.

EXAMPLE 24

Preparation of 2,4-Dinitro-5-isobutyl-1,3-benzenediacetonitrile

To 80 parts of 100 percent nitric acid is added portionwise 5 parts of 2-nitro-5-isobutyl-1,3-benzenediacetonitrile at such a rate that the temperature does not exceed 25°C. The mixture is heated on a steam bath for 2 hrs then cooled and poured over ice. The resulting solid is collected, washed with water and taken up in methylene chloride. The solution is washed sequentially with 5 percent sodium bicarbonate until neutral and with water, dried and stripped of solvent. Recrystallization from a suitable solvent affords essentially pure 2,4-dinitro-5-isobutyl-1,3-benzenediacetonitrile.

EXAMPLE 25

Preparation of 2,5-dinitro-4-propyl-1,3-benzenediacetonitrile

A mixture of 26 parts of 5-nitro-4-propyl-1,3-benzenediacetonitrile, 16 parts of nitronium tetrafluoroborate and 80 parts of tetramethylene sulfone is stirred under reflux and heated until the temperature of the liquid registers 100°–115°. This temperature is maintained for 1 hour and the mixture is then cooled and poured into crushed ice. The product is removed by filtration and is purified by recrystallization from alcohol.

EXAMPLE 26

3,6-Dinitro-2-propyl-1,4-benzenediacetonitrile

A mixture of 74 parts of nitronium tetrafluoroborate, 350 parts of tetramethylene sulfone and 105 parts of 2-nitro-6-propyl-1,4-benzenediacetonitrile is stirred under reflux and heated until a thermometer in the liquid registers 100°–115°C. This temperature is maintained for 1 hour and the mixture is then allowed to cool and poured into ice water. The solid product is removed by filtration.

EXAMPLE 27

4,6-Diisopropyl-2-nitro-1,3-benzenediacetonitrile and 4,6-Diisopropyl-5-nitro-1,3-benzenediacetonitrile To a solution of 12 parts (0.05 mole) of 4,6-diisopropyl-1,3-benzenediacetonitrile in 25 parts of anhydrous tetramethylene sulfone is added 6.5 parts (0.05 mole) of anhydrous nitronium tetrafluoroborate. The mixture is stirred ½ hour at room temperature and then poured into 200 parts of ice water. The resulting solid is collected and by means of fractional crystallization or by elution through a column packed with silica gel or Florisil is separated into two isomers, 4,6-diisopropyl-2-nitro-1,3-benzenediacetonitrile and 4,6-diisopropyl-5-nitro-1,3-benzenediacetonitrile.

EXAMPLE 28

Preparation of 2-Chloro-6-isobutyl-3-nitro-1,4-benzenediacetonitrile and 2-Chloro-6-isobutyl-5-nitro-1,4-benzenediacetonitrile To 100 parts of 90 percent nitric acid is added portionwise 15 parts of 2-chloro-6-isobutyl-1,4-benzenediacetonitrile at such a rate that the temperature does not exceed 30°C. The mixture is stirred for 2 hr at ambient temperature then poured into ice water. The organic phase is extracted with ether and the extract washed in turn with 2 percent NaOH until free of acid and then with water. The ethereal solution is dried and stripped of solvent by vaccuum distillation. The residue consists of a mixture of positional isomers which can be separated by eluting through a column packed with silica gel or alumina to afford essentially pure 2-chloro-6-isobutyl-3-nitro-1,4-benzenediacetonitrile and 2-chloro-6-isobutyl-5-nitro-1,4-benzenediacetonitrile as separate fractions.

EXAMPLE 29

Preparation of 3-Chloro-2,5-diisobutyl-6-nitro-1,4-benzenediacetonitrile

To 38 parts of 90 percent nitric acid is added portionwise 5 parts of 3-chloro-2,5-diisobutyl-1,4-benzenediacetonitrile at such a rate that the temperature does not exceed 45°C during the addition. The mixture is stirred at room temperature for 6 hr then warmed on a steam bath for ½ hr. The cooled solution is poured into ice water and the organic phase extracted with ether. The ethereal extract is washed sequentially with water, 2 percent sodium hydroxide, and water, then is dried and the solvent removed by vacuum distillation. The residue is recrystallized, affording pure 3-chloro-2,5-diisobutyl-6-nitro-1,4-benzenediacetonitrile.

The nitrated benzenediacetonitriles of Table XVI can be prepared by nitrating the listed 1,3- or 1,4-benzenediacetonitrile by one or more of the procedures shown in Examples 21, through 29. For cases in which more than one positional isomer is possible, separation can be effected by any of a number of physical methods including chromatography, fractional crystallization and distillation.

TABLE XVI

| Starting Material | Product |
| --- | --- |
| 4-ethyl-1,3-benzenediacetonitrile | 4-ethyl-5-nitro-1,3-benzenediacetonitrile |
| 4-propyl-1,3-benzenediacetonitrile | 4-propyl-5-nitro-1,3-benzenediacetonitrile |
| 4-isopropyl-1,3-benzenediacetonitrile | 4-isopropyl-5-nitro-1,3-benzenediacetonitrile |
| 4-isobutyl-1,3-benzenediacetonitrile | 4-isobutyl-2-nitro-1,3-benzenediacetonitrile |
| 4-tert-butyl-1,3-benzenediacetonitrile | 4-tert-butyl-2-nitro-1,3-benzenediacetonitrile |
| 4-sec-butyl-1,3-benzenediacetonitrile | 4-sec-butyl-2-nitro-1,3-benzenediacetonitrile |
| 2,4-diisopropyl-1,3-benzenediacetonitrile | 2-isopropyl-4-nitro-1,3-benzenediacetonitrile |
| 2-tert-butyl-4-isopropyl-1,3-benzenediacetonitrile | 2-tert-butyl-4-nitro-1,3-benzenediacetonitrile |
| 2-sec-butyl-4-isopropyl-1,3-benzenediacetonitrile | 2-sec-butyl-4-nitro-1,3-benzenediacetonitrile |
| 4-isopropyl-2-propyl-1,3-benzenediacetonitrile | 4-nitro-2-propyl-1,3-benzenediacetonitrile |
| 2,4-diisopropyl-1,3-benzenediacetonitrile | 2-isopropyl-4,6-dinitro-1,3-benzenediacetonitrile |
| 2-tert-butyl-4-isopropyl-1,3-benzenediacetonitrile | 2-tert-butyl-4,6-dinitro-1,3-benzenediacetonitrile |
| 2-sec-butyl-4-isopropyl-1,3-benzenediacetonitrile | 2-sec-butyl-4,6-dinitro-1,3-benzenediacetonitrile |
| 5-propyl-1,3-benzenediacetonitrile | 4-nitro-5-propyl-1,3-benzenediacetonitrile |
| 5-isopropyl-1,3-benzenediacetonitrile | 5-isopropyl-4-nitro-1,3-benzenediacetonitrile |
| 5-isobutyl-1,3-benzenediacetonitrile | 5-isobutyl-4-nitro-1,3-benzenediacetonitrile |
| 5-sec-butyl-1,3-benzenediacetonitrile | 5-sec-butyl-4-nitro-1,3-benzenediacetonitrile |

TABLE XVI-Continued

| Starting Material | Product |
|---|---|
| 5-(1,2-dimethylpropyl)-1,3-benzenediacetonitrile | 5-(1,2-dimethylpropyl)-4-nitro-1,3-benzenediacetonitrile |
| 5-ethyl-1,3-benzenediacetonitrile | 5-ethyl-4-nitro-1,3-benzenediacetonitrile |
| 5-ethyl-4-nitro-1,3-benzenediacetonitrile | 5-ethyl-2,4-dinitro-1,3-benzenediacetonitrile |
| 4-nitro-5-propyl-1,3-benzenediacetonitrile | 2,4-dinitro-5-propyl-1,3-benzenediacetonitrile |
| 5-isopropyl-4-nitro-1,3-benzenediacetonitrile | 5-isopropyl-2,4-dinitro-1,3-benzenediacetonitrile |
| 5-sec-butyl-4-nitro-1,3-benzenediacetonitrile | 5-sec-butyl-2,4-dinitro-1,3-benzenediacetonitrile |
| 5-tert-butyl-4-nitro-1,3-benzenediacetonitrile | 5-tert-butyl-2,4-dinitro-1,3-benzenediacetonitrile |
| 5-(1,2-dimethylpropyl)-4-nitro-1,3-benzenediacetonitrile | 5-(1,2-dimethylpropyl)-2,4-dinitro-1,3-benzenediacetonitrile |
| 4-ethyl-6-isopropyl-1,3-benzenediacetonitrile | 4-ethyl-6-nitro-1,3-benzenediacetonitrile |
| 6-isopropyl-4-propyl-1,3-benzenediacetonitrile | 6-nitro-4-propyl-1,3-benzenediacetonitrile |
| 4-isobutyl-6-isopropyl-1,3-benzenediacetonitrile | 4-isobutyl-6-nitro-1,3-benzenediacetonitrile |
| 4-tert-butyl-6-isopropyl-1,3-benzenediacetonitrile | 4-tert-butyl-6-nitro-1,3-benzenediacetonitrile |
| 4,6-di-sec-butyl-1,3-benzenediacetonitrile | 4-sec-butyl-6-nitro-1,3-benzenediacetonitrile |
| 5-isopropyl-1,3-benzenediacetonitrile | 5-isopropyl-2-nitro-1,3-benzenediacetonitrile |
| 5-sec-butyl-1,3-benzenediacetonitrile | 5-sec-butyl-2-nitro-1,3-benzenediacetonitrile |
| 5-tert-butyl-1,3-benzenediacetonitrile | 5-tert-butyl-2-nitro-benzenediacetonitrile |
| 4-tert-butyl-5-chloro-1,3-benzenediacetonitrile | 4-tert-butyl-5-chloro-2,6-dinitro-1,3-benzenediacetonitrile |
| 5-chloro-4-isopropyl-1,3-benzenediacetonitrile | 5-chloro-4-isopropyl-2,6-dinitro-1,3-benzenediacetonitrile |
| 4-isobutyl-5-fluoro-1,3-benzenediacetonitrile | 4-isobutyl-5-fluoro-2,6-dinitro-1,3-benzenediacetonitrile |
| 5-bromo-4-propyl-1,3-benzenediacetonitrile | 5-bromo-2,6-dinitro-4-propyl-1,3-benzenediacetonitrile |
| 4-bromo-6-sec-butyl-1,3-benzenediacetonitrile | 4-bromo-6-sec-butyl-2,5-dinitro-1,3-benzenediacetonitrile |
| 4-chloro-6-isobutyl-1,3-benzenediacetonitrile | 4-chloro-6-isobutyl-2,5-dinitro-1,3-benzenediacetonitrile |
| 4-fluoro-6-isopropyl-1,3-benzenediacetonitrile | 4-fluoro-6-isopropyl-2,5-dinitro-1,3-benzenediacetonitrile |
| 4-bromo-5-isopropyl-1,3-benzenediacetonitrile | 4-bromo-5-isopropyl-2,6-dinitro-1,3-benzenediacetonitrile |
| 4-chloro-5-ethyl-1,3-benzenediacetonitrile | 4-chloro-5-ethyl-2,6-dinitro-1,3-benzenediacetonitrile |
| 4-chloro-5-isobutyl-1,3-benzenediacetonitrile | 4-chloro-5-isobutyl-2,6-dinitro-1,3-benzenediacetonitrile |
| 2-isopropyl-1,4-benzenediacetonitrile | 2-isopropyl-5-nitro-1,4-benzenediacetonitrile |
| 2-isobutyl-1,4-benzenediacetonitrile | 2-isobutyl-5-nitro-1,4-benzenediacetonitrile |
| 2-propyl-1,4-benzenediacetonitrile | 2-propyl-5-nitro-1,4-benzenediacetonitrile |
| 2-ethyl-1,4-benzenediacetonitrile | 2-ethyl-5-nitro-1,4-benzenediacetonitrile |
| 2-isopropyl-1,4-benzenediacetonitrile | 2-isopropyl-3,5-dinitro-1,4-benzenediacetonitrile |
| 2-isobutyl-1,4-benzenediacetonitrile | 2-isobutyl-3,5-dinitro-1,4-benzenediacetonitrile |
| 2-propyl-1,4-benzenediacetonitrile | 2-propyl-3,5-dinitro-1,4-benzenediacetonitrile |
| 2-ethyl-1,4-benzenediacetonitrile | 2-ethyl-3,5-dinitro-1,4-benzenediacetonitrile |
| 5-ethyl-2,3-difluoro-1,4-benzenediacetonitrile | 5-ethyl-2,3-difluoro-6-nitro-1,4-benzenediacetonitrile |
| 5-sec-butyl-2,3-dichloro-1,4-benzenediacetonitrile | 5-sec-butyl-2,3-dichloro-6-nitro-1,4-benzenediacetonitrile |
| 2,3-dibromo-5-isopropyl-1,4-benzenediacetonitrile | 2,3-dibromo-5-isopropyl-6-nitro-1,4-benzenediacetonitrile |
| 2,4-dibromo-5-butyl-1,3-benzenediacetonitrile | 2,4-dibromo-5-butyl-6-nitro-1,3-benzenediacetonitrile |
| 2,4-dibromo-5-ethyl-1,3-benzenediacetonitrile | 2,4-dibromo-5-ethyl-6-nitro-1,3-benzenediacetonitrile |
| 5-tert-butyl-4,6-dichloro-1,3-benzenediacetonitrile | 5-tert-butyl-4,6-dichloro-2-nitro-1,3-benzenediacetonitrile |
| 5-sec-butyl-4,6-dichloro-1,3-benzenediacetonitrile | 5-sec-butyl-4,6-dichloro-2-nitro-1,3-benzenediacetonitrile |
| 5-butyl-4,6-dichloro-1,3-benzenediacetonitrile | 5-butyl-4,6-dichloro-2-nitro-1,3-benzenediacetonitrile |
| 4,6-dibromo-5-butyl-1,3-benzenediacetonitrile | 4,6-dibromo-5-butyl-2-nitro-1,3-benzenediacetonitrile |
| 2,5-dichloro-4-isopropyl-1,3-benzenediacetonitrile | 2,5-dichloro-4-isopropyl-6-nitro-1,3-benzenediacetonitrile |
| 2,5-dibromo-4-ethyl-1,3-benzenediacetonitrile | 2,5-dibromo-4-ethyl-6-nitro-1,3-benzenediacetonitrile |
| 2,5-dichloro-4-methyl-1,3-benzenediacetonitrile | 2,5-dichloro-4-methyl-5-nitro-1,3-benzenediacetonitrile |
| 2,6-dichloro-4-isopropyl-1,3-benzenediacetonitrile | 2,5-dichloro-4-isopropyl-5-nitro-1,3-benzenediacetonitrile |
| 2,6-dichloro-4-isobutyl-1,3-benzenediacetonitrile | 2,5-dichloro-4-isobutyl-5-nitro-1,3-benzenediacetonitrile |
| 2,6-dibromo-4-tert-butyl-1,3-benzenediacetonitrile | 2,5-dibromo-4-tert-butyl-5-nitro-1,3-benzenediacetonitrile |
| 2,6-difluoro-4-isobutyl-1,3-benzenediacetonitrile | 2,6-difluoro-4-isobutyl-5-nitro-1,3-benzenediacetonitrile |
| 4-tert-butyl-2,6-difluoro-1,3-benzenediacetonitrile | 4-tert-butyl-2,6-difluoro-5-nitro-1,3-benzenediacetonitrile |
| 2-butyl-4,6-dichloro-1,3-benzenediacetonitrile | 2-butyl-4,6-dichloro-5-nitro-1,3-benzenediacetonitrile |
| 2-ethyl-4,6-difluoro-1,3-benzenediacetonitrile | 2-ethyl-4,6-difluoro-5-nitro-1,3-benzenediaceonitrile |
| 4,6-dibromo-2-propyl-1,3-benzenediacetonitrile | 4,6-dibromo-5-nitro-2-propyl-1,3-benzenediacetonitrile |
| 2-tert-butyl-4,5-dichloro-1,3-benzenediacetonitrile | 2-tert-butyl-4,5-dichloro-6-nitro-1,3-benzenediacetonitrile |
| 4,5-dibromo-2-sec-butyl-1,3-benzenediacetonitrile | 4,5-dibromo-2-sec-butyl-6-nitro-1,3-benzenediacetonitrile |
| 4,5-difluoro-2-isopropyl-1,3-benzenediacetonitrile | 4,5-difluoro-2-isopropyl-6-nitro-1,3-benzenediacetonitrile |
| 4,5-dichloro-2-propyl-1,3-benzenediacetonitrile | 4,5-dichloro-6-nitro-2-propyl-1,3-benzenediacetonitrile |
| 4,5-dichloro-2-isopropyl-1,3-benzenediacetonitrile | 4,5-dichloro-6-nitro-2-propyl-1,3-benzenediacetonitrile |
| 2,5-dichloro-4-isopropyl-1,3-benzenediacetonitrile | 2,5-dichloro-4-isopropyl-6-nitro-1,3-benzenediacetonitrile |
| 2,5-dichloro-4-propyl-1,3-benzenediacetonitrile | 2,5-dichloro-6-nitro-4-propyl-1,3-benzenediacetonitrile |
| 4-tert-butyl-2,5-dichloro-1,3-benzenediacetonitrile | 4-tert-butyl-2,5-dichloro-6-nitro-1,3-benzenediacetonitrile |
| 4-sec-butyl-2,5-dichloro-1,3-benzenediacetonitrile | 4-sec-butyl-2,5-dichloro-6-nitro-1,3-benzenediacetonitrile |
| 4-butyl-2,5-dichloro-1,3-benzenediacetonitrile | 4-butyl-2,5-dichloro-6-nitro-1,3-benzenediacetonitrile |
| 4,6-dichloro-2-isopropyl-1,3-benzenediacetonitrile | 4,6-dichloro-2-isopropyl-5-nitro-1,3-benzenediacetonitrile |
| 2-tert-butyl-4,6-dichloro-1,3-benzenediacetonitrile | 2-tert-butyl-4,6-dichloro-5-nitro-1,3-benzenediacetonitrile |
| 4-tert-butyl-5,6-dichloro-1,3-benzenediacetonitrile | 4-tert-butyl-5,6-dichloro-2-nitro-1,3-benzenediacetonitrile |
| 4-sec-butyl-5,6-dichloro-1,3-benzenediacetonitrile | 4-sec-butyl-5,6-dichloro-2-nitro-1,3-benzenediacetonitrile |
| 5,6-dichloro-4-isopropyl-1,3-benzenediacetonitrile | 5,6-dichloro-4-isopropyl-2-nitro-1,3-benzenediacetonitrile |
| 5,6-dichloro-4-isobutyl-1,3-benzenediacetonitrile | 5,6-dichloro-4-isobutyl-2-nitro-1,3-benzenediacetonitrile |
| 2,4-dichloro-5-isopropyl-1,3-benzenediacetonitrile | 2,4-dichloro-5-isopropyl-6-nitro-1,3-benzenediacetonitrile |
| 2,4-dibromo-5-isopropyl-1,3-benzenediacetonitrile | 2,4-dibromo-5-isopropyl-6-nitro-1,3-benzenediacetonitrile |
| 2,4-dichloro-5-isobutyl-1,3-benzenediacetonitrile | 2,4-dichloro-5-isobutyl-6-nitro-1,3-benzenediacetonitrile |
| 2,4-dibromo-5-tert-butyl-1,3-benzenediacetonitrile | 2,4-dibromo-5-tert-butyl-6-nitro-1,3-benzenediacetonitrile |
| 2,6-diisopropyl-1,4-benzenediacetonitrile | 2-isopropyl-6-nitro-1,4-benzenediacetonitrile |
| 2-ethyl-6-isopropyl-1,4-benzenediacetonitrile | 2-ethyl-6-nitro-1,4-benzenediacetonitrile |
| 2-sec-butyl-6-isopropyl-1,4-benzenediacetonitrile | 2-sec-butyl-6-nitro-1,4-benzenediacetonitrile |
| 2-tert-butyl-6-isopropyl-1,4-benzenediacetonitrile | 2-tert-butyl-6-nitro-1,4-benzenediacetonitrile |
| 2-ethyl-1,4-benzenediacetonitrile | 2-ethyl-3-nitro-1,4-benzenediacetonitrile |
| 2-propyl-1,4-benzenediacetonitrile | 2-nitro-3-propyl-1,4-benzenediacetonitrile |
| 3,5-dibromo-2-sec-butyl-1,4-benzenediacetonitrile | 3,5-dibromo-2-sec-butyl-6-nitro-1,4-benzenediacetonitrile |
| 3,5-dibromo-2-tert-butyl-1,4-benzenediacetonitrile | 3,5-dibromo-2-tert-butyl-6-nitro-1,4-benzenediacetonitrile |
| 3,5-dichloro-2-isobutyl-1,4-benzenediacetonitrile | 3,5-dichloro-2-isobutyl-6-nitro-1,4-benzenediacetonitrile |
| 3,5-dichloro-2-isopropyl-1,4-benzenediacetonitrile | 3,5-dichloro-2-isopropyl-6-nitro-1,4-benzenediacetonitrile |
| 2-ethyl-3,6-difluoro-1,4-benzenediacetonitrile | 3-ethyl-3,6-difluoro-5-nitro-1,4-benzenediacetonitrile |
| 3,6-dibromo-2-sec-butyl-1,4-benzenediacetonitrile | 3,6-dibromo-2-sec-butyl-5-nitro-1,4-benzenediacetonitrile |
| 3,6-dibromo-2-tert-butyl-1,4-benzenediacetonitrile | 3,6-dibromo-2-tert-butyl-5-nitro-1,4-benzenediacetonitrile |
| 3,6-dichloro-2-isopropyl-1,4-benzenediacetonitrile | 3,6-dichloro-2-isopropyl-5-nitro-1,4-benzenediacetonitrile |
| 3,6-dichloro-2-isobutyl-1,4-benzenediacetonitrile | 3,6-dichloro-2-isobutyl-5-nitro-1,4-benzenediacetonitrile |
| 2-isopropyl-6-nitro-1,4-benzenediacetonitrile | 2-isopropyl-3,6-dinitro-1,4-benzenediacetonitrile |
| 2-ethyl-6-nitro-1,4-benzenediacetonitrile | 2-ethyl-3,6-dinitro-1,4-benzenediacetonitrile |

TABLE XVI-Continued

| Starting Material | Product |
|---|---|
| 2-sec-butyl-6-nitro-1,4-benzenediacetonitrile | 2-sec-butyl-3,6-dinitro-1,4-benzenediacetonitrile |
| 2-tert-butyl-6-nitro-1,4-benzenediacetonitrile | 2-tert-butyl-3,6-dinitro-1,4-benzenediacetonitrile |
| 2-bromo-5-ethyl-1,4-benzenediacetonitrile | 2-bromo-5-ethyl-3,6-dinitro-1,4-benzenediacetonitrile |
| 2-bromo-5-sec-butyl-1,4-benzenediacetonitrile | 2-bromo-5-sec-butyl-3,6-dinitro-1,4-benzenediacetonitrile |
| 2-bromo-5-isobutyl-1,4-benzenediacetonitrile | 2-bromo-5-isobutyl-3,6-dinitro-1,4-benzenediaceonitrile |
| 2-chloro-5-isopropyl-1,4-benzenediacetonitrile | 2-bromo-5-isopropyl-3,6-dinitro-1,4-benzenediacetonitrile |
| 2-chloro-5-ethyl-1,4-benzenediacetonitrile | 2-bromo-5-ethyl-3,6-dinitro-1,4-benzenediacetonitrile |
| 2-fluoro-5-isopropyl-1,4-benzenediacetonitrile | 2-fluoro-5-isopropyl-3,6-dinitro-1,4-benzenediacetonitrile |
| 2-fluoro-5-isobutyl-1,4-benzenediacetonitrile | 2-fluoro-5-isobutyl-3,6-dinitro-1,4-benzenediacetonitrile |
| 2-bromo-6-ethyl-1,4-benzenediacetonitrile | 2-bromo-6-ethyl-3,5-dinitro-1,4-benzenediacetonitrile |
| 2-bromo-6-sec-butyl-1,4-benzenediacetonitrile | 2-bromo-6-sec-butyl-3,5-dinitro-1,4-benzenediacetonitrile |
| 2-bromo-6-isopropyl-1,4-benzenediacetonitrile | 2-bromo-6-isopropyl-3,5-dinitro-1,4-benzenediacetonitrile |
| 2-bromo-6-isobutyl-1,4-benzenediacetonitrile | 2-bromo-6-isobutyl-3,5-dinitro-1,4-benzenediacetonitrile |
| 2-butyl-6-chloro-1,4-benzenediacetonitrile | 2-butyl-6-chloro-3,5-dinitro-1,4-benzenediacetonitrile |
| 2-sec-butyl-6-chloro-1,4-benzenediacetonitrile | 2-sec-butyl-6-chloro-3,5-dinitro-1,4-benzenediacetonitrile |
| 2-ethyl-6-fluoro-1,4-benzenediacetonitrile | 2-ethyl-6-fluoro-3,5-dinitro-1,4-benzenediacetonitrile |
| 2-sec-butyl-6-fluoro-1,4-benzenediacetonitrile | 2-sec-butyl-6-fluoro-3,5-dinitro-1,4-benzenediacetonitrile |
| 2-chloro-6-isopropyl-1,4-benzenediacetonitrile | 2-chloro-6-isopropyl-3,5-dinitro-1,4-benzenediacetonitrile |
| 2-chloro-6-isobutyl-1,4-benzenediacetonitrile | 2-chloro-6-isobutyl-3,5-dinitro-1,4-benzenediacetonitrile |
| 4,6-diethyl-1,3-benzenediacetonitrile | 4,6-diethyl-2-nitro-1,3-benzenediacetonitrile |
| | 4,6-diethyl-5-nitro-1,3-benzenediacetonitrile |
| 4,6-dipropyl-1,3-benzenediacetonitrile | 2-nitro-4,6-dipropyl-1,3-benzenediacetonitrile |
| | 5-nitro-4,6-dipropyl-1,3-benzenediacetonitrile |
| 4,6-diisobutyl-1,3-benzenediacetonitrile | 4,6-diisobutyl-2-nitro-1,3-benzenediacetonitrile |
| | 4,6-diisobutyl-5-nitro-1,3-benzenediacetonitrile |
| 4,6-di-tert-butyl-1,3-benzenediacetonitrile | 4,6-di-tert-butyl-2-nitro-1,3-benzenediacetonitrile |
| | 4,6-di-tert-butyl-5-nitro-1,3-benzenediacetonitrile |
| 4,6-di-sec-butyl-1,3-benzenediacetonitrile | 4,6-di-sec-butyl-2-nitro-1,3-benzenediacetonitrile |
| | 4,6-di-sec-butyl-5-nitro-1,3-benzenediacetonitrile |
| 4-(1,2-dimethylpropyl)-6-ethyl-1,3-benzenediacetonitrile | 4-(1,2-dimethylpropyl)-6-ethyl-2-nitro-1,3-benzenediacetonitrile |
| | 4-(1,2-dimethylpropyl)-6-ethyl-5-nitro-1,3-benzenediacetonitrile |
| 4-tert-butyl-6-propyl-1,3-benzenediacetonitrile | 4-tert-butyl-2-nitro-6-propyl-1,3-benzenediacetonitrile |
| | 4-tert-butyl-5-nitro-6-propyl-1,3-benzenediacetonitrile |
| 4-isobutyl-6-isopropyl-1,3-benzenediacetonitrile | 4-isobutyl-6-isopropyl-2-nitro-1,3-benzenediacetonitrile |
| | 4-isobutyl-6-isopropyl-5-nitro-1,3-benzenediacetonitrile |
| 4-sec-butyl-6-isobutyl-1,3-benzenediacetonitrile | 4-sec-butyl-6-isobutyl-2-nitro-1,3-benzenediacetonitrile |
| | 4-sec-butyl-6-isobutyl-5-nitro-1,3-benzenediacetonitrile |
| 4-isopropyl-6-neopentyl-1,3-benzenediacetonitrile | 4-isopropyl-6-neopentyl-2-nitro-1,3-benzenediacetonitrile |
| | 4-isopropyl-6-neopentyl-5-nitro-1,3-benzenediacetonitrile |
| 4-methyl-6-(1,1,2,2-tetramethylpropyl)-1,3-benzenediacetonitrile | 4-methyl-2-nitro-6-(1,1,2,2-tetramethylpropyl)-1,3-benzenediacetonitrile |
| | 4-methyl-5-nitro-6-(1,1,2,2-tetramethylpropyl)-1,3-benzenediacetonitrile |
| 4-ethyl-6-(1,1,2-trimethylpropyl)-1,3-benzenediacetonitrile | 4-ethyl-2-nitro-6-(1,1,2-trimethylpropyl)-1,3-benzenediacetonitrile |
| | 4-ethyl-5-nitro-6-(1,1,2-trimethylpropyl)-1,3-benzenediacetonitrile |
| 2-methyl-5-tert-pentyl-1,3-benzenediacetonitrile | 2-methyl-4-nitro-5-tert-pentyl-1,3-benzenediacetonitrile |
| 5-tert-butyl-2-ethyl-1,3-benzenediacetonitrile | 5-tert-butyl-2-ethyl-4-nitro-1,3-benzenediacetonitrile |
| 2-ethyl-5-(1,1,2-trimethylpropyl)-1,3-benzenediacetonitrile | 2-ethyl-4-nitro-5-(1,1,2-trimethylpropyl)-1,3-benzenediacetonitrile |
| 5-tert-butyl-2-propyl-1,3-benzenediacetonitrile | 5-tert-butyl-4-nitro-2-propyl-1,3-benzenediacetonitrile |
| 5-tert-pentyl-2-propyl-1,3-benzenediacetonitrile | 4-nitro-5-tert-pentyl-2-propyl-1,3-benzenediacetonitrile |
| 2-isobutyl-5-isopropyl-1,3-benzenediacetonitrile | 2-isobutyl-5-isopropyl-4-nitro-1,3-benzenediacetonitrile |
| 5-sec-butyl-2-isopropyl-1,3-benzenediacetonitrile | 5-sec-butyl-2-isopropyl-4-nitro-1,3-benzenediacetonitrile |
| 5-tert-butyl-2-isopropyl-1,3-benzenediacetonitrile | 5-tert-butyl-2-isopropyl-4-nitro-1,3-benzenediacetonitrile, m.p. 161-163°C |
| 2-isopropyl-5-(1,1,2-trimethylpropyl)-1,3-benzenediacetonitrile | 2-isopropyl-4-nitro-5-(1,1,2-trimethylpropyl)-1,3-benzenediacetonitrile |
| 2-isopropyl-5-(1,1,2,2-tetramethylpropyl)-1,3-benzenediacetonitrile | 2-isopropyl-4-nitro-5-(1,1,2,2-tetramethylpropyl)-1,3-benzenediacetonitrile |
| 5-tert-butyl-2-isobutyl-1,3-benzenediacetonitrile | 5-tert-butyl-2-isobutyl-4-nitro-1,3-benzenediacetonitrile |
| 2-sec-butyl-5-tert-butyl-1,3-benzenediacetonitrile | 2-sec-butyl-5-tert-butyl-4-nitro-1,3-benzenediacetonitrile |
| 2-isobutyl-5-tert-pentyl-1,3-benzenediacetonitrile | 2-isobutyl-4-nitro-5-tert-pentyl-1,3-benzenediacetonitrile |
| 5-tert-butyl-2-neopentyl-1,3-benzenediacetonitrile | 5-tert-butyl-2-neopentyl-4-nitro-1,3-benzenediacetonitrile |
| 4-tert-butyl-5-nitro-1,3-benzenediacetonitrile | 4-tert-butyl-2,5-dinitro-1,3-benzenediacetonitrile |
| 4-sec-butyl-5-nitro-1,3-benzenediacetonitrile | 4-sec-butyl-2,5-dinitro-1,3-benzenediacetonitrile |
| 4-ethyl-5-nitro-1,3-benzenediacetonitrile | 4-ethyl-2,5-dinitro-1,3-benzenediacetonitrile |
| 4-isopropyl-5-nitro-1,3-benzenediacetonitrile | 4-isopropyl-2,5-dinitro-1,3-benzenediacetonitrile |
| 4-tert-amyl-5-nitro-1,3-benzenediacetonitrile | 4-tert-amyl-2,5-dinitro-1,3-benzenediacetonitrile |
| 4-tert-butyl-6-chloro-1,3-benzenediacetonitrile | 4-tert-butyl-6-chloro-2-nitro-1,3-benzenediacetonitrile |
| 4-tert-butyl-1,3-benzenediacetonitrile | 4-tert-butyl-2,6-dinitro-1,3-benzenediacetonitrile |
| 4-sec-butyl-1,3-benzenediacetonitrile | 4-sec-butyl-2,6-dinitro-1,3-benzenediacetonitrile |
| 4-isopropyl-1,3-benzenediacetonitrile | 4-isopropyl-2,6-dinitro-1,3-benzenediacetonitrile |
| 4-tert-amyl-1,3-benzenediacetonitrile | 4-tert-amyl-2,6-dinitro-1,3-benzenediacetonitrile |
| 4-ethyl-1,3-benzenediacetonitrile | 4-ethyl-2,6-dinitro-1,3-benzenediacetonitrile |
| 2-bromo-5-tert-butyl-4-nitro-1,3-benzenediacetonitrile | 2-bromo-5-tert-butyl-4,6-dinitro-1,3-benzenediacetonitrile |
| 2-chloro-5-sec-butyl-4-nitro-1,3-benzenediacetonitrile | 2-chloro-5-sec-butyl-4,6-dinitro-1,3-benzenediacetonitrile |
| 5-iodo-2-isopropyl-4-nitro-1,3-benzenediacetonitrile | 5-iodo-2-isopropyl-4,6-dinitro-1,3-benzenediacetonitrile |
| 5-chloro-2-isopropyl-4-nitro-1,3-benzenediacetonitrile | 5-chloro-2-isopropyl-4,6-dinitro-1,3-benzenediacetonitrile |
| 5-bromo-2-isopropyl-4-nitro-1,3-benzenediacetonitrile | 5-bromo-2-isopropyl-4,6-dinitro-1,3-benzenediacetonitrile |
| 5-fluoro-2-isopropyl-4-nitro-1,3-benzenediacetonitrile | 5-fluoro-2-isopropyl-4,6-dinitro-1,3-benzenediacetonitrile |
| 5-fluoro-2-isobutyl-4-nitro-1,3-benzenediacetonitrile | 5-fluoro-2-isobutyl-4,6-dinitro-1,3-benzenediacetonitrile |
| 5-chloro-2-isobutyl-4-nitro-1,3-benzenediacetonitrile | 5-chloro-2-isobutyl-4,6-dinitro-1,3-benzenediacetonitrile |
| 5-bromo-2-isobutyl-4-nitro-1,3-benzenediacetonitrile | 5-bromo-2-isobutyl-4,6-dinitro-1,3-benzenediacetonitrile |
| 5-iodo-2-isobutyl-4-nitro-1,3-benzenediacetonitrile | 5-iodo-2-isobutyl-4,6-dinitro-1,3-benzenediacetonitrile |
| 5-chloro-2-tert-butyl-4-nitro-1,3-benzenediacetonitrile | 2-tert-butyl-5-chloro-4,6-dinitro-1,3-benzenediacetonitrile |
| 5-bromo-2-tert-butyl-4-nitro-1,3-benzenediacetonitrile | 2-tert-butyl-5-bromo-4,6-dinitro-1,3-benzenediacetonitrile |
| 2-sec-butyl-5-fluoro-4-nitro-1,3-benzenediacetonitrile | 2-sec-butyl-5-fluoro-4,6-dinitro-1,3-benzenediacetonitrile |
| 2-sec-butyl-5-iodo-4-nitro-1,3-benzenediacetonitrile | 2-sec-butyl-5-iodo-4,6-dinitro-1,3-benzenediacetonitrile |
| 2-sec-butyl-5-chloro-4-nitro-1,3-benzenediacetonitrile | 2-sec-butyl-5-chloro-4,6-dinitro-1,3-benzenediacetonitrile |
| 2-iodo-5-isopropyl-4-nitro-1,3-benzenediacetonitrile | 2-iodo-5-isopropyl-4,6-dinitro-1,3-benzenediacetonitrile |
| 2-chloro-5-isopropyl-4-nitro-1,3-benzenediacetonitrile | 2-chloro-5-isopropyl-4,6-dinitro-1,3-benzenediacetonitrile |
| 2-bromo-5-isopropyl-4-nitro-1,3-benzenediacetonitrile | 2-bromo-5-isopropyl-4,6-dinitro-1,3-benzenediacetonitrile |
| 2-fluoro-5-isopropyl-4-nitro-1,3-benzenediacetonitrile | 2-fluoro-5-isopropyl-4,6-dinitro-1,3-benzenediacetonitrile |
| 2-fluoro-5-isobutyl-4-nitro-1,3-benzenediacetonitrile | 2-fluoro-5-isobutyl-4,6-dinitro-1,3-benzenediacetonitrile |
| 2-chloro-5-isobutyl-4-nitro-1,3-benzenediacetonitrile | 2-chloro-5-isobutyl-4,6-dinitro-1,3-benzenediacetonitrile |
| 2-bromo-5-isobutyl-4-nitro-1,3-benzenediacetonitrile | 2-bromo-5-isobutyl-4,6-dinitro-1,3-benzenediacetonitrile |
| 2-chloro-5-tert-butyl-4-nitro-1,3-benzenediacetonitrile | 2-chloro-5-tert-butyl-4,6-dinitro-1,3-benzenediacetonitrile |
| 4-tert-butyl-2-methyl-1,3-benzenediacetonitrile | 4-tert-butyl-2-methyl-5-nitro-1,3-benzenediacetonitrile |
| | 4-tert-butyl-2-methyl-6-nitro-1,3-benzenediacetonitrile |
| 2-ethyl-4-isopropyl-1,3-benzenediacetonitrile | 2-ethyl-4-isopropyl-5-nitro-1,3-benzenediacetonitrile |

TABLE XVI-Continued

| Starting Material | Product |
|---|---|
| 2,4-diisopropyl-1,3-benzenediacetonitrile | 2-ethyl-4-isopropyl-6-nitro-1,3-benzenediacetonitrile |
| | 2,4-diisopropyl-5-nitro-1,3-benzenediacetonitrile |
| | 2,4-diisopropyl-6-nitro-1,3-benzenediacetonitrile |
| 2,4-di-tert-butyl-1,3-benzenediacetonitrile | 2,4-di-tert-butyl-5-nitro-1,3-benzenediacetonitrile |
| | 2,4-di-tert-butyl-6-nitro-1,3-benzenediacetonitrile |
| 2,4-di-sec-butyl-1,3-benzenediacetonitrile | 2,4-di-sec-butyl-5-nitro-1,3-benzenediacetonitrile |
| | 2,4-di-sec-butyl-6-nitro-1,3-benzenediacetonitrile |
| 4-sec-butyl-2-propyl-1,3-benzenediacetonitrile | 4-sec-butyl-5-nitro-2-propyl-1,3-benzenediacetonitrile |
| | 4-sec-butyl-6-nitro-2-propyl-1,3-benzenediacetonitrile |
| 4-tert-butyl-2-isopropyl-1,3-benzenediacetonitrile | 4-tert-butyl-2-isopropyl-5-nitro-1,3-benzenediacetonitrile |
| | 4-tert-butyl-2-isopropyl-6-nitro-1,3-benzenediacetonitrile |
| 2-ethyl-4-(1,1,2,2-tetramethylpropyl)-1,3-benzenediacetonitrile | 2-ethyl-5-nitro-4-(1,1,2,2-tetramethylpropyl)-1,3-benzenediacetonitrile |
| | 2-ethyl-6-nitro-4-(1,1,2,2-tetramethylpropyl)-1,3-benzenediacetonitrile |
| 2-isopropyl-4-(1,2,2-trimethylpropyl)-1,3-benzenediacetonitrile | 2-isopropyl-5-nitro-4-(1,2,2-trimethylpropyl)-1,3-benzenediacetonitrile |
| | 2-isopropyl-6-nitro-4-(1,2,2-trimethylpropyl)-1,3-benzenediacetonitrile |
| 2-isobutyl-4-tert-pentyl-1,3-benzenediacetonitrile | 2-isobutyl-5-nitro-4-tert-pentyl-1,3-benzenediacetonitrile |
| | 2-isobutyl-6-nitro-4-tert-pentyl-1,3-benzenediacetonitrile |
| 4-sec-butyl-2-isopropyl-1,3-benzenediacetonitrile | 4-sec-butyl-5-nitro-2-isopropyl-1,3-benzenediacetonitrile |
| | 4-sec-butyl-6-nitro-2-isopropyl-1,3-benzenediacetonitrile |
| 2-isobutyl-5-methyl-1,4-benzenediacetonitrile | 5-isobutyl-2-methyl-3-nitro-1,4-benzenediacetonitrile |
| 2-tert-butyl-5-ethyl-1,4-benzenediacetonitrile | 5-tert-butyl-2-ethyl-3-nitro-1,4-benzenediacetonitrile |
| 2-isobutyl-5-propyl-1,4-benzenediacetonitrile | 5-isobutyl-3-nitro-2-propyl-1,4-benzenediacetonitrile |
| 2-tert-butyl-5-propyl-1,4-benzenediacetonitrile | 5-tert-butyl-3-nitro-2-propyl-1,4-benzenediacetonitrile |
| 2,5-dipropyl-1,4-benzenediacetonitrile | 3-nitro-2,5-dipropyl-1,4-benzenediacetonitrile |
| 2-tert-butyl-5-isobutyl-1,4-benzenediacetonitrile | 5-tert-butyl-2-isobutyl-3-nitro-1,4-benzenediacetonitrile |
| 2,5-ditert-butyl-1,4-benzenediacetonitrile | 2,5-ditert-butyl-3-nitro-1,4-benzenediacetonitrile |
| 2-(1,2-dimethylpropyl)-5-ethyl-1,4-benzenediacetonitrile | 5-(1,2-dimethylpropyl)-2-ethyl-3-nitro-1,4-benzenediacetonitrile |
| 2-propyl-5-(1,1,2-trimethylpropyl)-1,4-benzenediacetonitrile | 3-nitro-2-propyl-5-(1,1,2-trimethylpropyl)-1,4-benzenediacetonitrile |
| 2-methyl-5-(1,1,2,2-tetramethylpropyl)-1,4-benzenediacetonitrile | 2-methyl-3-nitro-5-(1,1,2,2-tetramethylpropyl)-1,4-benzenediacetonitril |
| 2,5-diethyl-1,4-benzenediacetonitrile | 2,5-diethyl-3-nitro-1,4-benzenediacetonitrile |
| 2,5-disec-butyl-1,4-benzenediacetonitrile | 2,5-disec-butyl-3-nitro-1,4-benzenediacetonitrile |
| 3-tert-butyl-5-ethyl-1,4-benzenediacetonitrile | 5-tert-butyl-3-ethyl-2-nitro-1,4-benzenediacetonitrile |
| 3-tert-butyl-5-propyl-1,4-benzenediacetonitrile | 5-tert-butyl-2-nitro-3-propyl-1,4-benzenediacetonitrile |
| 3,5-ditert-butyl-1,4-benzenediacetonitrile | 3,5-ditert-butyl-2-nitro-1,4-benzenediacetonitrile |
| 3,5-diisopropyl-1,4-benzenediacetonitrile | 3,5-diisopropyl-2-nitro-1,4-benzenediacetonitrile |
| 3-isopropyl-5-propyl-1,4-benzenediacetonitrile | 5-isopropyl-2-nitro-3-propyl-1,4-benzenediacetonitrile |
| 3-isobutyl-5-isopropyl-1,4-benzenediacetonitrile | 3-isobutyl-5-isopropyl-2-nitro-1,4-benzenediacetonitrile |
| 3,5-disec-butyl-1,4-benzenediacetonitrile | 3,5-disec-butyl-2-nitro-1,4-benzenediacetonitrile |
| 3-sec-butyl-5-ethyl-1,4-benzenediacetonitrile | 5-sec-butyl-3-ethyl-2-nitro-1,4-benzenediacetonitrile |
| 3-(1,2-dimethylpropyl)-5-isobutyl-1,4-benzenediacetonitrile | 5-(1,2-dimethylpropyl)-3-isobutyl-2-nitro-1,4-benzenediacetonitrile |
| 3-propyl-5-(1,1,2,2-tetramethylpropyl)-1,4-benzenediacetonitrile | 2-nitro-3-propyl-5-(1,1,2,2-tetramethylpropyl)-1,4-benzenediacetonitril |
| 2-tert-butyl-5-isopropyl-1,4-benzenediacetonitrile | 5-tert-butyl-2-isopropyl-3-nitro-1,4-benzenediacetonitrile |
| | 2-tert-butyl-5-isopropyl-3-nitro-1,4-benzenediacetonitrile |
| 2-sec-butyl-5-isopropyl-1,4-benzenediacetonitrile | 5-sec-butyl-2-isopropyl-3-nitro-1,4-benzenediacetonitrile |
| | 2-sec-butyl-5-isopropyl-3-nitro-1,4-benzenediacetonitrile |
| 3-ethyl-5-isobutyl-1,4-benzenediacetonitrile | 5-ethyl-3-isobutyl-2-nitro-1,4-benzenediacetonitrile |
| | 3-ethyl-5-isobutyl-2-nitro-1,4-benzenediacetonitrile |
| 3-sec-butyl-5-isopropyl-1,4-benzenediacetonitrile | 5-sec-butyl-3-isopropyl-2-nitro-1,4-benzenediacetonitrile |
| | 3-sec-butyl-5-isopropyl-2-nitro-1,4-benzenediacetonitrile |
| 3-isopropyl-5-tert-pentyl-1,4-benzenediacetonitrile | 3-isopropyl-5-tert-pentyl-2-nitro-1,4-benzenediacetonitrile |
| | 5-isopropyl-3-tert-pentyl-2-nitro-1,4-benzenediacetonitrile |
| 3-isopropyl-5-(1,1,2-trimethylpropyl)-1,4-benzenediacetonitrile | 5-isopropyl-3-(1,1,2-trimethylpropyl)-2-nitro-1,4-benzenediacetonitrile |
| | 3-isopropyl-5-(1,1,2-trimethylpropyl)-2-nitro-1,4-benzenediacetonitrile |
| 5-chloro-2-ethyl-1,4-benzenediacetonitrile | 5-chloro-2-ethyl-3-nitro-1,4-benzenediacetonitrile |
| | 5-chloro-2-ethyl-6-nitro-1,4-benzenediacetonitrile |
| 5-fluoro-2-propyl-1,4-benzenediacetonitrile | 5-fluoro-3-nitro-2-propyl-1,4-benzenediacetonitrile |
| | 5-fluoro-6-nitro-2-propyl-1,4-benzenediacetonitrile |
| 5-chloro-2-isobutyl-1,4-benzenediacetonitrile | 5-chloro-2-isobutyl-3-nitro-1,4-benzenediacetonitrile |
| | 5-chloro-2-isobutyl-6-nitro-1,4-benzenediacetonitrile |
| 5-iodo-2-isobutyl-1,4-benzenediacetonitrile | 5-iodo-2-isobutyl-3-nitro-1,4-benzenediacetonitrile |
| | 5-iodo-2-isobutyl-6-nitro-1,4-benzenediacetonitrile |
| 2-tert-butyl-5-chloro-1,4-benzenediacetonitrile | 2-tert-butyl-5-chloro-3-nitro-1,4-benzenediacetonitrile |
| | 2-tert-butyl-5-chloro-6-nitro-1,4-benzenediacetonitrile |
| 2-tert-butyl-5-fluoro-1,4-benzenediacetonitrile | 2-tert-butyl-5-fluoro-3-nitro-1,4-benzenediacetonitrile |
| | 2-tert-butyl-5-fluoro-6-nitro-1,4-benzenediacetonitrile |
| 5-fluoro-2-tert-pentyl-1,4-benzenediacetonitrile | 5-fluoro-6-nitro-2-tert-pentyl-1,4-benzenediacetonitrile |
| | 5-chloro-6-nitro-2-(1,1,2-trimethylpropyl)-1,4-benzenediacetonitrile |
| 2-chloro-6-ethyl-1,4-benzenediacetonitrile | 2-chloro-6-ethyl-3-nitro-1,4-benzenediacetonitrile |
| | 2-chloro-6-ethyl-5-nitro-1,4-benzenediacetonitrile |
| 6-ethyl-2-fluoro-1,4-benzenediacetonitrile | 6-ethyl-2-fluoro-3-nitro-1,4-benzenediacetonitrile |
| | 6-ethyl-2-fluoro-5-nitro-1,4-benzenediacetonitrile |
| 2-chloro-6-propyl-1,4-benzenediacetonitrile | 2-chloro-3-nitro-6-propyl-1,4-benzenediacetonitrile |
| | 2-chloro-5-nitro-6-propyl-1,4-benzenediacetonitrile |
| 2-bromo-6-tert-butyl-1,4-benzenediacetonitrile | 2-bromo-6-tert-butyl-3-nitro-1,4-benzenediacetonitrile |
| | 2-bromo-6-tert-butyl-5-nitro-1,4-benzenediacetonitrile |
| 6-tert-butyl-2-chloro-1,4-benzenediacetonitrile | 6-tert-butyl-2-chloro-3-nitro-1,4-benzenediacetonitrile |
| | 6-tert-butyl-2-chloro-5-nitro-1,4-benzenediacetonitrile |
| 2-chloro-6-isobutyl-1,4-benzenediacetonitrile | 2-chloro-6-isobutyl-3-nitro-1,4-benzenediacetonitrile |
| | 2-chloro-6-isobutyl-5-nitro-1,4-benzenediacetonitrile |
| 2-fluoro-6-isobutyl-1,4-benzenediacetonitrile | 2-fluoro-6-isobutyl-3-nitro-1,4-benzenediacetonitrile |
| | 2-fluoro-6-isobutyl-5-nitro-1,4-benzenediacetonitrile |
| 6-tert-butyl-2-iodo-1,4-benzenediacetonitrile | 6-tert-butyl-2-iodo-3-nitro-1,4-benzenediacetonitrile |
| | 6-tert-butyl-2-iodo-5-nitro-1,4-benzenediacetonitrile |
| 4-chloro-2-ethyl-1,3-benzenediacetonitrile | 4-chloro-2-ethyl-5-nitro-1,3-benzenediacetonitrile |
| | 4-chloro-2-ethyl-6-nitro-1,3-benzenediacetonitrile |
| 4-bromo-2-propyl-1,3-benzenediacetonitrile | 4-bromo-5-nitro-2-propyl-1,3-benzenediacetonitrile |
| | 4-bromo-6-nitro-2-propyl-1,3-benzenediacetonitrile |
| 4-chloro-2-propyl-1,3-benzenediacetonitrile | 4-chloro-5-nitro-2-propyl-1,3-benzenediacetonitrile |
| | 4-chloro-6-nitro-2-propyl-1,3-benzenediacetonitrile |
| 4-chloro-2-isobutyl-1,3-benzenediacetonitrile | 4-chloro-2-isobutyl-5-nitro-1,3-benzenediacetonitrile |
| | 4-chloro-2-isobutyl-6-nitro-1,3-benzenediacetonitrile |
| 4-bromo-2-isobutyl-1,3-benzenediacetonitrile | 4-bromo-2-isobutyl-5-nitro-1,3-benzenediacetonitrile |
| | 4-bromo-2-isobutyl-6-nitro-1,3-benzenediacetonitrile |

TABLE XVI-Continued

| Starting Material | Product |
| --- | --- |
| 4-chloro-2-isopropyl-1,3-benzenediacetonitrile | 4-chloro-2-isopropyl-5-nitro-1,3-benzenediacetonitrile |
| | 4-chloro-2-isopropyl-6-nitro-1,3-benzenediacetonitrile |
| 4-bromo-2-isopropyl-1,3-benzenediacetonitrile | 4-bromo-2-isopropyl-5-nitro-1,3-benzenediacetonitrile |
| | 4-bromo-2-isopropyl-6-nitro-1,3-benzenediacetonitrile |
| 2-tert-butyl-4-chloro-1,3-benzenediacetonitrile | 2-tert-butyl-4-chloro-5-nitro-1,3-benzenediacetonitrile |
| | 2-tert-butyl-4-chloro-6-nitro-1,3-benzenediacetonitrile |
| 4-bromo-2-tert-butyl-1,3-benzenediacetonitrile | 4-bromo-2-tert-butyl-5-nitro-1,3-benzenediacetonitrile |
| | 4-bromo-2-tert-butyl-6-nitro-1,3-benzenediacetonitrile |
| 4-chloro-2-(1,2-dimethylpropyl)-1,3-benzenediacetonitrile | 4-chloro-2-(1,2-dimethylpropyl)-5-nitro-1,3-benzenediacetonitrile |
| | 4-chloro-2-(1,2-dimethylpropyl)-6-nitro-1,3-benzenediacetonitrile |
| 5-chloro-2-ethyl-1,3-benzenediacetonitrile | 5-chloro-2-ethyl-4-nitro-1,3-benzenediacetonitrile |
| 5-chloro-2-propyl-1,3-benzenediacetonitrile | 5-chloro-4-nitro-2-propyl-1,3-benzenediacetonitrile |
| 5-bromo-2-propyl-1,3-benzenediacetonitrile | 5-bromo-4-nitro-2-propyl-1,3-benzenediacetonitrile |
| 5-chloro-2-isopropyl-1,3-benzenediacetonitrile | 5-chloro-2-isopropyl-4-nitro-1,3-benzenediacetonitrile |
| 5-bromo-2-isopropyl-1,3-benzenediacetonitrile | 5-bromo-2-isopropyl-4-nitro-1,3-benzenediacetonitrile |
| 5-fluoro-2-isopropyl-1,3-benzenediacetonitrile | 5-fluoro-2-isopropyl-4-nitro-1,3-benzenediacetonitrile |
| 5-chloro-2-isobutyl-1,3-benzenediacetonitrile | 5-chloro-2-isobutyl-4-nitro-1,3-benzenediacetonitrile |
| 5-fluoro-2-isobutyl-1,3-benzenediacetonitrile | 5-fluoro-2-isobutyl-4-nitro-1,3-benzenediacetonitrile |
| 5-iodo-2-isobutyl-1,3-benzenediacetonitrile | 5-iodo-2-isobutyl-4-nitro-1,3-benzenediacetonitrile |
| 5-bromo-2-tert-butyl-1,3-benzenediacetonitrile | 5-bromo-2-tert-butyl-4-nitro-1,3-benzenediacetonitrile |
| 2-tert-butyl-5-chloro-1,3-benzenediacetonitrile | 2-tert-butyl-5-chloro-4-nitro-1,3-benzenediacetonitrile |
| 5-chloro-2-tert-pentyl-1,3-benzenediacetonitrile | 5-chloro-4-nitro-2-tert-pentyl-1,3-benzenediacetonitrile |
| 5-chloro-2-(1,2-dimethylpropyl)-1,3-benzenediacetonitrile | 5-chloro-2-(1,2-dimethylpropyl)-4-nitro-1,3-benzenediacetonitrile |
| 5-chloro-2-(1,1,2-trimethylpropyl)-1,3-benzenediacetonitrile | 5-chloro-4-nitro-2-(1,1,2-trimethylpropyl)-1,3-benzenediacetonitrile |
| 5-chloro-4-tert-pentyl-1,3-benzenediacetonitrile | 5-chloro-2-nitro-4-tert-pentyl-1,3-benzenediacetonitrile |
| | 5-chloro-6-nitro-4-tert-pentyl-1,3-benzenediacetonitrile |
| 5-bromo-4-tert-pentyl-1,3-benzenediacetonitrile | 5-bromo-2-nitro-4-tert-pentyl-1,3-benzenediacetonitrile |
| | 5-bromo-6-nitro-4-tert-pentyl-1,3-benzenediacetonitrile |
| 2-chloro-5-ethyl-1,3-benzenediacetonitrile | 2-chloro-5-ethyl-4-nitro-1,3-benzenediacetonitrile |
| 2-bromo-5-propyl-1,3-benzenediacetonitrile | 2-bromo-4-nitro-5-propyl-1,3-benzenediacetonitrile |
| 2-chloro-5-isobutyl-1,3-benzenediacetonitrile | 2-chloro-5-isobutyl-4-nitro-1,3-benzenediacetonitrile |
| 2-fluoro-5-isobutyl-1,3-benzenediacetonitrile | 2-fluoro-5-isobutyl-4-nitro-1,3-benzenediacetonitrile |
| 2-iodo-5-isobutyl-1,3-benzenediacetonitrile | 2-iodo-5-isobutyl-4-nitro-1,3-benzenediacetonitrile |
| 5-tert-butyl-2-chloro-1,3-benzenediacetonitrile | 5-tert-butyl-2-chloro-4-nitro-1,3-benzenediacetonitrile |
| 5-tert-butyl-2-fluoro-1,3-benzenediacetonitrile | 5-tert-butyl-2-fluoro-4-nitro-1,3-benzenediacetonitrile |
| 2-chloro-5-tert-pentyl-1,3-benzenediacetonitrile | 2-chloro-4-nitro-5-tert-pentyl-1,3-benzenediacetonitrile |
| 2-chloro-5-(1,2-dimethylpropyl)-1,3-benzenediacetonitrile | 2-chloro-5-(1,2-dimethylpropyl)-4-nitro-1,3-benzenediacetonitrile |
| 2-chloro-5-(1,1,2-trimethylpropyl)-1,3-benzenediacetonitrile | 2-chloro-4-nitro-5-(1,1,2-trimethylpropyl)-1,3-benzenediacetonitrile |
| 4-chloro-5-ethyl-1,3-benzenediacetonitrile | 4-chloro-5-ethyl-2-nitro-1,3-benzenediacetonitrile |
| | 4-chloro-5-ethyl-6-nitro-1,3-benzenediacetonitrile |
| 4-chloro-5-propyl-1,3-benzenediacetonitrile | 4-chloro-2-nitro-5-propyl-1,3-benzenediacetonitrile |
| | 4-chloro-6-nitro-5-propyl-1,3-benzenediacetonitrile |
| 4-chloro-5-isobutyl-1,3-benzenediacetonitrile | 4-chloro-5-isobutyl-2-nitro-1,3-benzenediacetonitrile |
| | 4-chloro-5-isobutyl-6-nitro-1,3-benzenediacetonitrile |
| 4-bromo-5-isobutyl-1,3-benzenediacetonitrile | 4-bromo-5-isobutyl-2-nitro-1,3-benzenediacetonitrile |
| | 4-bromo-5-isobutyl-6-nitro-1,3-benzenediacetonitrile |
| 4-fluoro-5-isobutyl-1,3-benzenediacetonitrile | 4-fluoro-5-isobutyl-2-nitro-1,3-benzenediacetonitrile |
| | 4-fluoro-5-isobutyl-6-nitro-1,3-benzenediacetonitrile |
| 5-tert-butyl-4-fluoro-1,3-benzenediacetonitrile | 5-tert-butyl-4-fluoro-2-nitro-1,3-benzenediacetonitrile |
| | 5-tert-butyl-4-fluoro-6-nitro-1,3-benzenediacetonitrile |
| 2-chloro-4-ethyl-1,3-benzenediacetonitrile | 2-chloro-4-ethyl-5-nitro-1,3-benzenediacetonitrile |
| | 2-chloro-4-ethyl-6-nitro-1,3-benzenediacetonitrile |
| 2-chloro-4-propyl-1,3-benzenediacetonitrile | 2-chloro-5-nitro-4-propyl-1,3-benzenediacetonitrile |
| | 2-chloro-6-nitro-4-propyl-1,3-beznenediacetonitrile |
| 2-bromo-4-propyl-1,3-benzenediacetonitrile | 2-bromo-5-nitro-4-propyl-1,3-benzenediacetonitrile |
| | 2-bromo-6-nitro-4-propyl-1,3-benzenediacetonitrile |
| 2-chloro-4-isobutyl-1,3-benzenediacetonitrile | 2-chloro-4-isobutyl-5-nitro-1,3-benzenediacetonitrile |
| | 2-chloro-4-isobutyl-6-nitro-1,3-benzenediacetonitrile |
| 2-bromo-4-isobutyl-1,3-benzenediacetonitrile | 2-bromo-4-isobutyl-5-nitro-1,3-benzenediacetonitrile |
| | 2-bromo-4-isobutyl-6-nitro-1,3-benzenediacetonitrile |
| 2-fluoro-4-isobutyl-1,3-benzenediacetonitrile | 2-fluoro-4-isobutyl-5-nitro-1,3-benzenediacetonitrile |
| | 2-fluoro-4-isobutyl-6-nitro-1,3-benzenediacetonitrile |
| 2-bromo-4-tert-butyl-1,3-benzenediacetonitrile | 2-bromo-4-tert-butyl-5-nitro-1,3-benzenediacetonitrile |
| | 2-bromo-4-tert-butyl-6-nitro-1,3-benzenediacetonitrile |
| 4-tert-butyl-2-chloro-1,3-benzenediacetonitrile | 4-tert-butyl-2-chloro-5-nitro-1,3-benzenediacetonitrile |
| | 4-tert-butyl-2-chloro-6-nitro-1,3-benzenediacetonitrile |
| 2-chloro-4-tert-pentyl-1,3-benzenediacetonitrile | 2-chloro-5-nitro-4-tert-pentyl-1,3-benzenediacetonitrile |
| | 2-chloro-6-nitro-4-tert-pentyl-1,3-benzenediacetonitrile |
| 6-chloro-4-propyl-1,3-benzenediacetonitrile | 6-chloro-2-nitro-4-propyl-1,3-benzenediacetonitrile |
| | 6-chloro-4-ethyl-5-nitro-1,3-benzenediacetonitrile |
| 6-chloro-4-propyl-1,3-benzenediacetonitrile | 6-chloro-2-nitro-4-propyl-1,3-benzenediacetonitrile |
| | 6-chloro-5-nitro-4-propyl-1,3-benzenediacetonitrile |
| 6-bromo-4-isobutyl-1,3-benzenediacetonitrile | 6-bromo-4-isobutyl-2-nitro-1,3-benzenediacetonitrile |
| | 6-bromo-4-isobutyl-5-nitro-1,3-benzenediacetonitrile |
| 6-chloro-4-isobutyl-1,3-benzenediacetonitrile | 6-chloro-4-isobutyl-2-nitro-1,3-benzenediacetonitrile |
| | 6-chloro-4-isobutyl-5-nitro-1,3-benzenediacetonitrile |
| 4-tert-butyl-6-chloro-1,3-benzenediacetonitrile | 4-tert-butyl-6-chloro-2-nitro-1,3-benzenediacetonitrile |
| | 4-tert-butyl-6-chloro-5-nitro-1,3-benzenediacetonitrile |
| 4-tert-butyl-6-fluoro-1,3-benzenediacetonitrile | 4-tert-butyl-6-fluoro-2-nitro-1,3-benzenediacetonitrile |
| | 4-tert-butyl-6-fluoro-5-nitro-1,3-benzenediacetonitrile |
| 6-chloro-4-(1,2-dimethylpropyl)-1,3-benzenediacetonitrile | 6-chloro-4-(1,2-dimethylpropyl)-2-nitro-1,3-benzenediacetonitrile |
| | 6-chloro-4-(1,2-dimethylpropyl)-5-nitro-1,3-benzenediacetonitrile |
| 6-chloro-4-(1,1,2-trimethylpropyl)-1,3-benzenediacetonitrile | 6-chloro-2-nitro-4-(1,1,2-trimethylpropyl)-1,3-benzenediacetonitrile |
| | 6-chloro-5-nitro-4-(1,1,2-trimethylpropyl)-1,3-benzenediacetonitrile |
| 5-chloro-4-ethyl-1,3-benzenediacetonitrile | 5-chloro-4-ethyl-2-nitro-1,3-benzenediacetonitrile |
| | 5-chloro-4-ethyl-6-nitro-1,3-benzenediacetonitrile |
| 5-chloro-4-propyl-1,3-benzenediacetonitrile | 5-chloro-2-nitro-4-propyl-1,3-benzenediacetonitrile |
| | 5-chloro-6-nitro-4-propyl-1,3-benzenediacetonitrile |
| 5-chloro-4-isobutyl-1,3-benzenediacetonitrile | 5-chloro-4-isobutyl-2-nitro-1,3-benzenediacetonitrile |
| | 5-chloro-4-isobutyl-6-nitro-1,3-benzenediacetonitrile |
| 5-bromo-4-isobutyl-1,3-benzenediacetonitrile | 5-bromo-4-isobutyl-2-nitro-1,3-benzenediacetonitrile |
| | 5-bromo-4-isobutyl-6-nitro-1,3-benzenediacetonitrile |

TABLE XVI-Continued

| Starting Material | Product |
|---|---|
| 5-fluoro-4-isobutyl-1,3-benzenediacetonitrile | 5-fluoro-4-isobutyl-2-nitro-1,3-benzenediacetonitrile |
| | 5-fluoro-4-isobutyl-6-nitro-1,3-benzenediacetonitrile |
| 5-bromo-4-tert-butyl-1,3-benzenediacetonitrile | 5-bromo-4-tert-butyl-2-nitro-1,3-benzenediacetonitrile |
| | 5-bromo-4-tert-butyl-6-nitro-1,3-benzenediacetonitrile |
| 4-tert-butyl-5-chloro-1,3-benzenediacetonitrile | 4-tert-butyl-5-chloro-2-nitro-1,3-benzenediacetonitrile |
| | 4-tert-butyl-5-chloro-6-nitro-1,3-benzenediacetonitrile |
| 4-sec-butyl-5-chloro-1,3-benzenediacetonitrile | 4-sec-butyl-5-chloro-2-nitro-1,3-benzenediacetonitrile |
| | 4-sec-butyl-5-chloro-6-nitro-1,3-benzenediacetonitrile |
| 5-chloro-4-(1,2-dimethylpropyl)-1,3-benzenediacetonitrile | 5-chloro-4-(1,2-dimethylpropyl)-2-nitro-1,3-benzenediacetonitrile |
| | 5-chloro-4-(1,2-dimethylpropyl)-6-nitro-1,3-benzenediacetonitrile |
| 5-chloro-4-(1,1,2-trimethylpropyl)-1,3-benzenediacetonitrile | 5-chloro-2-nitro-4-(1,1,2-trimethylpropyl)-1,3-benzenediacetonitrile |
| 5-tert-butyl-4-chloro-1,3-benzenediacetonitrile | 5-tert-butyl-4-chloro-2-nitro-1,3-benzenediacetonitrile |
| | 5-tert-butyl-4-chloro-6-nitro-1,3-benzenediacetonitrile |
| 4-chloro-5-tert-pentyl-1,3-benzenediacetonitrile | 4-chloro-2-nitro-5-tert-pentyl-1,3-benzenediacetonitrile |
| | 4-chloro-6-nitro-5-tert-pentyl-1,3-benzenediacetonitrile |
| 4-chloro-5-(1,2-dimethylpropyl)-1,3-benzenediacetonitrile | 4-chloro-5-(1,2-dimethylpropyl)-2-nitro-1,3-benzenediacetonitrile |
| 4-bromo-5-(1,1,2-trimethylpropyl)-1,3-benzenediacetonitrile | 4-bromo-5-(1,1,2-trimethylpropyl)-1,3-benzenediacetonitrile |
| 2-chloro-3-propyl-1,4-benzenediacetonitrile | 2-chloro-5-nitro-3-propyl-1,4-benzenediacetonitrile |
| | 2-chloro-6-nitro-3-propyl-1,4-benzenediacetonitrile |
| 2-chloro-3-isobutyl-1,4-benzenediacetonitrile | 2-chloro-3-isobutyl-5-nitro-1,4-benzenediacetonitrile |
| | 2-chloro-3-isobutyl-6-nitro-1,4-benzenediacetonitrile |
| 2-bromo-3-isobutyl-1,4-benzenediacetonitrile | 2-bromo-3-isobutyl-5-nitro-1,4-benzenediacetonitrile |
| | 2-bromo-3-isobutyl-6-nitro-1,4-benzenediacetonitrile |
| 3-tert-butyl-2-chloro-1,4-benzenediacetonitrile | 3-tert-butyl-2-chloro-5-nitro-1,4-benzenediacetonitrile |
| | 3-tert-butyl-2-chloro-6-nitro-1,4-benzenediacetonitrile |
| 3-chloro-2,5-diethyl-1,4-benzenediacetonitrile | 3-chloro-2,5-diethyl-6-nitro-1,4-benzenediacetonitrile |
| 3-chloro-2,5-dipropyl-1,4-benzenediacetonitrile | 3-chloro-6-nitro-2,5-dipropyl-1,4-benzenediacetonitrile |
| 3-bromo-2,5-dipropyl-1,4-benzenediacetonitrile | 3-bromo-6-nitro-2,5-dipropyl-1,4-benzenediacetonitrile |
| 3-bromo-2,5-diisobutyl-1,4-benzenediacetonitrile | 3-bromo-2,5-diisobutyl-6-nitro-1,4-benzenediacetonitrile |
| 2,5-di-tert-butyl-3-chloro-1,4-benzenediacetonitrile | 2,5-di-tert-butyl-3-chloro-6-nitro-1,4-benzenediacetonitrile |
| 3-bromo-2,5-di-tert-butyl-1,4-benzenediacetonitrile | 3-bromo-2,5-di-tert-butyl-6-nitro-1,4-benzenediacetonitrile |
| 3-chloro-2-isobutyl-5-methyl-1,4-benzenediacetonitrile | 3-chloro-2-isobutyl-5-methyl-6-nitro-1,4-benzenediacetonitrile |
| 3-chloro-5-isobutyl-2-methyl-1,4-benzenediacetonitrile | 3-chloro-5-isobutyl-2-methyl-6-nitro-1,4-benzenediacetonitrile |
| 5-tert-butyl-3-chloro-2-ethyl-1,4-benzenediacetonitrile | 5-tert-butyl-3-chloro-2-ethyl-6-nitro-1,4-benzenediacetonitrile |
| 3-bromo-5-tert-butyl-2-isobutyl-1,4-benzenediacetonitrile | 3-bromo-5-tert-butyl-2-isobutyl-6-nitro-1,4-benzenediacetonitrile |
| 3-chloro-2-ethyl-5-tert-pentyl-1,4-benzenediacetonitrile | 3-chloro-2-ethyl-6-nitro-5-tert-pentyl-1,4-benzenediacetonitrile |
| 3-bromo-2-isobutyl-5-tert-pentyl-1,4-benzenediacetonitrile | 3-bromo-2-isobutyl-6-nitro-5-tert-pentyl-1,4-benzenediacetonitrile |
| 5-sec-butyl-3-chloro-2-isobutyl-1,4-benzenediacetonitrile | 5-sec-butyl-3-chloro-2-isobutyl-6-nitro-1,3-benzenediacetonitrile |
| 3-chloro-5-isobutyl-2-isopropyl-1,4-benzenediacetonitrile | 3-chloro-5-isobutyl-2-isopropyl-6-nitro-1,4-benzenediacetonitrile |
| 3-bromo-5-tert-butyl-2-isopropyl-1,4-benzenediacetonitrile | 3-bromo-5-tert-butyl-2-isopropyl-6-nitro-1,4-benzenediacetonitrile |
| 3-chloro-2-ethyl-5-(1,1,2-trimethylpropyl)-1,4-benzenediacetonitrile | 3-chloro-2-ethyl-6-nitro-5-(1,1,2-trimethylpropyl)-1,4-benzenediacetonitrile |
| 3-chloro-2,6-diethyl-1,4-benzenediacetonitrile | 3-chloro-2,6-diethyl-5-nitro-1,4-benzenediacetonitrile |
| 3-bromo-2,6-dipropyl-1,4-benzenediacetonitrile | 3-bromo-5-nitro-2,6-dipropyl-1,4-benzenediacetonitrile |
| 3-chloro-2,6-diisobutyl-1,4-benzenediacetonitrile | 3-chloro-2,6-diisobutyl-5-nitro-1,4-benzenediacetonitrile |
| 3-bromo-2,6-diisobutyl-1,4-benzenediacetonitrile | 3-bromo-2,6-diisobutyl-5-nitro-1,4-benzenediacetonitrile |
| 3-bromo-2,6-di-tert-butyl-1,4-benzenediacetonitrile | 3-bromo-2,6-di-tert-butyl-5-nitro-1,4-benzenediacetonitrile |
| 2,6-di-tert-butyl-3-chloro-1,4-benzenediacetonitrile | 2,6-di-tert-butyl-3-chloro-5-nitro-1,4-benzenediacetonitrile |
| 6-tert-butyl-3-chloro-2-methyl-1,4-benzenediacetonitrile | 6-tert-butyl-3-chloro-2-methyl-5-nitro-1,4-benzenediacetonitrile |
| 6-tert-butyl-3-chloro-2-propyl-1,4-benzenediacetonitrile | 6-tert-butyl-3-chloro-5-nitro-2-propyl-1,4-benzenediacetonitrile |
| 6-tert-butyl-3-chloro-2-isobutyl-1,4-benzenediacetonitrile | 6-tert-butyl-3-chloro-2-isobutyl-5-nitro-1,4-benzenediacetonitrile |
| 3-chloro-6-ethyl-2-isobutyl-1,4-benzenediacetonitrile | 3-chloro-6-ethyl-2-isobutyl-5-nitro-1,4-benzenediacetonitrile |
| 3-chloro-2-ethyl-6-isobutyl-1,4-benzenediacetonitrile | 3-chloro-2-ethyl-6-isobutyl-5-nitro-1,4-benzenediacetonitrile |
| 3-chloro-2-ethyl-6-tert-pentyl-1,4-benzenediacetonitrile | 3-chloro-2-ethyl-5-nitro-6-tert-pentyl-1,4-benzenediacetonitrile |
| 3-chloro-2-ethyl-6-(1,2-dimethylpropyl)-1,4-benzenediacetonitrile | 3-chloro-2-ethyl-5-nitro-6-(1,2-dimethylpropyl)-1,4-benzenediacetonitrile |
| 5-chloro-2,4-diethyl-1,3-benzenediacetonitrile | 5-chloro-2,4-diethyl-6-nitro-1,3-benzenediacetonitrile |
| 5-chloro-2,4-dipropyl-1,3-benzenediacetonitrile | 5-chloro-6-nitro-2,4-dipropyl-1,3-benzenediacetonitrile |
| 5-chloro-2,4-diisobutyl-1,3-benzenediacetonitrile | 5-chloro-2,4-diisobutyl-6-nitro-1,3-benzenediacetonitrile |
| 5-bromo-2,4-diisobutyl-1,3-benzenediacetonitrile | 5-bromo-2,4-diisobutyl-6-nitro-1,3-benzenediacetonitrile |
| 5-chloro-2-ethyl-4-isobutyl-1,3-benzenediacetonitrile | 5-chloro-2-ethyl-4-isobutyl-6-nitro-1,3-benzenediacetonitrile |
| 5-bromo-4-ethyl-2-isobutyl-1,3-benzenediacetonitrile | 5-bromo-4-ethyl-2-isobutyl-6-nitro-1,3-benzenediacetonitrile |
| 5-chloro-2-isobutyl-4-methyl-1,3-benzenediacetonitrile | 5-chloro-2-isobutyl-4-methyl-6-nitro-1,3-benzenediacetonitrile |
| 5-chloro-4-isobutyl-2-propyl-1,3-benzenediacetonitrile | 5-chloro-4-isobutyl-6-nitro-2-propyl-1,3-benzenediacetonitrile |
| 4-tert-butyl-5-chloro-2-methyl-1,3-benzenediacetonitrile | 4-tert-butyl-5-chloro-2-methyl-6-nitro-1,3-benzenediacetonitrile |
| 6-chloro-2,4-diethyl-1,3-benzenediacetonitrile | 6-chloro-2,4-diethyl-5-nitro-1,3-benzenediacetonitrile |
| 6-chloro-2,4-dipropyl-1,3-benzenediacetonitrile | 6-chloro-5-nitro-2,4-dipropyl-1,3-benzenediacetonitrile |
| 6-chloro-2,4-diisobutyl-1,3-benzenediacetonitrile | 6-chloro-2,4-diisobutyl-5-nitro-1,3-benzenediacetonitrile |
| 6-bromo-2,4-diisobutyl-1,3-benzenediacetonitrile | 6-bromo-2,4-diisobutyl-5-nitro-1,3-benzenediacetonitrile |
| 6-chloro-2-ethyl-4-isobutyl-1,3-benzenediacetonitrile | 6-chloro-2-ethyl-4-isobutyl-5-nitro-1,3-benzenediacetonitrile |
| 6-chloro-4-ethyl-2-isobutyl-1,3-benzenediacetonitrile | 6-chloro-4-ethyl-2-isobutyl-5-nitro-1,3-benzenediacetonitrile |
| 6-bromo-2-isobutyl-4-methyl-1,3-benzenediacetonitrile | 6-bromo-2-isobutyl-4-methyl-5-nitro-1,3-benzenediacetonitrile |
| 6-chloro-4-isobutyl-2-propyl-1,3-benzenediacetonitrile | 6-chloro-4-isobutyl-5-nitro-2-propyl-1,3-benzenediacetonitrile |
| 4-tert-butyl-6-chloro-2-methyl-1,3-benzenediacetonitrile | 4-tert-butyl-6-chloro-2-methyl-5-nitro-1,3-benzenediacetonitrile |
| 4-chloro-2,5-diethyl-1,3-benzenediacetonitrile | 4-chloro-2,5-diethyl-6-nitro-1,3-benzenediacetonitrile |
| 4-chloro-2,5-dipropyl-1,3-benzenediacetonitrile | 4-chloro-6-nitro-2,5-dipropyl-1,3-benzenediacetonitrile |
| 4-chloro-2,5-diisobutyl-1,3-benzenediacetonitrile | 4-chloro-2,5-diisobutyl-6-nitro-1,3-benzenediacetonitrile |
| 5-tert-butyl-4-chloro-2-methyl-1,3-benzenediacetonitrile | 5-tert-butyl-4-chloro-2-methyl-6-nitro-1,3-benzenediacetonitrile |
| 5-tert-butyl-4-chloro-2-ethyl-1,3-benzenediacetonitrile | 5-tert-butyl-4-chloro-2-ethyl-6-nitro-1,3-benzenediacetonitrile |
| 5-tert-butyl-4-chloro-2-propyl-1,3-benzenediacetonitrile | 5-tert-butyl-4-chloro-6-nitro-2-propyl-1,3-benzenediacetonitrile |
| 5-tert-butyl-4-chloro-2-isobutyl-1,3-benzenediacetonitrile | 5-tert-butyl-4-chloro-2-isobutyl-6-nitro-1,3-benzenediacetonitrile |
| 4-chloro-5-(1,2-dimethylpropyl)-2-ethyl-1,3-benzenediacetonitrile | 4-chloro-5-(1,2-dimethylpropyl)-2-ethyl-6-nitro-1,3-benzenediacetonitrile |
| 4-chloro-2-ethyl-5-tert-pentyl-1,3-benzenediacetonitrile | 4-chloro-2-ethyl-6-nitro-5-tert-pentyl-1,3-benzenediacetonitrile |
| 2-chloro-4,6-diethyl-1,3-benzenediacetonitrile | 2-chloro-4,6-diethyl-5-nitro-1,3-benzenediacetonitrile |
| 2-chloro-4,6-dipropyl-1,3-benzenediacetonitrile | 2-chloro-5-nitro-4,6-dipropyl-1,3-benzenediacetonitrile |
| 2-chloro-4,6-diisobutyl-1,3-benzenediacetonitrile | 2-chloro-4,6-diisobutyl-5-nitro-1,3-benzenediacetonitrile |
| 2-bromo-4,6-diisobutyl-1,3-benzenediacetonitrile | 2-bromo-4,6-diisobutyl-5-nitro-1,3-benzenediacetonitrile |
| 2-fluoro-4,6-diisobutyl-1,3-benzenediacetonitrile | 2-fluoro-4,6-diisobutyl-5-nitro-1,3-benzenediacetonitrile |
| 2-chloro-4-ethyl-6-propyl-1,3-benzenediacetonitrile | 2-chloro-4-ethyl-5-nitro-6-propyl-1,3-benzenediacetonitrile |
| 2-fluoro-4-isobutyl-6-propyl-1,3-benzenediacetonitrile | 2-fluoro-4-isobutyl-5-nitro-6-propyl-1,3-benzenediacetonitrile |
| 4-tert-butyl-2-chloro-6-methyl-1,3-benzenediacetonitrile | 4-tert-butyl-2-chloro-6-methyl-5-nitro-1,3-benzenediacetonitrile |
| 4-tert-butyl-2-chloro-6-ethyl-1,3-benzenediacetonitrile | 4-tert-butyl-2-chloro-6-ethyl-5-nitro-1,3-benzenediacetonitrile |
| 4-tert-butyl-2-chloro-6-propyl-1,3-benzenediacetonitrile | 4-tert-butyl-2-chloro-5-nitro-6-propyl-1,3-benzenediacetonitrile |

EXAMPLE 30

Preparation of
4,6-Diisopropyl-α-methyl-1,3-benzenediacetonitrile

To a stirred suspension of 2.4 parts of oil-free sodium hydride in 100 parts of tetrahydrofuran is added 24 parts of 4,6-diisopropyl-1,3-benzenediacetonitrile. The reaction is slightly exothermic and, after the evolution of hydrogen has essentially ceased, 15 parts of methyl iodide is added and the mixture refluxed for 24 hrs. The tetrahydrofuran is distilled under reduced pressure. The residue is treated with water and methylene chloride. The two layers are separated and the methylene chloride layer is washed with dilute sodium bisulfite. The solution is cooled, treated with decolorizing charcoal and concentrated to a small volume. The residue is cooled slowly to −20°C and the resulting essentially pure α-methyl-4,6-diisopropyl-1,3-benzenediacetonitrile is collected.

EXAMPLE 31

Preparation of
α,α'-Dimethyl-2,5-diisopropyl-1,4-benzenediacetonitrile

To a stirred suspension of 144 parts of oil-free sodium hydride in 750 parts of tetrahydrofuran is added 72 parts of 2,5-diisopropyl-1,4-benzenediacetonitrile and 85 parts of methyl iodide at 25°C. The reaction mixture is cooled to 10°C and stirred at this temperature until the evolution of hydrogen ceases. The reaction mixture is allowed to warm to room temperature and the tetrahydrofuran is distilled under reduced pressure. The residue is treated with water and methylene chloride; the organic layer is washed with dilute sodium bisulfite, treated with decolorizing charcoal, and concentrated to a small volume. Addition to ether results in the crystallization of the compound as colorless crystals. After cooling to 0°C, the crystals are collected and washed in turn with −40°C ether and pentane, then dried, affording pure α,α'-dimethyl-2,5-diisopropyl-1,4-benzenediacetontrile, melting at 167°-170°C.

EXAMPLE 32

Preparation of
α,α,α'-Trimethyl-2,5-diisopropyl-1,4-benzenediacetonitrile

To a stirred suspension of 22 parts of oil-free sodium hydride in 750 parts of tetrahydrofuran is added 76 parts of 2,5-diisopropyl-1,4-benzenediacetonitrile and 200 parts of methyl iodide. The resulting mixture is stirred at 40°C for 3 hours. The tetrahydrofuran is removed by distillation under reduced pressure from a bath at 50°-60°C; methylene chloride and water are added to the solid residue, and the methylene chloride solution is separated, decolorized with charcoal, dried over anhydrous magnesium sulfate, and concentrated to a small volume. Crystallization of the residue from ether gives essentially pure α,α,α'-trimethyl-2,5-diisopropyl-1,4-benzenediacetonitrile as colorless crystals, m.p. 149°-157°C.

The following α-alkylated 1,3- and 1,4-benzenediacetonitriles can be prepared from the listed benzenediacetonitriles by appropriate substitution into the procedures of Examples 30 through 32.

TABLE XVII

| Starting Material | Product |
|---|---|
| 2-tert-butyl-1,4-benzenediacetonitrile | 2-tert-butyl-α,α'-1,4-benzenediacetonitrile |
| 2-isobutyl-1,4-benzenediacetonitrile | 2-isobutyl-α,α'-1,4-benzenediacetonitrile |
| 2-isopropyl-1,4-benzenediacetonitrile | α,α'-dimethyl-2-isopropyl-1,4-benzenediacetonitrile |
| 2-ethyl-1,4-benzenediacetonitrile | 2-ethyl-α,α'-dimethyl-1,4-benzenediacetonitrile |
| 2-tert-butyl-1,4-benzenediacetonitrile | 2-tert-butyl-α,α,α'-trimethyl-1,4-benzenediacetonitrile |
| 2-tert-butyl-1,4-benzenediacetonitrile | 2-tert-butyl-α,α',α'-trimethyl-1,4-benzenediacetonitrile |
| 2-isobutyl-1,4-benzenediacetonitrile | 2-isobutyl-α,α,α'-trimethyl-1,4-benzenediacetonitrile |
| 2-isobutyl-1,4-benzenediacetonitrile | 2-isobutyl-α,α',α'-trimethyl-1,4-benzenediacetonitrile |
| 2-isopropyl-1,4-benzenediacetonitrile | 2-isopropyl-α,α,α'-trimethyl-1,4-benzenediacetonitrile |
| 2-isopropyl-1,4-benzenediacetonitrile | 2-isopropyl-α,α',α'-trimethyl-1,4-benzenediacetonitrile |
| 6-tert-butyl-2-ethyl-1,4-benzenediacetonitrile | 6-tert-butyl-2-ethyl-α,α'-dimethyl-1,4-benzenediacetonitrile |
| 6-tert-butyl-2-isopropyl-1,4-benzenediacetonitrile | 6-tert-butyl-2-isopropyl-α,α'-dimethyl-1,4-benzenediacetonitrile |
| 6-tert-butyl-2-isopropyl-1,4-benzenediacetonitrile | 6-tert-butyl-2-isopropyl-α,α,α-trimethyl-1,4-benzenediacetonitrile |
| 6-tert-butyl-2-isopropyl-1,4-benzenediacetonitrile | 6-tert-butyl-2-isopropyl-α,α',α'-trimethyl-1,4-benzenediacetonitrile |
| 6-isobutyl-2-isopropyl-1,4-benzenediacetonitrile | 6-isobutyl-2-isopropyl-α,α,α'-trimethyl-1,4-benzenediacetonitrile |
| 2,6-diisopropyl-1,4-benzenediacetonitrile | 2,6-diisopropyl-α,α,α'-trimethyl-1,4-benzenediacetonitrile |
| 2,6-di-tert-butyl-1,4-benzenediacetonitrile | 2,6-di-tert-butyl-α,α,α'-trimethyl-1,4-benzenediacetonitrile |
| 2,6-diisobutyl-1,4-benzenediacetonitrile | 2,6-diisobutyl-α,α,α'-trimethyl-1,4-benzenediacetonitrile |
| 2,5-diisobutyl-1,4-benzenediacetonitrile | 2,5-diisobutyl-α,α'-dimethyl-1,4-benzenediacetonitrile |
| 2,5-diisopropyl-1,4-benzenediacetonitrile | 2,5-diisopropyl-α,α,α'-trimethyl-1,4-benzenediacetonitrile |
| 2,5-diisobutyl-1,4-benzenediacetonitrile | 2,5-diisobutyl-α,α,α'-trimethyl-1,4-benzenediacetonitrile |
| 2,5-di-tert-butyl-1,4-benzenediacetonitrile | 2,5-di-tert-butyl-α,α,α'-trimethyl-1,4-benzenediacetonitrile |
| 2,5-di-sec-butyl-1,4-benzenediacetonitrile | 2,5-di-sec-butyl-α,α,α'-trimethyl-1,4-benzenediacetonitrile |
| 2,5-dipropyl-1,4-benzenediacetonitrile | 2,5-dipropyl-α,α,α'-trimethyl-1,4-benzenediacetonitrile |
| 5-tert-butyl-2-isopropyl-1,4-benzenediacetonitrile | 5-tert-butyl-2-isopropyl-α,α,α'-trimethyl-1,4-benzenediacetonitrile |
| 5-tert-butyl-2-isopropyl-1,4-benzenediacetonitrile | 5-tert-butyl-2-isopropyl-α,α',α'-trimethyl-1,4-benzenediacetonitrile |
| 5-isobutyl-2-isopropyl-1,4-benzenediacetonitrile | 5-isobutyl-2-isopropyl-α,α,α'-trimethyl-1,4-benzenediacetonitrile |
| 5-isobutyl-2-isopropyl-1,4-benzenediacetonitrile | 5-isobutyl-2-isopropyl-α,α',α'-trimethyl-1,4-benzenediacetonitrile |
| 2-tert-butyl-5-isobutyl-1,4-benzenediacetonitrile | 2-tert-butyl-5-isobutyl-α,α',α'-trimethyl-1,4-benzenediacetonitrile |
| 2-tert-butyl-5-propyl-1,4-benzenediacetonitrile | 2-isopropyl-5-propyl-α,α',α'-trimethyl-1,4-benzenediacetonitrile |
| 2Fluoro-5-isobutyl-1,4-benzenediacetonitrile | 5-isobutyl-2-fluoro-α,α,α'-trimethyl-1,4-benzenediacetonitrile |
| 5-tert-butyl-2,3-dichloro-1,4-benzenediacetonitrile | 5-tert-butyl-2,3-dichloro-α,α,α'-trimethyl-1,4-benzenediacetonitrile |
| 3,6-dibromo-2,5-diisopropyl-1,4-benzenediacetonitrile | 3,6-dibromo-2,5-diisopropyl-α,α,α'-trimethyl-1,4-benzenediacetonitrile |
| 2-isopropyl-5-nitro-1,4-benzenediacetonitrile | 2-isopropyl-5-nitro-α,α,α'-trimethyl-1,4-benzenediacetonitrile |
| 2,5-diisobutyl-3-nitro-1,4-benzenediacetonitrile | 2,5-diisobutyl-3-nitro-α,α,α'-trimethyl-1,4-benzenediacetonitrile |
| 5-tert-butyl-3-nitro-2-propyl-1,4-benzenediacetonitrile | 5-tert-butyl-3-nitro-2-propyl-α,α,α'-trimethyl-1,4-benzenediacetonitrile |
| 2-isopropyl-3,5-dinitro-1,4-benzenediacetonitrile | 2-isopropyl-3,5-dinitro-α,α,α'-trimethyl-1,4-benzenediacetonitrile |
| 2-isobutyl-5-nitro-1,4-benzenediacetonitrile | 2-isobutyl-5-nitro-α,α,α'-trimethyl-1,4-benzenediacetonitrile |
| 2-isobutyl-1,4-benzenediacetonitrile | 2-isobutyl-α-methyl-1,4-benzenediacetonitrile |
| 2-isopropyl-1,4-benzenediacetonitrile | 2-isopropyl-α-methyl-1,4-benzenediacetonitrile |
| 6-tert-butyl-2-isopropyl-1,4-benzenediacetonitrile | 6-tert-butyl-2-isopropyl-α-methyl-1,4-benzenediacetonitrile |
| 6-tert-butyl-2-isopropyl-1,4-benzenediacetonitrile | 6-tert-butyl-2-isopropyl-α'-methyl-1,4-benzenediacetonitrile |
| 2,6-di-tert-butyl-1,4-benzenediacetonitrile | 2,6-di-tert-butyl-α'-methyl-1,4-benzenediacetonitrile |

TABLE XVII-Continued

| Starting Material | Product |
|---|---|
| 2,5-diisobutyl-1,4-benzenediacetonitrile | 2,5-diisobutyl-α-methyl-1,4-benzenediacetonitrile |
| 2,5-di-tert-butyl-1,4-benzenediacetonitrile | 2,5-di-tert-butyl-α-methyl-1,4-benzenediacetonitrile |
| 5-tert-butyl-2-isopropyl-1,4-benzenediacetonitrile | 5-tert-butyl-2-isopropyl-α-methyl-1,4-benzenediacetonitrile |
| 2-isobutyl-5-isopropyl-1,4-benzenediacetonitrile | 5-isobutyl-2-isopropyl-α-methyl-1,4-benzenediacetonitrile |
| 5-isopropyl-2-nitro-1,4-benzenediacetonitrile | 5-isopropyl-α-methyl-2-nitro-1,4-benzenediacetonitrile |
| 2-fluoro-5-isobutyl-1,4-benzenediacetonitrile | 5-isopropyl-α-methyl-2-nitro-1,4-benzenediacetonitrile |
| 2-isobutyl-1,3-benzenediacetonitrile | 2-isobutyl-α-methyl-1,3-benzenediacetonitrile |
| 5-isopropyl-1,3-benzenediacetonitrile | 5-isopropyl-α-methyl-1,3-benzenediacetonitrile |
| 5-isobutyl-1,3-benzenediacetonitrile | 5-isobutyl-α-methyl-1,3-benzenediacetonitrile |
| 5-tert-butyl-1,3-benzenediacetonitrile | 5-tert-butyl-α-methyl-1,3-benzenediacetonitrile |
| 4,6-diisobutyl-1,3-benzenediacetonitrile | 4,6-diisobutyl-α-methyl-1,3-benzenediacetonitrile |
| 6-tert-butyl-4-isopropyl-1,3-benzenediacetonitrile | 6-tert-butyl-4-isopropyl-α-methyl-1,3-benzenediacetonitrile |
| 6-isobutyl-4-isopropyl-1,3-benzenediacetonitrile | 6-isobutyl-4-isopropyl-α-methyl-1,3-benzenediacetonitrile |
| 6-isobutyl-4-nitro-1,3-benzenediacetonitrile | 6-isobutyl-α-methyl-4-nitro-1,3-benzenediacetonitrile |
| 6-tert-butyl-4-nitro-1,3-benzenediacetonitrile | 6-tert-butyl-α-methyl-4-nitro-1,3-benzenediacetonitrile |
| 6-chloro-2,5-diisopropyl-1,3-benzenediacetonitrile | 6-chloro-2,5-diisopropyl-α-methyl-1,3-benzenediacetonitrile |
| 6-chloro-2,5-diisobutyl-1,3-benzenediacetonitrile | 6-chloro-2,5-diisobutyl-α-methyl-1,3-benzenediacetonitrile |
| 2,4-diisobutyl-5-nitro-1,3-benzenediacetonitrile | 2,4-diisobutyl-α-methyl-5-nitro-1,3-benzenediacetonitrile |
| 2,4-diisopropyl-5-nitro-1,3-benzenediacetonitrile | 2,4-diisopropyl-α-methyl-5-nitro-1,3-benzenediacetonitrile |
| 6-tert-butyl-2-isopropyl-5-nitro-1,3-benzenediacetonitrile | 6-tert-butyl-2-isopropyl-α-methyl-5-nitro-1,3-benzenediacetonitrile |
| 2,5-dichloro-4,6-diisobutyl-1,3-benzenediacetonitrile | 2,5-dichloro-4,6-diisobutyl-α-methyl-1,3-benzenediacetonitrile |
| 2,5-difluoro-4,6-diisopropyl-1,3-benzenediacetonitrile | 2,5-difluoro-4,6-diisopropyl-α-methyl-1,3-benzenediacetonitrile |
| 5-chloro-2,4-diisobutyl-1,3-benzenediacetonitrile | 5-chloro-2,4-diisobutyl-α-methyl-1,3-benzenediacetonitrile |
| 5-chloro-2,4-diisopropyl-1,3-benzenediacetonitrile | 5-chloro-2,4-diisopropyl-α-methyl-1,3-benzenediacetonitrile |
| 4,6-diisopropyl-5-nitro-1,3-benzenediacetonitrile | 4,6-diisopropyl-α-methyl-5-nitro-1,3-benzenediacetonitrile |
| 4,6-di-tert-butyl-5-nitro-1,3-benzenediacetonitrile | 4,6-di-tert-butyl-α-methyl-5-nitro-1,3-benzenediacetonitrile |
| 6-tert-butyl-4-isopropyl-5-nitro-1,3-benzenediacetonitrile | 6-tert-butyl-4-isopropyl-α-methyl-5-nitro-1,3-benzenediacetonitrile |
| 5-chloro-4,6-diisopropyl-2-nitro-1,3-benzenediacetonitrile | 5-chloro-4,6-diisopropyl-α-methyl-2-nitro-1,3-benzenediacetonitrile |
| 5-fluoro-4,6-diisobutyl-2-nitro-1,3-benzenediacetonitrile | 5-fluoro-4,6-diisobutyl-α-methyl-2-nitro-1,3-benzenediacetonitrile |
| 2,4-dichloro-6-isobutyl-1,3-benzenediacetonitrile | 2,4-dichloro-6-isobutyl-α-methyl-1,3-benzenediacetonitrile |
| 5-chloro-6-isopropyl-1,3-benzenediacetonitrile | 5-chloro-6-isopropyl-α-methyl-1,3-benzenediacetonitrile |
| 5-bromo-6-isobutyl-1,3-benzenediacetonitrile | 5-bromo-6-isobutyl-α-methyl-1,3-benzenediacetonitrile |
| 4-isobutyl-5-nitro-1,3-benzenediacetonitrile | 5-nitro-4-isobutyl-α-methyl-1,3-benzenediacetonitrile |
| 5-chloro-2-isopropyl-4-nitro-1,3-benzenediacetonitrile | 5-chloro-2-isopropyl-α-methyl-4-nitro-1,3-benzenediacetonitrile |
| 4-isopropyl-5-nitro-1,3-benzenediacetonitrile | 4-isopropyl-α-methyl-5-nitro-1,3-benzenediacetonitrile |
| 2-isopropyl-1,3-benzenediacetonitrile | 2-isopropyl-α,α'-dimethyl-1,3-benzenediacetonitrile |
| 5-isopropyl-1,3-benzenediacetonitrile | 5-isopropyl-α,α'-dimethyl-1,3-benzenediacetonitrile |
| 5-isobutyl-1,3-benzenediacetonitrile | 5-isobutyl-α,α'-dimethyl-1,3-benzenediacetonitrile |
| 4,6-di-tert-butyl-1,3-benzenediacetonitrile | 4,6-di-tert-butyl-α,α'-dimethyl-1,3-benzenediacetonitrile |
| 6-tert-butyl-4-isopropyl-1,3-benzenediacetonitrile | 6-tert-butyl-4-isopropyl-α,α'-dimethyl-1,3-benzenediacetonitrile |
| 4,6-diisobutyl-1,3-benzenediacetonitrile | 4,6-diisobutyl-α,α'-dimethyl-1,3-benzenediacetonitrile |
| 6-chloro-2,5-diisobutyl-1,3-benzenediacetonitrile | 6-chloro-2,5-diisobutyl-α,α'-dimethyl-1,3-benzenediacetonitrile |
| 2,4-diisobutyl-5-nitro-1,3-benzenediacetonitrile | 2,4-diisobutyl-α,α'-dimethyl-5-nitro-1,3-benzenediacetonitrile |
| 6-tert-butyl-2-isopropyl-5-nitro-1,3-benzenediacetonitrile | 6-tert-butyl-2-isopropyl-α,α'-dimethyl-5-nitro-1,3-benzenediacetonitrile |
| 2,5-dichloro-4,6-diisobutyl-1,3-benzenediacetonitrile | 2,5-dichloro-4,6-diisobutyl-α,α'-dimethyl-1,3-benzenediacetonitrile |
| 5-chloro-2,4-diisobutyl-1,3-benzenediacetonitrile | 5-chloro-2,4-diisobutyl-α,α'-dimethyl-1,3-benzenediacetonitrile |
| 4,6-di-tert-butyl-5-nitro-1,3-benzenediacetonitrile | 4,6-di-tert-butyl-α,α'-dimethyl-5-nitro-1,3-benzenediacetonitrile |
| 5-chloro-4,6-diisobutyl-2-nitro-1,3-benzenediacetonitrile | 5-chloro-4,6-diisobutyl-α,α'-dimethyl-2-nitro-1,3-benzenediacetonitrile |
| 2,4-dichloro-6-isobutyl-1,3-benzenediacetonitrile | 2,4-dichloro-6-isobutyl-α,α'-dimethyl-1,3-benzenediacetonitrile |
| 5-chloro-6-isopropyl-1,3-benzenediacetonitrile | 5-chloro-6-isopropyl-α,α'-dimethyl-1,3-benzenediacetonitrile |
| 4-isobutyl-5-nitro-1,3-benzenediacetonitrile | 4-isobutyl-α,α'-dimethyl-5-nitro-1,3-benzenediacetonitrile |
| 5-chloro-2-isopropyl-4-nitro-1,3-benzenediacetonitrile | 5-chloro-2-isopropyl-α,α'-dimethyl-4-nitro-1,3-benzenediacetonitrile |
| 2-isopropyl-1,3-benzenediacetonitrile | 2-isopropyl-α,α,α'-trimethyl-1,3-benzenediacetonitrile |
| 2-isobutyl-1,3-benzenediacetonitrile | 2-isobutyl-α,α,α'-trimethyl-1,3-benzenediacetonitrile |
| 5-isopropyl-1,3-benzenediacetonitrile | 5-isopropyl-α,α,α'-trimethyl-1,3-benzenediacetonitrile |
| 5-isobutyl-1,3-benzenediacetonitrile | 5-isobutyl-α,α,α'-trimethyl-1,3-benzenediacetonitrile |
| 5-tert-butyl-1,3-benzenediacetonitrile | 5-tert-butyl-α,α,α'-trimethyl-1,3-benzenediacetonitrile |
| 4,6-diisobutyl-1,3-benzenediacetonitrile | 4,6-diisobutyl-α,α,α'-trimethyl-1,3-benzenediacetonitrile |
| 4,6-di-tert-butyl-1,3-benzenediacetonitrile | 4,6-di-tert-butyl-α,α,α'-trimethyl-1,3-benzenediacetonitrile |
| 4,6-di-sec-butyl-1,3-benzenediacetonitrile | 4,6-di-sec-butyl-α,α,α'-trimethyl-1,3-benzenediacetonitrile |
| 4,6-diisopropyl-1,3-benzenediacetonitrile | 4,6-diisopropyl-α,α,α'-trimethyl-1,3-benzenediacetonitrile |
| 6-tert-butyl-4-propyl-1,3-benzenediacetonitrile | 6-tert-butyl-4-propyl-α,α,α'-trimethyl-1,3-benzenediacetonitrile |
| 6-tert-butyl-4-isopropyl-1,3-benzenediacetonitrile | 6-tert-butyl-4-isopropyl-α,α,α'-trimethyl-1,3-benzenediacetonitrile |
| 6-isobutyl-4-isopropyl-1,3-benzenediacetonitrile | 6-isobutyl-4-isopropyl-α,α,α'-trimethyl-1,3-benzenediacetonitrile |
| 6-tert-butyl-4-isobutyl-1,3-benzenediacetonitrile | 6-tert-butyl-4-isobutyl-α,α,α'-trimethyl-1,3-benzenediacetonitrile |
| 2-tert-butyl-6-chloro-5-isopropyl-1,3-benzenediacetonitrile | 2-tert-butyl-6-chloro-5-isopropyl-α,α,α'-trimethyl-1,3-benzenediacetonitrile |
| 2,4-diisobutyl-5-nitro-1,3-benzenediacetonitrile | 2,4-diisobutyl-α,α,α'-trimethyl-5-nitro-1,3-benzenediacetonitrile |
| 6-tert-butyl-2-isopropyl-5-nitro-1,3-benzenediacetonitrile | 6-tert-butyl-2-isopropyl-α,α,α'-trimethyl-5-nitro-1,3-benzenediacetonitrile |
| 2,5-dichloro-4,6-diisopropyl-1,3-benzenediacetonitrile | 2,5-dichloro-4,6-diisopropyl-α,α,α'-trimethyl-1,3-benzenediacetonitrile |
| 2,5-dichloro-4,6-diisobutyl-1,3-benzenediacetonitrile | 2,5-dichloro-4,6-diisobutyl-α,α,α'-trimethyl-1,3-benzenediacetonitrile |
| 5-chloro-4,6-diisobutyl-2-nitro-1,3-benzenediacetonitrile | 5-chloro-4,6-diisobutyl-α,α,α'-trimethyl-2-nitro-1,3-benzenediacetonitrile |
| 6-tert-butyl-4-nitro-1,3-benzenediacetonitrile | 6-tert-butyl-4-nitro-α,α,α'-trimethyl-1,3-benzenediacetonitrile |
| 4-chloro-6-isobutyl-1,3-benzenediacetonitrile | 4-chloro-6-isobutyl-α,α,α'-trimethyl-1,3-benzenediacetonitrile |
| 5-tert-butyl-2-isopropyl-1,3-benzenediacetonitrile | 5-tert-butyl-2-isopropyl-α,α,α'-trimethyl-1,3-benzenediacetonitrile |
| 2-isobutyl-5-isopropyl-1,3-benzenediacetonitrile | 2-isobutyl-5-isopropyl-α,α,α'-trimethyl-1,3-benzenediacetonitrile |
| 5-tert-butyl-2-propyl-1,3-benzenediacetonitrile | 5-tert-butyl-2-propyl-α,α,α'-trimethyl-1,3-benzenediacetonitrile |
| 6-chloro-2,5-diisobutyl-1,3-benzenediacetonitrile | 6-chloro-2,5-diisobutyl-α,α,α'-trimethyl-1,3-benzenediacetonitrile |
| 6-tert-butyl-5-chloro-4-ethyl-2-nitro-1,3-benzenediacetonitrile | 6-tert-butyl-5-chloro-4-ethyl-α,α,α'-trimethyl-2-nitro-1,3-benzenediacetonitrile |
| 5-chloro-2,4-diisopropyl-1,3-benzenediacetonitrile | 5-chloro-2,4-diisopropyl-α,α,α'-trimethyl-1,3-benzenediacetonitrile |
| 5-chloro-2,4-diisobutyl-1,3-benzenediacetonitrile | 5-chloro-2,4-diisobutyl-α,α,α'-trimethyl-1,3-benzenediacetonitrile |
| 2,4-dichloro-6-isobutyl-1,3-benzenediacetonitrile | 2,4-dichloro-6-isobutyl-α,α,α'-trimethyl-1,3-benzenediacetonitrile |
| 2,4-dichloro-6-isopropyl-α,α'-benzenediacetonitrile | 2,4-dichloro-6-isopropyl-α,α,α'-trimethyl-1,3-benzenediacetonitrile |
| 5-chloro-6-isopropyl-1,3-benzenediacetonitrile | 5-chloro-6-isopropyl-α,α,α'-trimethyl-1,3-benzenediacetonitrile |
| 5-chloro-6-isobutyl-1,3-benzenediacetonitrile | 5-chloro-6-isobutyl-α,α,α'-trimethyl-1,3-benzenediacetonitrile |
| 5-chloro-2-isobutyl-4-nitro-1,3-benzenediacetonitrile | 5-chloro-2-isobutyl-α,α,α'-trimethyl-1,3-benzenediacetonitrile |

The compounds of Formula (1) can be formulated for herbicidal use in conventional ways. The formulations can be wettable powders, dusts, suspensions in water and/or organic solvents, solutions, emulsifiables, high-strength compositions, pellets, or granules. The other herbicides listed above can be tank-mixed with the compounds of Formula (1) in the form of finished formulations or they can be combined to give single formulations for reasons of convenience. The formulations will include inert carrier materials and/or surfactants which serve as wetting, emulsifying, and/or dispersing agents. Anionic or nonionic surfactants are preferred; lists of suitable surfactants can be found in "Detergents and Emulsifiers Annual" (1971) by John W. McCutcheon, Inc. The formulations will contain about 2 to 99 percent by weight, of active compound or compounds, up to about 20 percent by weight of a surfactant, and/or up to about 98 percent by weight of inert solid or liquid carrier. For dusts, from 2 to 25 percent of active compound can be used, for granules or pellets 5–50 percent, for solutions or suspensions 10–75 percent, for wettable powders 20–90 percent, and high-strength compositions 90–99 percent. In some instances the surfactant may be used at up to 5 times the amount of active ingredient to improve the effectiveness of the active compound. This amount of surfactant is most conveniently applied as a tank mix with the active component.

Organic liquids suitable for preparation of solutions, suspensions, and emulsifiable concentrates containing the compounds of Formula (1) include alcohols, glycols, mono- and dialkyl ethers of ethylene glycol and diethylene glycol, ketones, esters, sulfamides, amides, paraffinic hydrocarbons, aromatic hydrocarbons, and halogenated hydrocarbons. Liquids containing hydroxy or amino groups may react in storage with halomethyl aromatic compounds, so for best stability this combination should be avoided. At normal levels surfactants containing a small proportion of hydroxyl groups (e.g., polyethylene glycol ethers) react surprisingly little. Choice of a liquid is dictated by the reactivity, the solubility of the active compound to be used and whether a suspension or solution is desired. In general, compounds of Formula (1) are insufficiently soluble in water to permit aqueous solution formulations.

Solid, inert carrier materials suitable for wettable powders, pellets and granules include natural clays, synthetic fine silicas, and other materials commonly used for this purpose.

Further information concerning the preparation of herbicidal formulations can be found in U.S. Pat. No. 3,235,357 and in the following sections A through D.

A. WETTABLE POWDERS

Wettable powders are water-dispersible compositions containing the active material, an inert solid extender, and one or more surfactants to provide rapid wetting and prevent heavy flocculation when suspended in water.

The inert extenders which are preferred for use in the wettable powders of this invention containing the active compounds are of mineral origin.

The classes of extenders suitable for the wettable powder formulations of this invention are the natural clays, diatomaceous earth, and synthetic mineral fillers derived from silica and silicate. Most preferred fillers for this invention are kaolinites, attapulgite clay, montmorillonite clays, syntheic silicas, synthetic magnesium silicate and calcium sulfate dihydrate.

Suitable surfactants for use in such compositions are those listed by J. W. McCutcheon in "Detergents and Emulsifiers" 1971 Annual. Among the more preferred surfactants are the non-ionic and anionic type, and those most suitable for the preparation of the dry, wettable products of this invention are solid forms of compounds known to the art as wetters and dispersants. Occasionally a liquid, non-ionic compound classified primarily as an emulsifier may serve as both wetter and dispersant.

Most preferred wetting agents are alkylbenzene and alkylnaphthalene sulfonates, sulfated fatty alcohols, amines or acid amides, long-chain acid esters of sodium isethionate, esters of sodium sulfosuccinate, sulfated or sulfonated fatty acid esters, petroleum sulfonates, sulfonated vegetable oils, and ditertiary acetylenic glycols. Preferred dispersants are methyl cellulose, polyvinyl alcohol, lignin sulfonates, polymeric alkylnaphthalene sulfonates, sodium naphthalenesulfonate, polymethylene bisnaphthalenesulfonate, and sodium N-methyl-N-(long-chain acid) taurates.

Wetting and dispersing agents in these preferred wettable powder compositions of this invention are usually present at concentrations of from about 0.25 weight percent to 5 weight per cent. The inert extender then completes the formulation. Where needed, 0.1 weight per cent to 1.0 weight percent of the extender may be replaced by a corrosion inhibitor or an anti-foaming agent or both.

Thus, wettable powder formulations of the invention will contain from about 20 to 90 weight per cent active material, from 0.5 to 3.0 weight per cent wetting agent, from 0.25 to 5.0 weight per cent dispersant, and from 9.25 to 79.25 weight per cent inert extender, as these terms are described above.

Wettable powders can conveniently be produced by blending the ingredients in conventional blenders, followed by grinding the mixture one or more times in a hammer mill, pin mill, fluid energy mill or the like. Particle size classifiers may be used to remove over-size material for further grinding. It is usually desirable to reblend after milling and to sift out flakes and debris before packaging.

B. HIGH-STRENGTH COMPOSITIONS AND AQUEOUS AND OIL SUSPENSION CONCENTRATES

High-strength compositions generally consist of 90 to 99 percent active ingredient and 1.0 to 10 percent of a solid inert absorptive diluent or a liquid or solid surfactant such as those described by McCutcheon in "Detergents and Emulsifiers" 1971 Annual. Such high-strength compositions can often be used in a manner similar to the wettable powders but they are also suitable for further formulation.

The aqueous suspension concentrates are prepared by mixing together and sandgrinding an aqueous slurry of waterinsoluble active ingredient in the presence of dispersing agents. Thus there is obtained a concentrated slurry of very finely divided particles in which the active ingredient is substantially all below 10 microns in size. This concentrated aqueous suspension is characterized by its extremely small particle size so that upon diluting and spraying, a very uniform coverage is obtained.

These aqueous suspension concentrates will contain from 10 to 50 percent of active ingredient, from 45 to 70 percent water with the remainder made up of surfactants, corrosion inhibitors, and suspending agents.

Suspensions in organic liquids can be prepared in a similar manner such as by replacing the water with mineral oil.

C. SOLUTIONS AND EMULSIFIABLE OILS

Emulsifiable oils are usually solutions of active material in non-water miscible solvents together with a surfactant. Omission of the surfactant gives a solution which can be applied by low volume techniques or diluted with weed oils.

For the compounds of this invention, emulsifiable oils can be made by mixing the active ingredient with a solvent and surfactant. Suitable solvents for the compounds of this invention are aromatic hydrocarbons including many weed oils, chlorinated solvents, and non-water miscible ethers, esters, or ketones. Suitable surfactants are those anionic or non-ionic agents known to the art as emulsifying agents. Such compounds can be found listed in "Detergents and Emulisifiers" 1971 Annual by John w. McCutcheon, Inc.

Emulsifying agents most suitable for the emulsifiable oil compositions of this invention are long-chain alkyl or mercaptan polyethoxy alcohols, alkylaryl polyethoxy alcohols, sorbitan fatty acid esters, polyoxyethylene ethers with sorbitan fatty acid esters, polyethylene glycol esters with fatty or rosin acids, fatty alkylol amide condensates, calcium and amine salts of fatty alcohol sulfates, oil soluble petroleum sulfonates or, preferably, mixtures of these emulsifying agents. Such emulsifying agents will comprise from about 1 to 10 weight percent of the total composition. As described above, however, up to 5 parts of emulsifying agent for each part of active compound can be used.

Thus, emulsifiable oil compositions of the present invention will consist of from about 10 to 50 weight percent active material, about 40 to 89 weight percent solvent, and about 1 to 10 weight per cent emulsifier, as these terms are defined and used above.

In some instances the oil solution may be intended merely for extension with other oils, such as weed oils or for low volume application. In this instance the emulsifying agents may be omitted and may be replaced by additional solvent.

D. GRANULES AND PELLETS

Granules and pellets are physically stable, particulate compositions containing the active compounds which adhere to or are distributed through a basic matrix of a coherent, inert carrier with macroscopic dimensions. In order to aid leaching of the active ingredient from the granule or pellet, a surfactant can be present.

For the compounds of this invention, the inert carrier is preferably of mineral origin, and the surfactant is a compound known to the art as a wetting agent. Such compounds are listed by J. W. McCutcheon in "Detergents and Emulsifiers" 1971 Annual.

Suitable carriers are natural clays, some pyrophyllites and vermiculite. Suitable wetting agents are anionic or non-ionic.

For the granule compositions of this invention, most suitable carriers are of two types. The first are porous, absorptive, preformed granules, such as preformed and screened granular attapulgite or heat expanded, granular, screened vermiculite. On either of these, a solution of the active agent can be sprayed and will be absorbed at concentrations up to 25 weight per cent of the total weight. The second, which are also suitable for pellets, are initially powdered kaolin clays, hydrated attapulgite, or bentonite clays in the form of sodium, calcium or magnesium bentonites. Water-soluble salts, such as sodium salts, may also be present to aid in the disintegration of granules or pellets in the presence of moisture. These ingredients are blended with the active components to give mixtures that are granulated or pelleted, followed by drying, to yield formulations with the active component distributed uniformly throughout the mass. Such granules and pellets can also be made with up to 50 weight per cent active component, but more frequently a concentration of about 10 weight percent is desired for optimum distribution. The granular compositions of this invention are most useful in a size range of 15–80 mesh (1.3–0.18 mm).

The most suitable surfactants for the granular compositions of this invention depend upon the type of granule used. When preformed granules are sprayed with active material in liquid form the most suitable surfactants agents are non-ionic, liquid wetters miscible with the solvent. These are compounds more generally known to the art as emulsifiers, and comprise alkylaryl polyether alcohols, alkyl polyether alcohols, polyoxyethylene sorbitan fatty acid esters, polyethylene glycol esters with fatty or rosin acids, fatty alkylol amide condensates, oil soluble petroleum or vegetable oil sulfonates, or mixtures of these. Such agents will usually comprise up to about 5 weight per cent of the total composition.

When the active ingredient is first mixed with a powdered carrier and subsequently granulated, or pelleted, liquid non-ionic wetters can still be used, but it is usually preferable to incorporate at the mixing stage one of the solid, powdered anionic wetting or dispersing agents such as those previously listed for the wettable powders. Such agents will comprise from about 0 to 2 weight percent of the total composition.

Thus, the preferred granular or pelleted formulations of this invention comprise about 5 to 30 weight percent active material, about 0 to 5 weight percent surfactant agent, and about 65 to 95 weight percent inert mineral carrier, as these terms are used herein.

Some preferred herbicidal compositions and methods of this invention are illustrated by the following examples, in which all parts, proportions, and percentages are by weight unless indicated otherwise.

EXAMPLE A

| Wettable Powder | |
|---|---|
| 2,5-diisopropyl-1,4-benzenediacetonitrile | 80% |
| sodium alkylnaphthalenesulfonate | 2% |
| low viscosity methyl cellulose | 2% |
| diatomaceous earth | 16% |

The ingredients are thoroughly blended, passed through a hammer mill to produce an average particle size under 40 microns, reblended and sifted through a U.S.S. No. 50 sieve (0.3 mm openings) before packaging.

The following compounds can be formulated in like manner:

3,6-dichloro-2,5-diisopropyl-1,4-benzenediacetonitrile
5-isobutyl-2-isopropyl-1,4-benzenediacetonitrile
2-tert-butyl-5-isopropyl-1,4-benzenediacetonitrile
2-tert-butyl-5-isopropyl-1,3-benzenediacetonitrile Six kilograms of the above formulation and 1 kilogram of linuron (Lorox, 50W) are mixed with 500 liters of water and applied by preplant soil incorporation to a hectare of field corn in Matapeake silt loam soil to control jimsonweed (*Datura stamonium*), witchgrass (*Panicum capillare*), lambsquarter (*Chenopodium album*), and barnyardgrass (*Echinochloa crusgalli*).

EXAMPLE B

Wettable Powder

| | |
|---|---|
| 6-isopropyl-4-nitro-1,3-benzenediacetonitrile | 20% |
| dioctyl sodium sulfosuccinate | 2% |
| sodium lignin sulfonate | 3% |
| finely divided synthetic silica | 5% |
| attapulgite | 70% |

The ingredients are thoroughly blended, passed through a hammer mill to produce an average particle size under 50 microns, reblended, and sifted through a U.S.S. No. 50 sieve (0.3 mm opening) before packaging.

All compounds of this invention can be formulated in a like manner.

Six kilograms of the above formulation and 2 kilograms of linuron (Lorox, 50W) are mixed with 400 liters of water and applied at planting to a hectare of field corn planted in Norfolk sandy loam soil. The treatment is applied preemergence to both the corn and weeds, in order to control many weeds including teaweed (*Side spinosa*), lambsquarter, barnyardgrass and goosegrass (*Eleusine indicia*).

EXAMPLE C

Wettable Powder

| | |
|---|---|
| 2-isopropyl-5-nitro-1,4-benzenediacetonitrile | 50% |
| sodium N-methyl-N-oleoyl taurate (Igepon T 73) | 3% |
| sodium lignin sulfonate (Polyfon F) | 2% |
| fine silica (Hi-sil 233) | 45% |

The ingredients are blended, passed through a hammer mill, and are air-milled to produce a wettable powder with an average particle size under 15 microns. The product is reblended and sifted through a U.S.S. No. 50 mesh screen (screen opening 0.3 mm) before packaging.

The following compounds can be formulated in like manner:

2,5-diisobutyl-1,4-benzenediacetonitrile
2,5-di-tert-butyl-1,4-benzenediacetonitrile
2,5-diisobutyl-3-nitro-1,4-benzenediacetonitrile
2,4,6-trisopropyl-1,3-benzenediacetonitrile
5-tert-butyl-5-ethyl-1,3-benzenediacetonitrile
2-tert-butyl-5-sec-butyl-1,4-benzenediacetonitrile
2-sec-butyl-5-isopropyl-1,4-benzenediacetonitrile Fourteen kilograms of the above formulation are dispersed in 450 liters of water and sprayed preemergence on a hectare of soybeans planted in Cumberland loam soil. The soybeans grow to maturity producing a high yield of beans. Several troublesome grass weeds are removed from competition with the soybeans by the herbicide treatment.

The other compounds listed may be applied in a like manner to give similar results.

EXAMPLE D

Emulsifiable Concentrate

| | |
|---|---|
| 4,6-di-sec-butyl-1,3-benzenediacetonitrile | 25% |
| blend of poly-alcohol carboxylic esters and oil-soluble sulfonates | 8% |
| isophorone | 67% |

The ingredients are blended by simple stirring. The materials may be heated gently to approximately 50°–60°C in order to facilitate the mixing.

The product is an emulsifiable concentrate that can be extended with water to form emulsions that are suitable for spraying.

Ten kilograms of the above formulations and 4 kilograms of amiben (Amiben, 2 E) are mixed with 450 liters of water and applied preemergence to a hectare of soybeans planted in Russell silt loam soil in order to control such weeds as crabgrass, yellow rocket (*Barbarca vulgaris*), barnyardgrass, pigweed, and dallisgrass (*Paspallum dilatatum*).

EXAMPLE E

Oil Suspension

| | |
|---|---|
| 2,4,6-triisopropyl-1,3-benzenediacetonitrile | 30% |
| polyoxyethylene sorbitol heptaoleate | 8% |
| synthetic fine silica | 1% |
| paraffinic hydrocarbon oil | 61% |

The ingredients are combined and sand milled to produce particles essentially all below 5 microns. For application, the product can be extended with either oils or water. An emulsion is formed in the latter.

The following compounds can be formulated in like manner:

2,5-di-t-butyl-1,4-benzenediacetonitrile
2-sec-butyl-5-isopropyl-1,4-benzenediacetonitrile 20 liters of the above formulation are dispersed with bypass agitation in 400 liters of water and sprayed preemergence on a hectare of soybeans planted in Flanagan silt loam soil to control such troublesome weeds as pigweed (*Amaranthus sp.*), goosegrass (*Eleusine indica*), Johnsongrass seedlings (*Sorghum halepense*), foxtail (*Setaria spp.*) and crabgrass (*Digitaria spp.*). Soybeans grow vigorously and produce a good yield of quality beans.

The other compounds listed may be applied in the described manner to obtain similar results.

EXAMPLE F

Emulsifiable Concentrate

| | |
|---|---|
| 5-sec-butyl-2-isobutyl-1,4-benzenediacetonitrile | 25% |
| blend of polyalcohol carboxylic esters and oil-soluble sulfonates | 8% |
| xylene | 67% |

The ingredients are blended by simple stirring. The materials may be heated gently to approximately 50°–60°C in order to facilitate the mixing.

The product is an emulsifiable concentrate that can be extended with water to form emulsions that are suitable for spraying.

Sixteen kilograms of the above emulsifiable concentrate and 4 kilograms of amiben (Amiben, 2 E) are mixed with 400 liters of water and applied to a hectare of soybeans planted in Butlertown silt loam soil. The treatment is applied preemergence to both the soybeans and weeds to control pigweed (Amaranthus sp.), green foxtail (Setaria viridis), morning glory (Ipoemea spp.), and common crabgrass.

The following compounds can be formulated and applied in like manner to give similar results:
2-ethyl-5-sec-isopentyl-1,3-benzenediacetonitrile and
2-sec-butyl-5-tert-butyl-1,3-benzenediacetonitrile

EXAMPLE G

| Solution | |
|---|---|
| 2-ethyl-5-tert-pentyl-1,3-benzenediacetonitrile | 25% |
| isophorone | 75% |

The two ingredients are stirred together to produce a solution suitable for low-volume direct application.

The above formulation is applied at 20 kilograms per hectare to field corn planted in Matapeake silt loam soil. The treatment is applied preemergence at planting to control dallisgrass, morningglory, common crabgrass, johnsongrass, and other weeds.

EXAMPLE H

| Granules | |
|---|---|
| 5-isopropyl-2,4-dimethyl-1,3-benzenediacetonitrile | 20% |
| preformed attapulgite clay granules | 80% |

The active ingredient and preformed granules are thoroughly blended to produce a homogeneous mixture. The mixture is slowly heated while tumbling to slightly above the melting point of the active ingredient for a period of time suitable to melt all the active ingredient. The mixture is then slowly cooled while tumbling to produce a free flowing granule suitable for hand or machine application.

The above granules are applied at a rate of 20 kilograms per hectare to sweet corn planted in Norfolk sandy loam soil. The granules are applied at planting to control such weeds as crabgrass, curly dock (Rumex crispus) and giant foxtail (Setaria faberii).

EXAMPLE I

| Granules | |
|---|---|
| 5-tert-butyl-2-ethyl-1,3-benzenediacetonitrile | 10% |
| alkylnaphthalene sulfonic acid, Na salt | 1% |
| preformed granular diatomaceous silica | 89% |

The active material and surfactant are dissolved in methylene chloride and sprayed upon the diatomaceous silica granules while tumbling the latter. The product is then dried to yield granules suitable for hand or machine application.

2-tert-Butyl-5-sec-butyl-1,4-benzenediacetonitrile can be formulated in like manner.

The above granules are applied at thirty kilograms per hectare to soybeans planted in Butlertown silt loam soil. The granules are applied at planting to control such troublesome weeds as dallisgrass, barnyardgrass and pigweed.

2-tert-Butyl-5-sec-butyl-1,4-benzenediacetonitrile granules may be applied in the same manner to provide similar results.

EXAMPLE J

| Solution | |
|---|---|
| 6-isopropyl-4-nitro-1,3-benzenediacetonitrile | 35% |
| triethanolamine salt of alkyl aryl sulfonic acid | 2% |
| dimethylformamide | 63% |

The three ingredients are stirred together to produce a solution suitable for low-volume direct application.

The above formulation without dilution is applied by airplane to recently planted spring wheat at the rate of 15 liters per hectare to control cheatgrass (Bromus secalinus) and other annular grasses which cause considerable reduction in wheat yields if not controlled.

5-sec-Butyl-2-isobutyl-1,4-benzenediacetonitrile can be formulated and applied in like manner to give similar weed control.

EXAMPLE K

| Wettable Powder | |
|---|---|
| 2,5-di-tert-butyl-1,4-xylylene dichloride | 65% |
| dodecylphenol polyethylene glycol ether | 2% |
| sodium lignin sulfonate | 4% |
| montmorillonite (calcined) | 26% |
| silica aerogel | 3% |

The liquid surfactant is added by spraying upon the solid ingredients in a blender. After coarse hammer milling, the product is air milled to produce particles essentially all below 20 microns.

Six kilograms of the above formulation and 1 kilogram of linuron (Lorox, 50 W) are mixed with 400 liters of water and applied preemergence to a hectare of soybeans planted in Hatboro silt loam soil. Good control of pigweed, crabgrass, morningglory, and giant foxtail is provided.

EXAMPLE L

| Wettable Powder | |
|---|---|
| 4-tert-butyl-2-ethyl-1,3-xylylene dichloride | 30% |
| sodium N-methyl-N-oleyltaurate | 3% |
| sodium ligninsulfonate (four moles sulfonation) | 2% |
| synthetic fine silica | 50% |
| kaolinite | 15% |

The ingredients are blended, passed through a hammer mill, and then air milled to produce a wettable powder, essentially all below 40 microns. The product is reblended, sifted through a U.S.S. No. 50 screen (0.3 mm opening) and packaged.

Fifteen kilograms of the above formulation are suspended in 350 liters of water and applied preemergence to a hectare of rice. Many serious grassy weeds such as barnyardgrass, crabgrass, and goosegrass are controlled.

EXAMPLE M

| Granules and Pellets | |
|---|---|
| 2,6-di-sec-butyl-1,3-xylylene dichloride | 10% |
| anhydrous sodium sulfate | 10% |
| crude calcium lignin sulfonate | 5% |
| sodium alkylnaphthalene sulfonate | 1% |
| calcium/magnesium bentonite | 37% |
| kaolinite | 37% |

The ingredients are blended, hammer milled and then moistened with about 12 percent water. The mixture is extruded as ca 3 mm diameter cylinders and cut to produce pellets about 3 mm long. These can be used as such after drying, or can be crushed to pass a U.S.S. No. 20 sieve (0.84 mm openings). The granules held on a U.S.S. No. 40 sieve (0.42 mm openings) may be packaged for use and the fines recycled.

The above granules are applied as uniformly as possible to soybeans planted in Hatboro silt loam soil at a rate of 50 kilograms per hectare. The granules are applied preemergence to both the soybeans and weeds. Good control of crabgrass, pigweed and goosegrass is provided.

2,5-Diisobutyl-1,4-benzenediacetonitrile and 2-tert-butyl-5-isopropyl-1,3-benzenediacetonitrile may be formulated and applied in like manner to provide similar results.

EXAMPLE N

| Emulsifiable Concentrate | |
|---|---|
| 2,5-diisobutyl-1,4-xylylene dichloride | 35% |
| chlorobenzene | 59% |
| sulfonates and polyoxyethylene ethers | 6% |

The ingredients are combined and stirred with gentle heating to speed solution. A fine screen filter is included in the packaging line to insure the absence of any undissolved matter in the final product.

Twenty kilograms of the above formulation are mixed with 450 liters of water and applied to a hectare of wheat planted in Muscatine silt loam soil. The treatment is applied preemergence to both the wheat and weeds. Outstanding control of such weeds as crabgrass, goosegrass, barnyardgrass, mustard (Brassica spp.) and giant foxtail is obtained.

EXAMPLE O

| Solution | |
|---|---|
| 5-isopropyl-2-nitro-1,4-xylylene dichloride | 30% |
| dimethylformamide | 70% |

The ingredients are combined and stirred to produce a solution suitable for direct application.

The above formulation is applied preemergence on rice at a rate of 25 kilograms per hectare. Many serious weeds including barnyardgrass, dallisgrass and seedling johnsongrass are controlled, allowing the rice to grow vigorously and produce a good yield.

EXAMPLE P

| Granules | |
|---|---|
| 2-tert-butyl-5-isopropyl-1,4-xylylene dichloride ca 1:1 mixture with m-xylene isomer | 7% |
| heavy aromatic naphtha | 5% |
| preformed attapulgite granules | 88% |

A solution of active ingredient in heavy aromatic naphtha is sprayed upon tumbling preformed granules in a twin-shell blender. The naphtha is permitted to remain in the product.

Seventy kilograms of the above granules are applied preemergence to a hectare of field corn planted in Sassafras sandy loam soil. Outstanding control of crabgrass, pigweed, goosegrass, seedling curly dock and giant foxtail is provided.

EXAMPLE Q

| Emulsifiable Concentrate | |
|---|---|
| 5-tert-butyl-2-isobutyl-1,3-xylylene dichloride | 30% |
| heavy aromatic naphtha | 65% |
| blend of oil soluble sulfonates and polyoxyethylene ethers | 5% |

Ten kilograms of the above formulation are mixed with 400 liters of water and applied preemergence to a hectare of wheat planted in silt loam soil. The treatment provides outstanding control of barnyardgrass, pigweed, and crabgrass.

EXAMPLE R

| Mixtures | |
|---|---|
| 2,5-diisobutyl-1,4-benzenediacetonitrile | 30% |
| S-ethyl hexahydro-1-H-azepine-1-carbothioate (molinate) | 15% |
| chlorobenzene | 50% |
| blend of oil soluble calcium alkyl aryl sulfonates with alkyl aryl polyethylene glycol ethers | 5% |

The above ingredients are stirred with warming in a blender until a homogeneous emulsifiable solution is formed.

Eighteen liters of the above emulsifiable formulation are mixed with 350 liters of water and sprayed on a hectare of Perry clay soil. The treatment is incorporated into the surface two or three inches by double disking the area just before drilling the rice seed and several days before flooding. Rice emerges to a good stand and grows vigorously unhampered by such troublesome weeds as a sprangletop (Leptochloa sp.), barnyardgrass, junglerice (*Echinochloa colonum*) ducksalad (*Heterantheva limosa*), dayflower (*Commelina communis*), hemp sesbania (*Sesbania exaltata*), and broadleaf signalgrass (*Brachiaria platyphila*) which are controlled by the herbicide treatments.

EXAMPLE S

| Mixtures | |
|---|---|
| 2,5-diisobutyl-1,4-benzenediacetonitrile | 10% |
| "Ordram" 63 (molinate)* | 6% |
| attapulgite granules (24–48 mesh) | 73% |
| dimethyl formamide | 11% |

*S-ethyl hexahydro-1-H-azepine-1-carbothioate

The active ingredients are dissolved in the dimethyl formamide with warming, and the solution is sprayed on the granules which are tumbled in a mixer. The granules are then screened to remove fines and packaged.

Forty kilograms of the above granules are distributed uniformly by helicopter on a hectare of flooded, water-seeded rice after the rice and weeds are emerged, but before the weeds are reach the three-leaved stage. Good control of barnyardgrass, jungle rice and duck salad is obtained. The rice matures and produces a good yield of grain.

EXAMPLE T

| Mixtures | |
|---|---|
| 2,5-diisobutyl-1,4-benzenediacetonitrile | 60% |
| p-cumyl dimethylurea | 15% |
| sodium alkylnaphthalenesulfonate | 2% |
| sodium N-methyl-N-oleyl taurate | 3% |
| diatomaceous earth | 20% |

The above ingredients are blended and hammer milled to a particle size essentially below 50 microns and reblended.

Six kilograms of the above formulation are dispersed with mechanical agitation in 400 liters of water and sprayed preemergence on a hectare of dry-seeded rice on Crowley silt loam soil. Pigweed, jungle rice, barnyardgrass, dayflower, sprangletop and hemp sesbania are controlled, while the rice grows vigorously to maturity giving excellent yields of top-quality rice.

EXAMPLE U

| Mixtures | |
|---|---|
| 2-tert-butyl-5-isopropyl-1,4-benzenediacetonitrile | 25% |
| 2-tert-butyl-5-isopropyl-1,3-benzenediacetonitrile | 25% |
| 4-chloro-4-ethylamino-6-isopropylamino-s-triazine (Atrazine) | 25% |
| attapulgite clay | 22% |
| sodium lignin sulfonate | 2% |
| dioctyl sodium sulfosuccinate | 1% |

The above ingredients are blended, hammer milled to a particle size essentially below 50 microns and reblended.

Eight kilograms of the above wettable powder are dispersed with bypass agitation in 500 liters of water and sprayed preemergence on a hectare of hybrid field corn. Giant foxtail, barnyardgrass, crabgrass, fall panicum (*Panicum dichotomiflorum*), morningglory, pigweed, ragweed and jimsonweed (*Datura stramonium*) are essentially eliminated from the treated area, but the corn grows vigorously to maturity producing high corn yields.

EXAMPLE V

| Mixtures | |
|---|---|
| 2-tert-butyl-5-isopropyl-1,4-benzenediacetonitrile | 15% |
| 2-tert-butyl-5-isopropyl-1,3-benzenediacetonitrile | 15% |
| 3-(3,4-dichlorophenyl)-1-methoxy-1-methylurea (linuron) | 30% |
| sodium alkylnaphthalenesulfonate | 2% |
| sodium N-methyl-N-oleyl taurate | 3% |
| finely divided synthetic silica | 2% |
| diatomaceous earth | 33% |

The above ingredients are blended, hammer milled to pass a 50 mesh screen and reblended.

This formulation is dispersed in water and sprayed with a tractor-mounted spray preemergence to soybeans planted in Cumberland loam soil. The formulation is applied at four kilograms in 400 liters of spray per hectare. The treated area remains free of weeds such as ragweed, pigweed, crabgrass, fall panicum, barnyardgrass, foxtail and lambsquarters for the season, while the soybeans grow to maturity producing a high yield of top-quality beans.

EXAMPLE W

| Mixtures | |
|---|---|
| 10% granular formulation of Amiben* | 50% |
| 10% granular formulation of Example 9 | 50% |

*3-amino-2,5-dichlorobenzoic acid

The above granules are tumbled in a mixer and packaged.

The above granular mixture is distributed preemergence to soybeans on a band 300 mm wide centered on the row at an application rate of 60 kilograms per treated hectare. Crabgrass, foxtail, barnyardgrass, pigweed, lambsquarters and velvetleaf (*Abutilon theophrasti*) are controlled in-the-row. The middles are cultivated as needed until the soybeans lap the middles. Good yields of soybeans are obtained.

EXAMPLE X

| Mixtures | |
|---|---|
| formulation of Example F | 75% |
| 2,4-D, butyl ester, emulsifiable formulation | 25% |

The above ingredients are blended to form a homogeneous, emulsifiable concentrate.

The above emulsifiable formulation is dispersed in water and applied by airplane at the rate of 16 kilograms in 64 liters of spray per hectare in Oregon to winter wheat with at least five leaves. Good control of young annual weeds such as tarweed (*Hemizonia congesta*), henbit (*Lamium amplexicaule*), blue mustard (*Chorispora tenella*), and downy bromegrass (*Bromus tectorum*) is obtained. The wheat matures and produces a good yield.

EXAMPLE Y

| Mixtures | |
|---|---|
| formulation of Example | 70% |
| "Stam" F-34* | 30% |

*A commercial formulation containing 3 lbs/gal of 3,4-dichloropropionanilide

The above formulations are blended to yield an emulsifiable concentrate.

The emulsifiable formulation above is dispersed in water and applied postemergence to drill-seeded rice when weed seedlings are in the two- to four-leaf stage. The spray is applied at a volume rate per hectare of 400 liters containing 30 kilograms of the above formulation. Barnyardgrass, sprangletop, broadleaf signalgrass, crabgrass, pigweed, hemp sesbania and dayflower are readily controlled. Rice matures and produces a good yield of top-quality grain.

EXAMPLE Z

| Mixtures | |
|---|---|
| 2-tert-butyl-5-isopropyl-1,4-benzenediacetonitrile | 15% |
| 2-tert-butyl-5-isopropyl-1,3-benzenediacetonitrile | 15% |
| hydrated attapulgite | 2% |
| calcium lignin sulfonate | 15% |
| sodium carbonate | 2% |
| sodium pentachlorophenate | 0.7% |
| water | 50.3% |

All of the above ingredients except the water are blended and ground to pass a 20 mesh screen. The water is then added, and the mixture is sandground until the solid particles are smaller than 10 microns.

Sixteen kilograms of the above formulation are mixed thoroughly in 450 liters of water and sprayed preemergence on a hectare of soybeans planted in Gallion fine sandy loam. The soybeans emerge to a good stand and grow vigorously to maturity unencumbered by weeds such as barnyardgrass, pigweed, foxtail, crabgrass and fall panicum which are controlled by the herbicide treatment.

EXAMPLE AA

| Mixtures | |
|---|---|
| 2,5-diisopropyl-1,4-benzenediacetonitrile | 98% |
| trimethylnonyl polyethylene glycol ether | 2% |

The above ingredients are blended, hammer milled to pass an 0.25 mm screen, and reblended. This composition can be used directly or as a source of active for other formulations.

Three kilograms of the above formulation and two kilograms of atrazine are tank-mixed in 375 liters of water and sprayed preemergence on a hectare of hybrid field corn planted in Flanagan silt loam soil. Corn seedlings emerge to a good stand and grow vigorously. Crabgrass, barnyardgrass, giant foxtail, goosegrass, pigweed, lambsquarters, velvetleaf and morningglory are controlled. The corn matures and produces a high yield.

Similar results are obtained with tank mixes of the above formulation at the same rate with simazine at 2 kilograms, basamaise at 3 kilograms, cyprozine at 1 kilogram, terbutryn at 2 kilograms and terbutethylazine at 2 kilograms.

In the following composition claims, the expression "consisting essentially of" means that in addition to the recited components, the composition also may contain other compounds, provided they do not adversely affect the effectiveness of the composition for the intended use.

I claim:

1. A method of controlling undesirable vegetation, said method comprising applying to the locus of said undesirable vegetation an herbicidally effective amount of at least one compound represented by the formula:

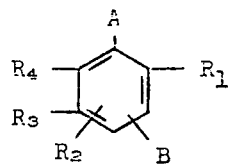

wherein
A is $-CR_5R_6CN$;
B is $-CR_7R_8CN$;
each of $R_5$, $R_6$, $R_7$, and $R_8$ independently being hydrogen or methyl;
$R_1$ is alkyl of 3 through 5 carbon atoms;
$R_2$ is hydrogen or chlorine;
$R_3$ is alkyl of 3 through 5 carbon atoms or nitro; and
$R_4$ is hydrogen or chlorine; provided that each alkyl group has at most three carbon atoms in a straight chain from the point of attachment to the aromatic ring.

2. A method of claim 1 wherein undesirable vegetation is selectively controlled in the presence of crops.

3. The method of claim 1 wherein each of $R_2$; $R_4$, $R_5$, $R_6$, $R_7$, and $R_8$ in the formula of the active ingredient is hydrogen.

4. The method of claim 3 wherein the active ingredient is 2,5-diisobutyl-1,4-benzenediacetonitrile.

5. The method of claim 3 wherein the active ingredient is a mixture of 2-tert-butyl-5-isopropyl-1,4-benzenediacetonitrile, and 2-tert-butyl-5-isopropyl-1,3-benzenediacetonitrile.

* * * * *